(12) United States Patent
Hendricks et al.

(10) Patent No.: US 7,590,993 B1
(45) Date of Patent: Sep. 15, 2009

(54) METHOD AND APPARATUS FOR GATHERING PROGRAMS WATCHED DATA

(75) Inventors: John S. Hendricks, Potomac, MD (US); Alfred E. Bonner, Bethesda, MD (US)

(73) Assignee: Comcast IP Holdings I, LLC, Wilmington, DE (US)

( * ) Notice: Subject to any disclaimer, the term of this patent is extended or adjusted under 35 U.S.C. 154(b) by 0 days.

(21) Appl. No.: 09/124,043

(22) Filed: Jul. 29, 1998

Related U.S. Application Data

(63) Continuation of application No. 08/735,549, filed on Oct. 23, 1996, now Pat. No. 6,738,978, which is a continuation of application No. 08/160,280, filed on Dec. 2, 1993, now Pat. No. 5,600,364, which is a continuation-in-part of application No. 07/991,074, filed on Dec. 9, 1992.

(51) Int. Cl.
  *H04N 7/10* (2006.01)
  *H04N 7/025* (2006.01)
(52) U.S. Cl. .............................. 725/35; 725/34; 725/36
(58) Field of Classification Search ............ 725/9, 725/10, 11, 12, 13, 14, 15, 16, 17, 18, 19, 725/20, 32–36, 109, 110, 114, 115, 116, 725/91, 92, 93, 46
See application file for complete search history.

(56) References Cited

U.S. PATENT DOCUMENTS

| | | | |
|---|---|---|---|
| 3,891,792 A | 6/1975 | Kimura | |
| 4,361,848 A | 11/1982 | Poignet et al. | |
| 4,381,522 A | 4/1983 | Lambert | |
| 4,398,216 A | 8/1983 | Field et al. | |
| 4,484,217 A | 11/1984 | Block et al. | |
| 4,488,179 A | 12/1984 | Kruger et al. | |
| 4,517,598 A | 5/1985 | VanValkenburg et al. | |
| 4,528,643 A | 7/1985 | Freeny, Jr. | |
| 4,587,520 A | 5/1986 | Astle | |
| 4,605,964 A | 8/1986 | Chard | |
| 4,621,282 A | 11/1986 | Ahern | |

(Continued)

FOREIGN PATENT DOCUMENTS

CA    2044574    12/1992

(Continued)

OTHER PUBLICATIONS

Reimer, "Memories in my Pocket", Feb. 1991.

(Continued)

*Primary Examiner*—Hunter B. Lonsberry
(74) *Attorney, Agent, or Firm*—Banner & Witcoff, Ltd.

(57) ABSTRACT

A processor in a television program delivery system receives programs watched information from terminals in a television delivery system. The processor arranges the programs watched information in a database or programs watched matrix so that the frequency of programs watched may be determined. The programs watched matrix may consist of time slots and program categories. The processor determines a program count for programs or program categories. The program count may then be used to send programming to the terminals. The terminals may provide the programs watched information in response to a cyclic polling message generated by the processor or by using a random access routine. The programs watched information may be provided over a cable or a telephone line.

24 Claims, 34 Drawing Sheets

U.S. PATENT DOCUMENTS

| | | | |
|---|---|---|---|
| 4,633,462 A * | 12/1986 | Stifle et al. | 370/448 |
| 4,639,225 A | 1/1987 | Washizuka | |
| 4,688,218 A | 8/1987 | Blineau et al. | |
| 4,688,246 A | 8/1987 | Eilers et al. | |
| 4,694,490 A | 9/1987 | Harvey et al. | |
| 4,697,209 A | 9/1987 | Kiewit et al. | |
| 4,706,121 A | 11/1987 | Young | |
| 4,712,105 A | 12/1987 | Kohler | |
| 4,712,130 A | 12/1987 | Casey | |
| 4,724,491 A | 2/1988 | Lambert | |
| 4,745,549 A * | 5/1988 | Hashimoto | 705/8 |
| 4,750,109 A * | 6/1988 | Kita | 709/227 |
| 4,792,972 A | 12/1988 | Cook, Jr. | |
| 4,805,014 A | 2/1989 | Sahara et al. | |
| 4,816,901 A | 3/1989 | Music et al. | |
| 4,816,904 A | 3/1989 | McKenna et al. | 725/11 |
| D301,037 S | 5/1989 | Matsuda | |
| 4,829,558 A | 5/1989 | Welsh | |
| 4,829,569 A | 5/1989 | Seth-Smith et al. | |
| 4,860,379 A | 8/1989 | Schoeneberger et al. | |
| 4,876,736 A | 10/1989 | Kiewit | |
| 4,928,168 A | 5/1990 | Iwashita | |
| 4,947,429 A | 8/1990 | Bestler et al. | |
| 4,949,187 A | 8/1990 | Cohen | |
| 4,959,810 A | 9/1990 | Darbee et al. | |
| 4,961,109 A | 10/1990 | Tanaka | |
| 4,965,825 A | 10/1990 | Harvey et al. | |
| 4,975,951 A | 12/1990 | Bennett | |
| 4,977,455 A | 12/1990 | Young | |
| D314,383 S | 2/1991 | Hafner | |
| 4,995,078 A | 2/1991 | Monslow et al. | |
| 4,996,597 A | 2/1991 | Duffield | |
| 5,001,554 A | 3/1991 | Johnson et al. | |
| 5,003,384 A * | 3/1991 | Durden et al. | 725/104 |
| 5,014,125 A | 5/1991 | Pocock et al. | |
| 5,015,829 A | 5/1991 | Eilert et al. | |
| 5,020,129 A | 5/1991 | Martin et al. | |
| 5,027,400 A | 6/1991 | Baji et al. | |
| 5,036,394 A | 7/1991 | Morii et al. | |
| 5,036,537 A | 7/1991 | Jeffers et al. | |
| 5,038,402 A | 8/1991 | Robbins | |
| 5,046,093 A | 9/1991 | Wachob | |
| 5,047,867 A | 9/1991 | Strubbe et al. | |
| 5,049,990 A | 9/1991 | Kondo et al. | |
| 5,056,138 A | 10/1991 | Tyson, Sr. | |
| 5,057,917 A | 10/1991 | Shalkauser et al. | |
| 5,073,930 A | 12/1991 | Green et al. | |
| 5,075,771 A | 12/1991 | Hashimoto | |
| 5,077,607 A | 12/1991 | Johnson et al. | |
| 5,078,019 A | 1/1992 | Aoki | |
| 5,091,782 A | 2/1992 | Krause et al. | |
| 5,093,718 A | 3/1992 | Hoarty et al. | |
| D325,581 S | 4/1992 | Schwartz | |
| 5,103,314 A | 4/1992 | Keenan | |
| 5,105,268 A | 4/1992 | Yamanouchi et al. | |
| 5,130,792 A | 7/1992 | Tindell et al. | |
| 5,132,789 A | 7/1992 | Ammon et al. | |
| 5,132,992 A | 7/1992 | Yurt et al. | |
| 5,133,079 A | 7/1992 | Ballantyne et al. | |
| 5,142,690 A * | 8/1992 | McMullan et al. | 725/124 |
| D329,238 S | 9/1992 | Grasso et al. | |
| 5,144,663 A | 9/1992 | Kudelski et al. | |
| 5,150,118 A | 9/1992 | Finkle et al. | |
| 5,151,782 A | 9/1992 | Ferraro | |
| 5,151,789 A | 9/1992 | Young | |
| 5,152,011 A | 9/1992 | Schwob | |
| 5,155,591 A | 10/1992 | Wachob | |
| 5,166,886 A | 11/1992 | Molnar et al. | |
| D331,760 S | 12/1992 | Renk, Jr. | |
| 5,172,413 A | 12/1992 | Bradley et al. | |
| 5,182,639 A | 1/1993 | Jutamulia et al. | |
| 5,202,817 A | 4/1993 | Koenck et al. | |
| 5,206,722 A | 4/1993 | Kwan | |
| 5,206,954 A | 4/1993 | Inoue et al. | |
| 5,216,515 A | 6/1993 | Steele et al. | |
| 5,223,924 A * | 6/1993 | Strubbe | 725/46 |
| 5,237,311 A | 8/1993 | Mailey et al. | |
| 5,237,610 A | 8/1993 | Gammie et al. | |
| 5,247,347 A | 9/1993 | Litteral et al. | |
| 5,247,575 A | 9/1993 | Sprague et al. | 705/53 |
| 5,251,324 A * | 10/1993 | McMullan, Jr. | 725/14 |
| 5,253,066 A | 10/1993 | Vogel | |
| 5,253,275 A | 10/1993 | Yurt et al. | |
| 5,253,341 A | 10/1993 | Rozmanith et al. | |
| 5,260,778 A | 11/1993 | Kauffman et al. | |
| 5,270,809 A | 12/1993 | Gammie et al. | 725/114 |
| 5,282,028 A | 1/1994 | Johnson et al. | |
| 5,283,639 A | 2/1994 | Esch et al. | |
| 5,285,272 A | 2/1994 | Bradley et al. | |
| 5,289,271 A | 2/1994 | Watson | |
| 5,293,540 A | 3/1994 | Trani et al. | |
| 5,293,633 A | 3/1994 | Robbins | |
| 5,307,485 A * | 4/1994 | Bordonaro et al. | 707/7 |
| 5,317,391 A | 5/1994 | Banker et al. | 725/139 |
| 5,319,455 A | 6/1994 | Hoarty et al. | |
| 5,319,707 A | 6/1994 | Wasilewski et al. | |
| 5,323,240 A | 6/1994 | Amano et al. | |
| 5,327,554 A | 7/1994 | Palazzi, III et al. | |
| 5,339,315 A | 8/1994 | Maeda et al. | |
| 5,341,166 A | 8/1994 | Garr et al. | |
| 5,341,474 A | 8/1994 | Gelman et al. | |
| 5,343,239 A | 8/1994 | Lappington et al. | |
| 5,343,516 A | 8/1994 | Callele et al. | |
| 5,345,594 A | 9/1994 | Tsuda | |
| 5,349,638 A | 9/1994 | Pitroda et al. | |
| 5,351,075 A | 9/1994 | Herz et al. | |
| 5,353,121 A | 10/1994 | Young et al. | |
| 5,355,162 A | 10/1994 | Yazolino et al. | |
| 5,357,276 A | 10/1994 | Banker et al. | |
| 5,365,265 A | 11/1994 | Shibata et al. | |
| 5,367,571 A | 11/1994 | Bowen et al. | |
| 5,374,951 A | 12/1994 | Welsh | 725/20 |
| 5,375,068 A | 12/1994 | Palmer et al. | |
| 5,390,348 A | 2/1995 | Magin et al. | |
| 5,396,546 A | 3/1995 | Remillard | |
| 5,400,401 A | 3/1995 | Wasilewski et al. | |
| 5,404,393 A | 4/1995 | Remillard | |
| 5,404,505 A | 4/1995 | Levinson | |
| 5,410,326 A | 4/1995 | Goldsetin | |
| 5,410,344 A | 4/1995 | Graves et al. | |
| 5,412,416 A | 5/1995 | Nemirofsky | |
| 5,414,426 A | 5/1995 | O'Donnell et al. | |
| 5,416,508 A | 5/1995 | Sakuma et al. | |
| 5,424,770 A | 6/1995 | Schmelzer et al. | |
| 5,432,542 A | 7/1995 | Thibadeau et al. | |
| 5,440,632 A | 8/1995 | Bacon et al. | |
| 5,442,626 A | 8/1995 | Wei | |
| 5,446,919 A | 8/1995 | Wilkins | |
| 5,461,667 A | 10/1995 | Remillard | |
| 5,467,402 A | 11/1995 | Okuyama et al. | 382/104 |
| 5,469,206 A | 11/1995 | Strubbe et al. | |
| 5,473,362 A | 12/1995 | Fitzgerald | |
| 5,477,263 A | 12/1995 | O'Callaghan et al. | |
| 5,479,268 A | 12/1995 | Young et al. | |
| 5,481,294 A | 1/1996 | Thomas et al. | |
| 5,481,296 A | 1/1996 | Cragun et al. | |
| 5,481,542 A | 1/1996 | Logston et al. | |
| 5,483,278 A | 1/1996 | Strubbe et al. | |
| 5,488,409 A * | 1/1996 | Yuen et al. | 725/41 |
| 5,500,794 A | 3/1996 | Fujita et al. | |
| 5,515,098 A | 5/1996 | Carles | |
| 5,550,863 A | 8/1996 | Yurt et al. | 375/240 |
| 5,561,708 A | 10/1996 | Remillard | |
| 5,561,709 A | 10/1996 | Remillard | |

| | | | |
|---|---|---|---|
| 5,570,126 A | 10/1996 | Blahut et al. | |
| 5,600,364 A * | 2/1997 | Hendricks et al. | 725/9 |
| 5,635,989 A | 6/1997 | Rothmuller | 725/46 |
| 5,644,354 A | 7/1997 | Thompson et al. | |
| 5,661,516 A | 8/1997 | Carles | |
| 5,663,757 A | 9/1997 | Morales et al. | |
| 5,696,906 A | 12/1997 | Peters et al. | |
| 5,715,315 A | 2/1998 | Handelman | 380/234 |
| 5,724,091 A | 3/1998 | Freeman et al. | |
| 5,758,257 A | 5/1998 | Herz et al. | 725/116 |
| 5,774,170 A | 6/1998 | Hite et al. | 725/34 |
| 5,774,357 A * | 6/1998 | Hoffberg et al. | 713/600 |
| 5,793,414 A | 8/1998 | Shaffer | 725/133 |
| 5,990,927 A | 11/1999 | Hendricks et al. | 725/132 |
| 6,052,717 A | 4/2000 | Reynolds et al. | 709/218 |
| 6,163,316 A | 12/2000 | Killian | 345/721 |
| 6,201,536 B1 | 3/2001 | Hendricks et al. | 345/716 |
| 6,331,877 B1 | 12/2001 | Bennington et al. | 348/731 |

FOREIGN PATENT DOCUMENTS

| | | |
|---|---|---|
| DE | 3423846 | 1/1986 |
| DE | 3935294 | 4/1991 |
| EP | 149536 | 1/1984 |
| EP | 103438 | 3/1984 |
| EP | 145063 | 6/1985 |
| EP | 158548 | 10/1985 |
| EP | 167237 | 1/1986 |
| EP | 187961 | 7/1986 |
| EP | 243312 | 10/1987 |
| EP | 281293 | 9/1988 |
| EP | 328440 | 8/1989 |
| EP | 355697 | 2/1990 |
| EP | 399200 | 11/1990 |
| EP | 402809 | 12/1990 |
| EP | 420123 | 4/1991 |
| EP | 424648 | 5/1991 |
| EP | 425834 | 5/1991 |
| EP | 450841 | 10/1991 |
| EP | 506435 | 9/1992 |
| EP | 513553 | 11/1992 |
| EP | 513763 | 11/1992 |
| EP | 570785 | 11/1993 |
| GB | 1204190 | 9/1970 |
| GB | 2168227 | 6/1986 |
| GB | 2177873 | 1/1987 |
| GB | 2344009 A | 5/2000 |
| JP | 6106015 | 3/1986 |
| JP | 6224777 | 2/1987 |
| JP | 2140134 | 6/1987 |
| JP | 1020454 | 1/1989 |
| JP | 2245167 | 3/1989 |
| JP | 1130683 | 5/1989 |
| JP | 1142918 | 6/1989 |
| JP | 3114375 | 5/1991 |
| JP | 3198119 | 8/1991 |
| JP | 5250106 | 9/1993 |
| TW | 238461 | 4/1992 |
| TW | 234223 | 11/1994 |
| TW | 235358 | 12/1994 |
| TW | 235359 | 12/1994 |
| TW | 236065 | 12/1994 |
| TW | 236744 | 12/1994 |
| WO | WO 80/00209 | 2/1980 |
| WO | 8601962 | 3/1986 |
| WO | 8909528 | 10/1989 |
| WO | 9010988 | 9/1990 |
| WO | 9100670 | 1/1991 |
| WO | 9103112 | 3/1991 |
| WO | 9211713 | 7/1992 |
| WO | 9212599 | 7/1992 |
| WO | 9217027 | 10/1992 |
| WO | 9221206 | 11/1992 |
| WO | 9322877 | 11/1993 |
| WO | WO 98/18086 | 4/1998 |
| WO | WO 99/52285 | 10/1999 |
| WO | WO 99/66719 | 12/1999 |

OTHER PUBLICATIONS

Olshansky et al., "Subscriber Distribution Networks Using Compressed Digital Video", Nov. 1992.
Dinaro, et al., "Markets and Products Overview", 1991.
Advertisement, "Hong Kong Enterprise", Nov. 1988.
Advertisement, "Great Presentations", 1987.
Advertisement, "Consumer Dist.", Fall/Winter 1992.
van den Boom, "Interactive Videotex . . . ", Nov.-Dec. 1986.
Moloney, "Digital Compression in Todays . . . ", Jun. 6, 1993.
Bestler, "Flexible Data Structures . . . ", Jun. 6, 1993.
Sharpless, "Subscription Teletext for Value Added Services", Aug. 1985.
Gelman et al., "A Store-and Forward . . . ", Jun. 21, 1991.
Hewlett Packard Co., "HP-41C Operating Manual", Dec. 1982.
Sorce, et al., "Human Factors In Telecommunications," Sep. 1990.

* cited by examiner

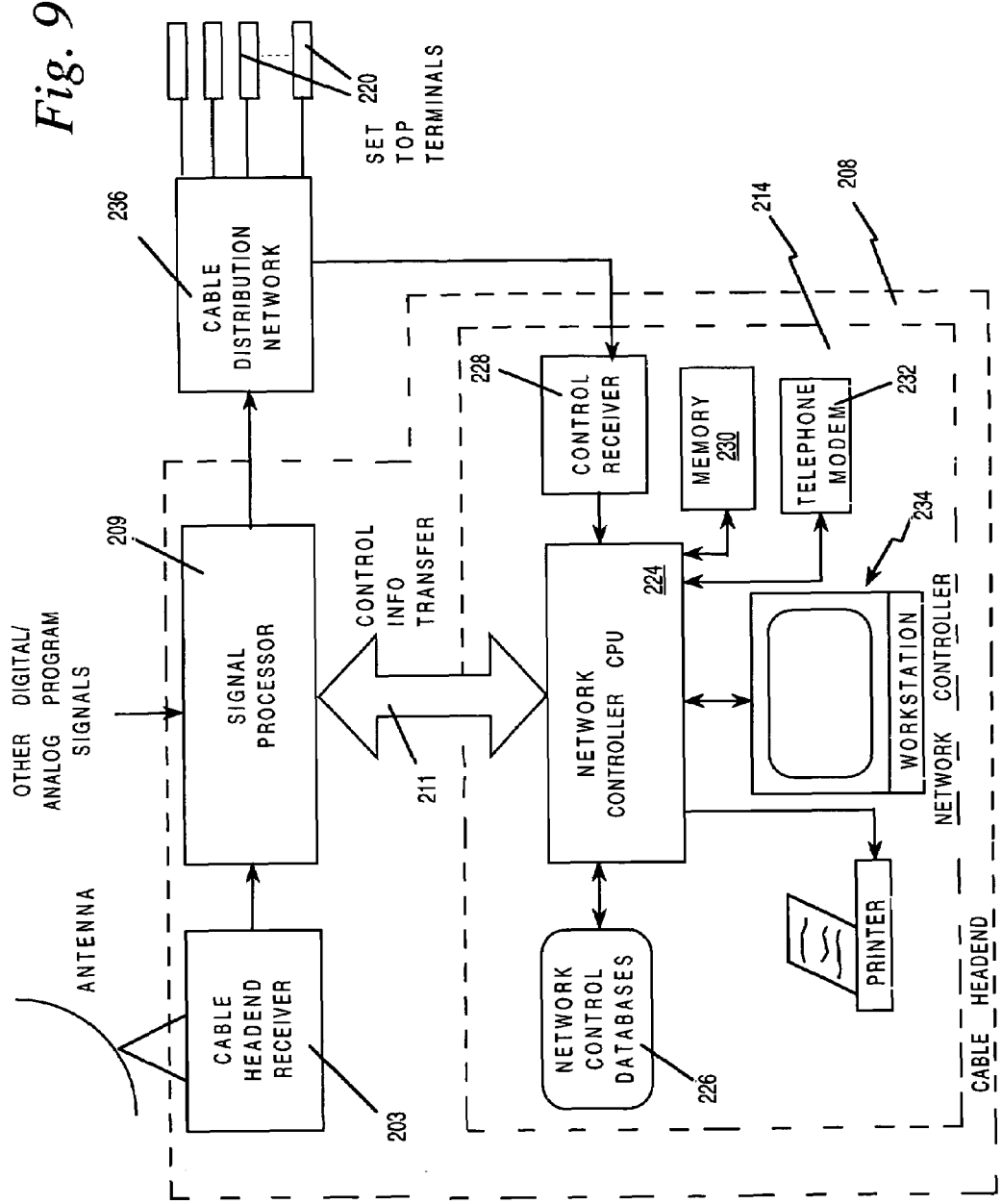

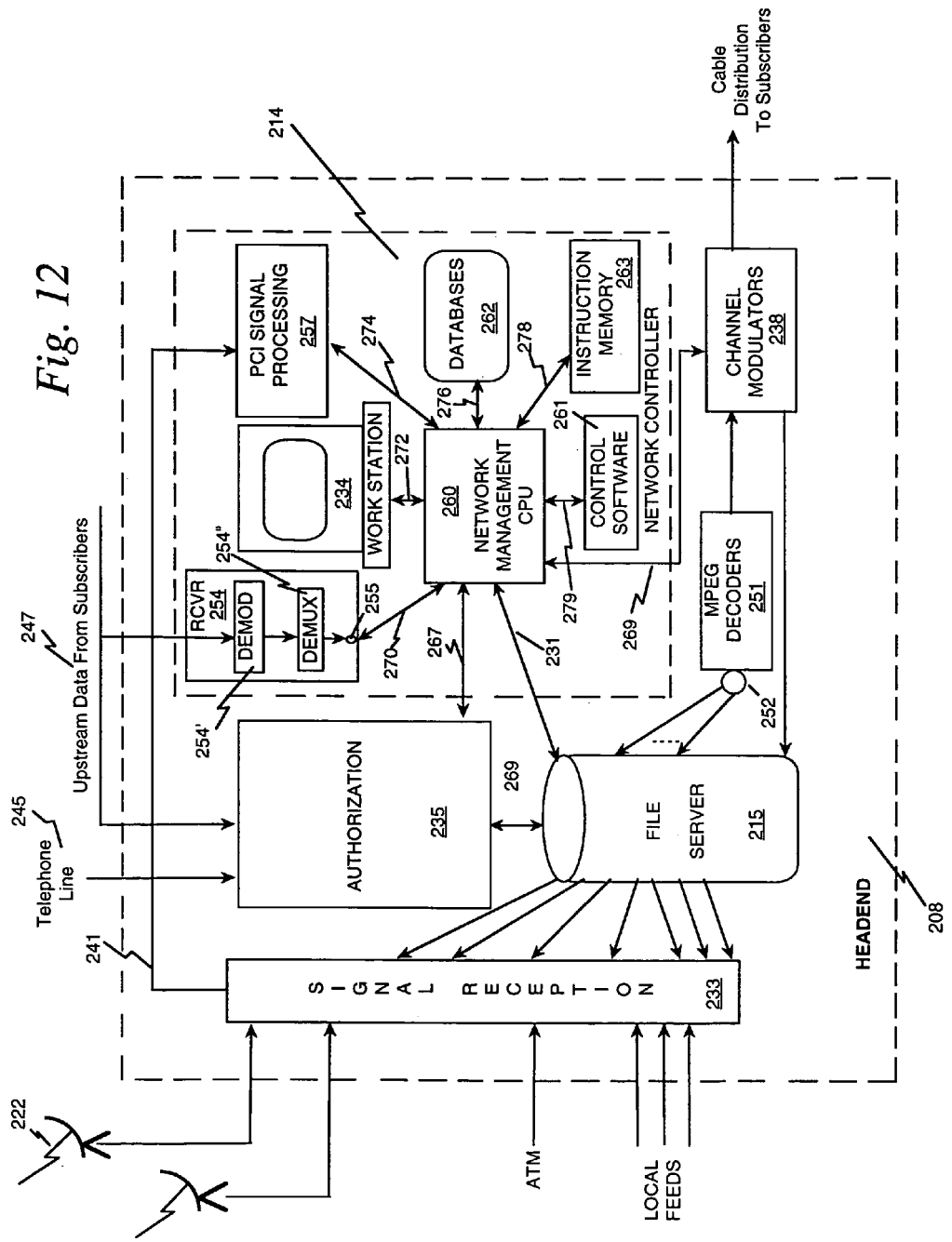

METHOD AND APPARATUS FOR GATHERING PROGRAMS WATCHED DATA

RELATED APPLICATIONS

This application is a continuation of Ser. No. 08/735,549, filed Oct. 23, 1996, now U.S. Pat. No. 6,738,978, which is a continuation of Ser. No. 08/160,280, filed Dec. 2, 1993, now U.S. Pat. No. 5,600,364, which is a continuation-in-part of application Ser. No. 07/991,074 filed Dec. 9, 1992 entitled TELEVISION PROGRAM PACKAGING AND DELIVERY SYSTEM WITH MENU DRIVEN SUBSCRIBER ACCESS. The following are also based on the above-referenced patent application, are incorporated herein by reference: U.S. Pat. No. 5,798,785, entitled REPROGRAMMABLE TERMINAL FOR SUGGESTING PROGRAMS OFFERED ON A TELEVISION PROGRAM DELIVERY SYSTEM U.S. Pat. No. 5,659,350, entitled AN OPERATIONS CENTER FOR A TELEVISION PROGRAM PACKAGING AND DELIVERY SYSTEM U.S. Pat. No. 5,734,853, entitled SET TOP TERMINAL FOR CABLE TELEVISION DELIVERY SYSTEMS Ser. No. 08/160,194, entitled ADVANCED SET TOP TERMINAL FOR CABLE TELEVISION DELIVERY SYSTEMS U.S. Pat. No. 5,682,195, entitled DIGITAL CABLE HEADEND FOR CABLE TELEVISION DELIVERY SYSTEM Ser. No. 08/352,205, entitled NETWORK MANAGER FOR CABLE TELEVISION SYSTEM HEADENDS

TECHNICAL FIELD

The invention relates to television delivery systems for providing television programming to consumer homes. More particularly, the invention relates gathering viewing information from the television delivery system.

BACKGROUND OF THE INVENTION

Advances in television entertainment have been primarily driven by breakthroughs in technology. In 1939, advances on Vladmir Zworykin's picture tube provided the stimulus for NBC to begin its first regular broadcasts. In 1975, advances in satellite technology provided consumers with increased programming to homes.

Many of these technology breakthroughs have produced inconvenient systems for consumers. One example is the ubiquitous three remote control home, having a separate and unique remote control for the TV, cable box and VCR. More recently, technology has provided cable users in certain parts of the country with 100 channels of programming. This increased program capacity is beyond the ability of many consumers to use effectively. No method of managing the program choices has been provided to consumers.

Consumers are demanding that future advances in television entertainment, particularly programs and program choices, be presented to the consumer in a user friendly manner. Consumer preferences, instead of technological breakthroughs, will drive the television entertainment market for at least the next 20 years. As computer vendors have experienced a switch from marketing new technology in computer hardware to marketing better usability, interfaces and service, the television entertainment industry will also experience a switch from new technology driving the market to consumer usability driving the market.

Consumers want products incorporating new technology that are useful, and will no longer purchase new technology for the sake of novelty or status. Technological advances in sophisticated hardware are beginning to surpass the capability of the average consumer to use the new technology. Careful engineering must be done to make entertainment products incorporating new technology useful and desired by consumers.

In order for new television entertainment products to be successful, the products must satisfy consumer demands. TV consumers wish to go from limited viewing choices to a variety of choices, from no control of programming to complete control. Consumers wish to advance from cumbersome and inconvenient television to easy and convenient television and keep costs down. Consumers do not wish to pay for one hundred channels when due to lack of programming information, they seldom, if ever, watch programming on many of these channels. Viewers wish their programming to be customized and targeted to their needs and tastes.

The concepts of interactive television, high definition television and 300 channel cable systems in consumer homes will not sell if they are not packaged, delivered and presented in a useable fashion to consumers. Consumers are already being bombarded with programming options, numerous "free" cable channels, subscription cable channels and pay-per-view choices. Any further increase in TV entertainment choices, without a user friendly presentation and approach, will likely bewilder viewers with a mind-numbing array of choices.

The TV industry has traditionally marketed and sold its programs to consumers in bulk, such as continuous feed broadcast and long-term subscriptions to movie channels. The TV industry is unable to sell its programming in large quantities on a unit per unit basis, such as the ordering of one program. Consumers prefer a unit sales approach because it keeps costs down and allows the consumer to be more selective in their viewing.

In today's television world, networks manage the program lineup for individual channels. Each network analyzes ratings for television shows and determines the appropriate schedule or program lineup to gain market share and revenue from advertising. Program ratings are determined using a test group of viewers and statistical analysis methods. Since each channel is in competition with every other channel, there is no coordinated effort to organize television programming in a manner that primarily suits the viewers.

Advertising has become equally annoying, with viewers being "forced" to watch television commercials for goods and services that are neither needed nor desired. As a result, consumers have become impatient and dissatisfied with today's television delivery systems. Equally problematic, these television delivery systems do not have the capabilities or features necessary to operate in the digital environment. Consequently, advances in digital technology call for a new television program delivery system that is capable of satisfying varying consumer and viewer needs. Existing cable headends are unequipped for the transition to a digital system. These cable headends have no means for monitoring and controlling the large numbers of program signals and advertisements that will eventually be passed on to both consumers and viewers. These cable headends are unequipped to manage account and billing information for set top terminals without relying on telephone lines. In addition, these cable headends have no means for targeting advertisements to particular consumers and viewers.

What is needed is a network controller for a digital cable headend used in a television delivery system.

What is needed is a versatile network controller for a cable headend.

What is needed is a network controller for use in a cable headend that is capable of operating in both the digital and analog environment.

What is needed is certain components of a network controller for a digital cable headend used in a cable television delivery system.

What is needed is a network controller capable of controlling multiple video/audio program signals received by a cable headend from a satellite transponder.

What is needed is a network controller that can control the routing of both analog and digital video/audio program signals from cable headend to viewer homes.

What is needed is a network controller component for a cable headend that controls the combining the digital video/audio signals.

What is needed is a network controller that creates tiered programming by combining various digital video/audio signals.

What is needed is a network controller for a cable headend that accommodates different bandwidth availability between cable headend and certain viewer homes.

What is needed is a network controller capable of modifying program control information received from an external source.

What is needed is a network controller capable of targeting video to viewers.

What is needed is a network controller capable of targeting television commercials to specific consumers and viewers.

What is needed is a network controller capable of gathering information on programs watched by viewers.

What is needed is a better method of determining program ratings.

What is needed is a network controller capable of managing account and billing information.

The present invention is addressed to fulfill these needs.

SUMMARY OF INVENTION

The present invention is a television delivery system and a method for gathering information related to television viewing habits. The television delivery system may include an operations center, a cable headend and set top terminals. A network controller in the operations center or the cable headend is the central component that provides monitoring and control of set top terminals in the television delivery system. The network controller is a key component of a digital cable television delivery system. The network controller of the present invention provides much greater capability and flexibility than existing cable headend control equipment.

The network controller of the embodiment performs cable network monitoring and control of set top terminals within the cable headend. Alternatively, the network controller may be located in an operations center. The cable headend receives and processes digitally compressed program signals before the signals are relayed to each set top terminal. Each cable headend site is equipped with multiple satellite receiver dishes and a signal processor.

As an intermediary between the set top terminals and the program delivery system's operations center (or other remote site), the cable headend relies on the network controller to perform key cable system operations. For example, the network controller accommodates regional programming needs by working with other cable headend components. The network controller also performs the system control functions for the television delivery system.

The network controller manages the configuration of set top terminals and processes signals received from the set top terminals. In the preferred embodiment, the network controller monitors, among other things, automatic poll-back responses from the set top terminals remotely located at each subscribers' home. The polling and automatic report-back cycle occurs frequently enough to allow the network controller to maintain accurate account and billing information as well as monitor authorized channel access.

In an embodiment, information to be sent to the network controller will be stored in RAM within each subscriber's set top terminal and will be retrieved only upon polling by the network controller. Retrieval may, for example, occur on a daily, weekly or monthly basis. The network controller allows the television delivery system to maintain complete information on all programs watched at a particular set top terminal.

The network controller is also able to respond to the immediate needs of a set top terminal, or a group of set top terminals. The network controller can modify a program signal received from the television delivery system's operations center before the program signal is transmitted to the set top terminal. Therefore, the network controller enables the television delivery system to adapt to the specific requirements of individual set top terminals when information on these requirements cannot be provided to the operations center in advance. In other words, the network controller is able to perform "on the fly programming" changes. With this capability, the network controller can handle sophisticated local programming needs such as interactive television services, split screen video, and selection of different foreign languages for the same video. In addition, the network controller controls and monitors all compressors and decompressors in the system.

The network controller makes use of a number of software routines that assist the network controller to perform its major functions. One of the major routines assists the network controller to modify the program control information so that changes and additions in programming and advertisements can be accommodated. Such changes and additions include set top terminal access authorizations and deauthorizations.

A set top terminal data gathering routine allows the network controller to schedule and perform polling of all set top terminals operating in the system. The software also provides the network controller with a means of processing status reports received from set top terminals in response to polling requests.

A video targeting routine makes use of a subscriber's demographic information and viewing habits to determine those advertisements that are of most interest to that particular subscriber. In so doing, the routine generates packages of advertisements targeted towards each subscriber.

Finally, an additional routine correlates the programs accessed with pricing information to generate billing reports that can be sent to a given set top terminal over the cable distribution network. Aside from this routine, the network controller accommodates other methods of billing and account maintenance, such as through the use of remote billing sites.

The present invention is not only able to operate in the digital environment but also introduces many new features to television program delivery and cable headend control.

It is an object of this invention to provide a network controller for a television delivery system.

It is an object of this invention to provide a network controller for a digital cable headend used in a cable television delivery system.

It is an object of this invention to provide certain needed components of a network controller for a digital cable headend used in a cable television delivery system.

It is an object of this invention to provide a versatile network controller for a cable headend.

It is an object of this invention to provide a network controller for use in a cable headend that is capable of operating in both the digital and analog environment.

It is an object of this invention to provide a network controller capable of controlling multiple video/audio program signals received by a cable headend.

It is an object of this invention to provide a network controller that can control the routing of both analog and digital video/audio program signals from cable headend to viewer homes.

It is an object of this invention to provide a network controller component for a cable headend that controls the combining the digital video/audio signals.

It is an object of this invention to provide a network controller that creates tiered programming by combining various digital video/audio signals.

It is an object of this invention to provide a network controller for a cable headend that accommodates different bandwidth availability between cable headend and certain viewer homes.

It is an object of the invention to provide a network controller capable of modifying program control information received from an external source.

It is an object of the invention to provide a network controller capable of targeting specific video/audio to specific viewers.

It is an object of the invention to provide a network controller capable of targeting television commercials to specific consumers and viewers.

It is an object of the invention to provide a network controller capable of retrieving data gathered at set top terminals.

It is an object of this invention to provide a network controller capable of managing account and billing information.

These and other objects and advantages of the invention will become obvious to those skilled in the art upon review of the following description, the attached drawings and appended claims.

DESCRIPTION OF THE DRAWINGS

FIG. 9 is a diagram of the cable headend showing the primary components of the network controller.

FIG. 10b is a schematic of an alternative embodiment of FIG. 10a.

FIG. 12 is a schematic of another cable headend.

DETAILED DESCRIPTION OF THE PREFERRED EMBODIMENT

A. Television Program Delivery System Description

1. Introduction

Figure 1:
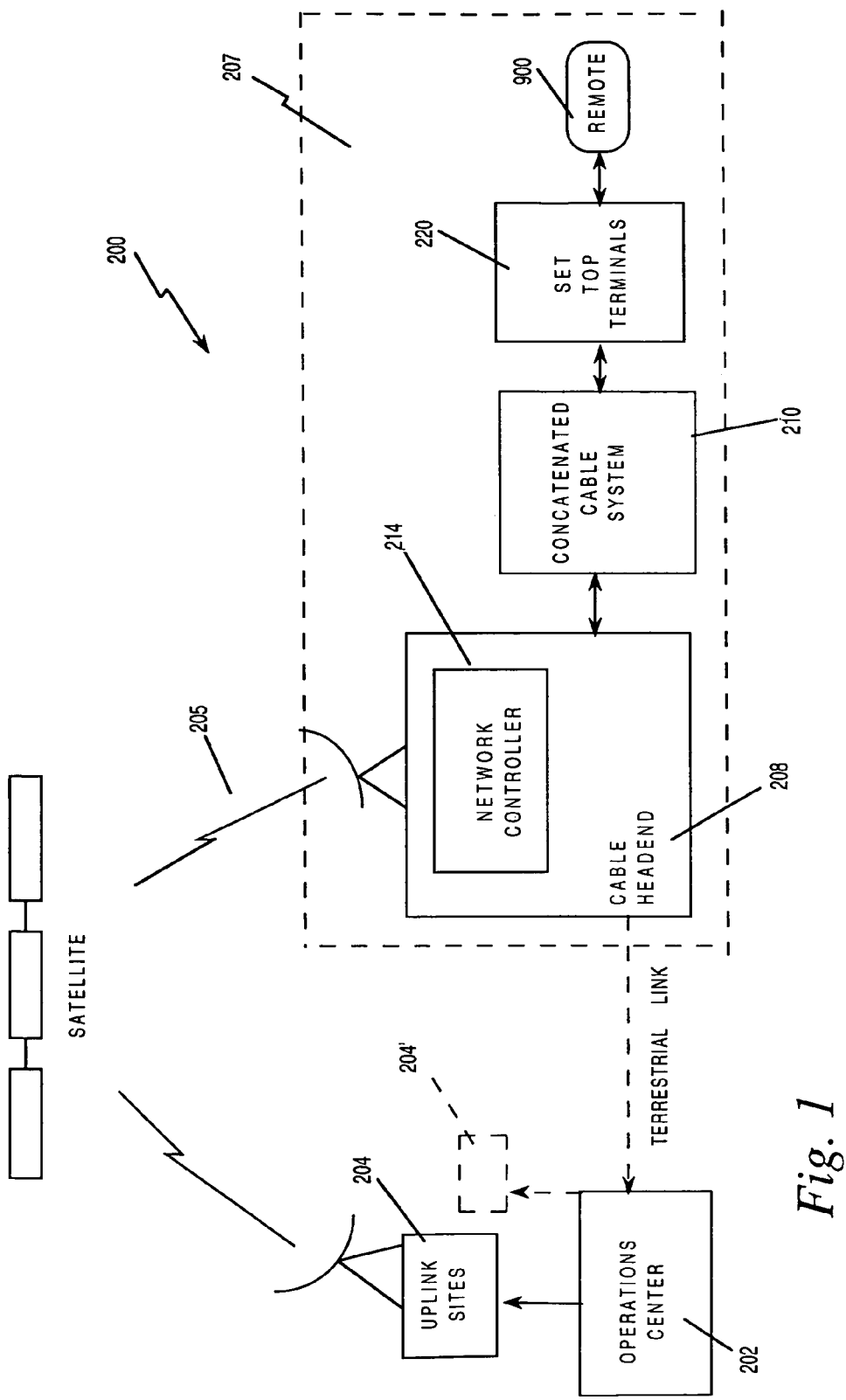
FIG. 1 is a diagram of the primary components of the television delivery system.

FIG. 1 shows the present invention as part of an expanded cable television program delivery system 200 that dramatically increases programming capacity using compressed transmission of television program signals. Developments in digital bandwidth compression technology now allow much greater throughput of television program signals over existing or slightly modified transmission media. The program delivery system 200 shown provides subscribers with a user friendly interface to operate and exploit a six-fold or more increase in current program delivery capability.

Subscribers are able to access an expanded television program package and view selected programs through a menu-driven access scheme that allows each subscriber to select individual programs by sequencing a series of menus. The menus are sequenced by the subscriber using simple alpha-numeric and iconic character access or moving a cursor or highlight bar on the TV screen to access desired programs by simply pressing a single button, rather than recalling from memory and pressing the actual two or more digit numeric number assigned to a selection. Thus, with the press of a single button, the subscriber can advance from one menu to the next. In this fashion, the subscriber can sequence the menus and select a program from any given menu. The programs are grouped by category so that similar program offerings are found on the same menu 2. Major System Components In its most basic form, the system uses a program delivery system 200 in conjunction with a conventional concatenated cable television system 210. The program delivery system 200 generally includes (i) at least one operations center 202, where program packaging and control information are created and then assembled in the form of digital data, (ii) a digital compression system, where the digital data is compressed, combined/multiplexed, encoded, and mapped into digital signals for satellite transmission to the cable headend 208, and (iii) a set of in-home decompressors. The program delivery system 200 transports the digital signals to the cable headend 208 where the signals are transmitted through a concatenated cable television system 210. Within the cable headend 208, the received signals may be decoded, demultiplexed, managed by a local central distribution and switching mechanism, combined and then transmitted to the set top terminal 220 located in each subscriber's home over the cable system 210. Although concatenated cable systems 210 are the most prevalent transmission media to the home, telephone lines, cellular networks, fiberoptics, Personal Communication Networks and similar technology for transmitting to the home can be used interchangeably with this program delivery system 200.

The delivery system 200 has a reception region 207 with an in-home decompression capability. This capability is performed by a decompressor housed within a set top terminal 220 in each subscriber's home. The decompressor remains transparent from the subscriber's point of view and allows any of the compressed signals to be demultiplexed and individually extracted from the composite data stream and then individually decompressed upon selection by the subscriber. The decompressed video signals are converted into analog signals for television display. Such analog signals include NTSC formatted signals for use by a standard television. Control signals are likewise extracted and decompressed and then either executed immediately or placed in local storage such as a RAM. Multiple sets of decompression hardware may be used to decompress video and control signals. The set top terminal 220 may then overlay or combine different signals to form the desired display on the subscriber's television. Graphics on video or picture-on-picture are examples of such a display.

Although a single digital compression standard (e.g., MPEG) may be used for both the program delivery system 200 and the concatenated cable system 210, the compression technique used may differ between the two systems. When the compression standards differ between the two media, the signals received by the cable headend 208 must be decompressed before transmission from the headend 208 to the set top terminals 220. Subsequently, the cable headend 208 must recompress and transmit the signals to the set top terminal 220, which would then decompress the signals using a specific decompression algorithm.

The video signals and program control signals received by the set top terminal 220 correspond to specific television programs and menu selections that each subscriber may access through a subscriber interface. The subscriber interface is a device with buttons located on the set top terminal 220 or on a portable remote control 900. In the preferred system embodiment, the subscriber interface is a combined alpha-character, numeric and iconic remote control device 900, which provides direct or menu-driven program access. The preferred subscriber interface also contains cursor movement and go buttons as well as alpha, numeric and iconic buttons. This subscriber interface and menu arrangement enables the subscriber to sequence through menus by choosing from among several menu options that are displayed on the television screen. In addition, a user may bypass several menu screens and immediately choose a program by selecting the appropriate alpha-character, numeric or iconic combinations on the subscriber interface. In the preferred embodiment, the set top terminal 220 generates the menus that are displayed on the television by creating arrays of particular menu templates, and the set top terminal 220 displays a specific menu or submenu option for each available video signal.

3. Operations Center and Digital Compression System

Figure 2:
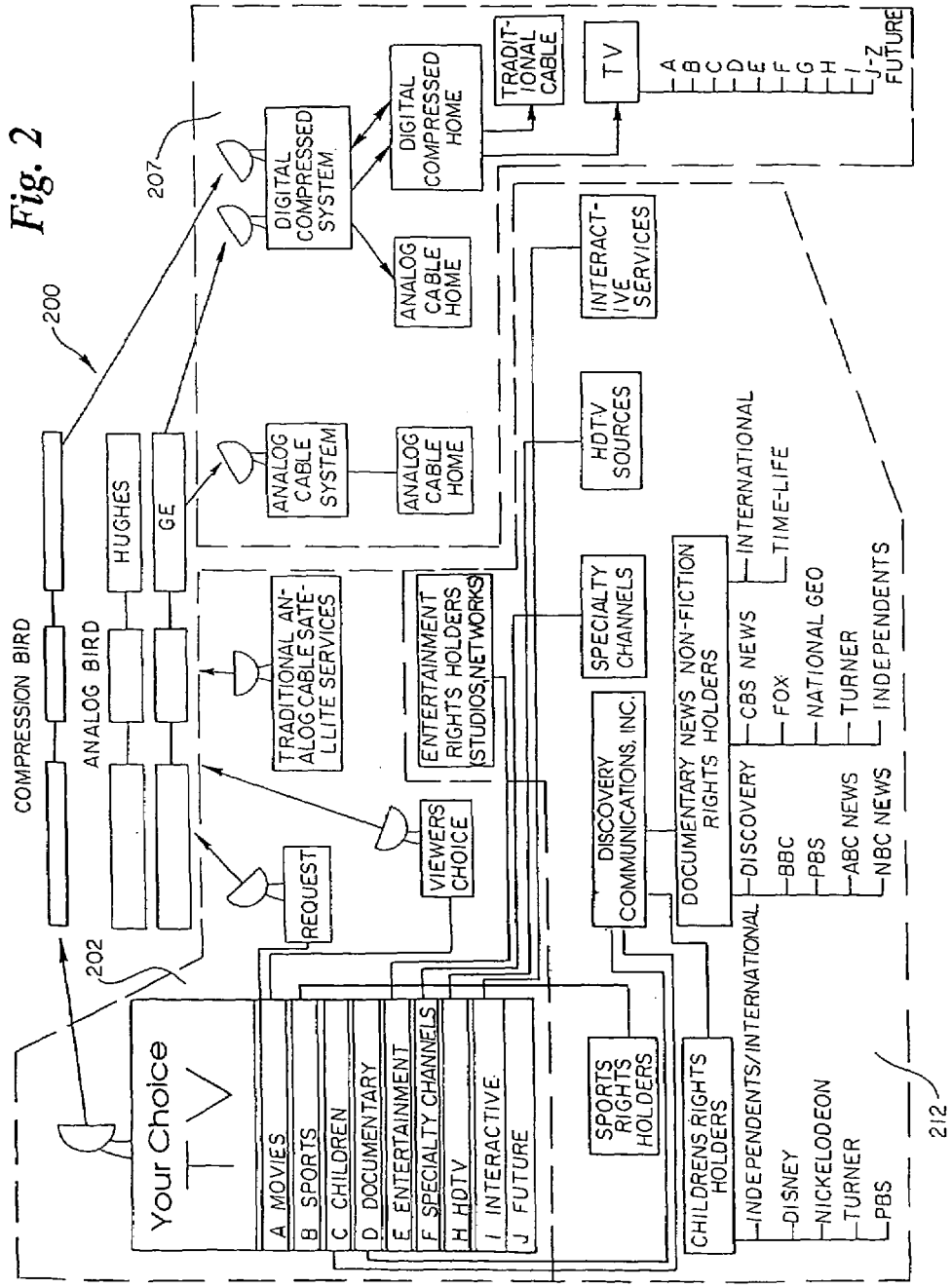
FIG. 2 is an overview of the television delivery system operations.

The operations center 202 performs two primary services, packaging television programs and generating the program control information signal. At the operations center 202, television programs are received from external program sources in both analog and digital form. FIG. 2 shows an embodiment of the operations center receiving signals from various external sources 212. Examples of the external program sources are sporting events, children's programs, specialty channels, news or any other program source that can provide audio or visual signals. Once the programs are received from the external program sources, the operations center 202 digitizes (and preferably compresses) any program signals received in analog form. The operations center 202 may also maintain an internal storage of programs. The internally stored programs may be in analog or digital form and stored on permanent or volatile memory sources, including magnetic tape or RAM. Subsequent to receiving programming, the operations center 202 packages the programs into the groups and categories which provide the optimal marketing of the programs to subscribers. For example, the operations center 202 may package the same programs into different categories and menus for weekday, prime-time viewing and Saturday afternoon viewing. Also, the operations center 202 packages the television programs in a manner that enables both the various menus to easily represent the programs and the subscribers to easily access the programs through the menus.

The packaging of the digital signals is typically performed at the operations center 202 by computer assisted packaging equipment (CAP). The CAP system normally includes at least one computer monitor, keyboard, mouse, and standard video editing equipment. A programmer packages the signals by entering certain information into the CAP. This information includes the date, time slot, and program category of the various programs. The programmer and the CAP utilize demographic data and ratings in performing the packaging tasks. After the programmer selects the various programs from a pool of available programs and inputs the requisite information, the programmer, with assistance from the CAP, can select the price and allocate transponder space for the various programs. After the process is complete, the CAP displays draft menus or program schedules that correspond to the entries of the programmer. The CAP may also graphically display allocation of transponder space. The programmer may edit the menus and transponder allocation several times until satisfied with the programming schedule. During the editing, the programmer may direct the exact location of any program name on a menu with simple commands to the CAP.

The packaging process also accounts for any groupings by satellite transponder which are necessary. The operations center 202 may send different groups of programs to different cable headends 208 and/or set top terminals 220. One way the operations center 202 may accomplish this task is to send different program packages to each transponder. Each transponder, or set of transponders, then relays a specific program package to specific cable headends 208 and/or set top terminals 220. The allocation of transponder space is an important task performed by the operations center 202.

The operations center 202 may also "insert" directions for filling local available program time in the packaged signal to enable local cable and television companies to fill the program time with local advertising and/or local programming. Consequently, the local cable headends 208 are not constrained to show only programs transmitted from the operations center 202. New set top converters will incorporate both digital and analog channels. Therefore, the cable headend 208 may combine analog signals with the digital signals prior to transmitting the program signals to the set top terminals 220.

After the CAP packages the programs, it creates a program control information signal to be delivered with the program package to the cable headend 208 and/or set top terminal 220. The program control information signal contains a description of the contents of the program package, commands to be sent to the cable headend 208 and/or set top terminal 220, and other information relevant to the signal transmission.

In addition to packaging the signal, the operations center 202 employs digital compression techniques to increase existing satellite transponder capacity by at least a 4:1 ratio, resulting in a four-fold increase in program delivery capability. A number of digital compression algorithms currently exist which can achieve the resultant increase in capacity and improved signal quality desired for the system. The algorithms generally use one or more of three basic digital compression techniques: (1) within-frame (intraframe) compression, (2) frame-to-frame (interframe) compression, and (3) within carrier compression. Specifically, in the preferred embodiment, the MPEG 2 compression method is used. After digital compression, the signals are combined (multiplexed) and encoded. The combined signal is subsequently transmitted to various uplink sites 204.

There may be a single uplink site 204 or multiple uplink sites (represented by 204', shown in phantom in FIG. 1) for each operation center 202. The uplink sites 204 may either be located in the same geographical place or may be located remotely from the operations center 202. Once the composite signal is transmitted to the uplink sites 204, the signal may be multiplexed with other signals, modulated, upconverted and amplified for transmission over satellite. Multiple cable headends 208 may receive such transmissions.

In addition to multiple uplinks, the delivery system 200 may also contain multiple operations centers. The preferred method for using multiple operations centers is to designate one of the operations centers as a master operations center and to designate the remaining operations centers as slave operations centers. In this configuration, the master operations center coordinates various functions among the slave operations centers such as synchronization of simultaneous transmissions and distributes the operations workload efficiently.

Figure 2A:
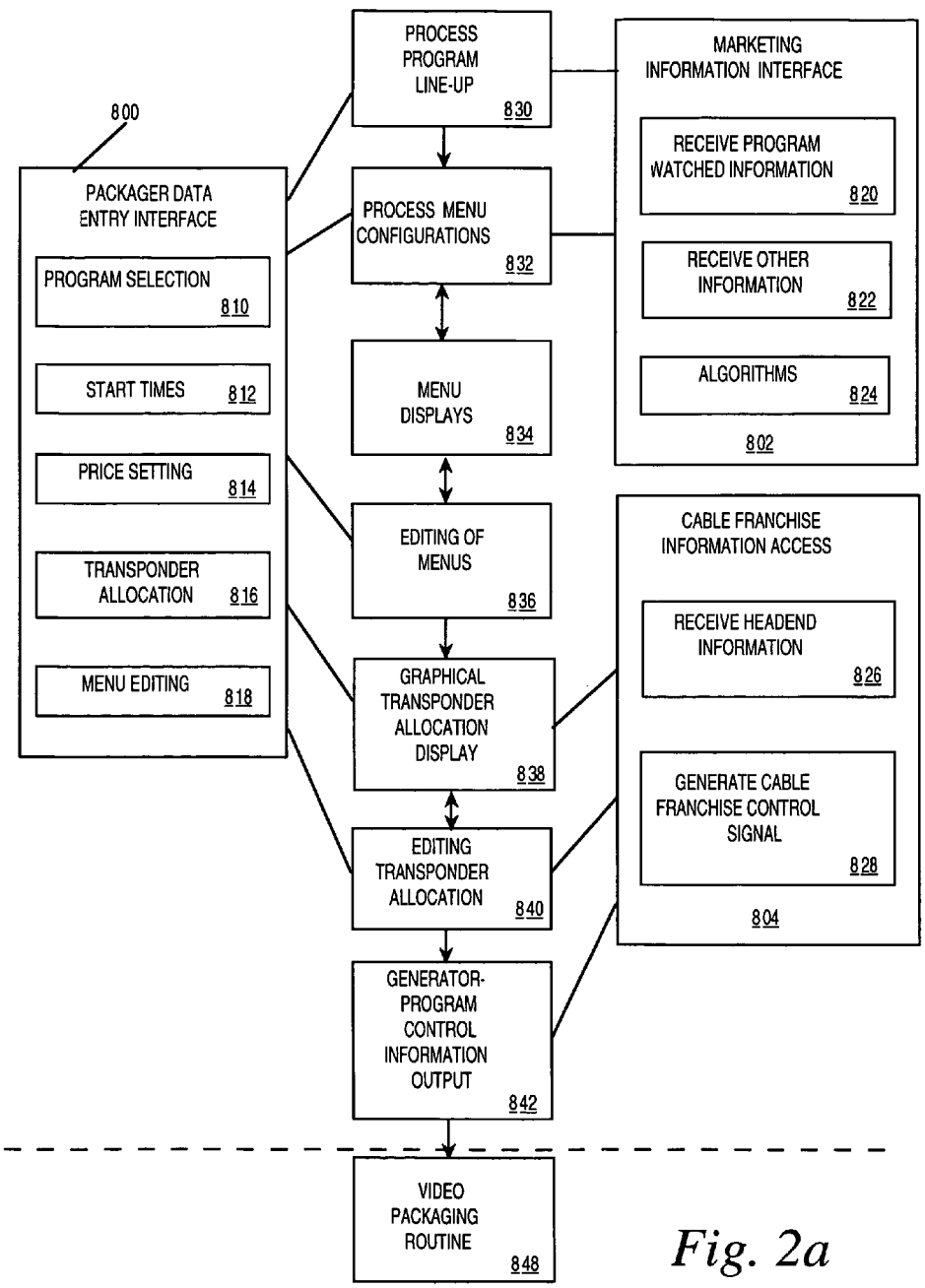
FIG. 2a is a schematic of the subroutines for the CAP software.

The operations center 202 may also receive information directly from the set top terminals 220. This information may be provided by way of telephone modems, cable modems and direct satellite uplinks at the set top terminal 220. The information may include information related to customers' viewing habits. Other information, such as extracts of customer purchases may be provided to the operations center 202. These extracts of information may be formatted and correlated with customer demographics for marketing purposes by a Marketing Information Interface (MII) 802. The MII 802 is shown in FIG. 2a. The Marketing Information Interface (MII) 802 subroutine interfaces the processing and editing subroutines with marketing data. This interface regularly receives programs watched information from billing sites 820, cable headends 208, or set top terminals 220. In addition, other marketing information 822 such as the demographics of viewers during certain time periods may be received by the MII 802. The MII 802 also uses algorithms 824 to analyze the program watched information and marketing data 820, 822, and provides the analyzed information to the processing and editing subroutines. In an embodiment, an Executive Information System (EIS) with a field management system is included in the MII 802 subroutine.

The process program line-up subroutine 830 uses information from the MII 804 and Packager Data Entry Interface (PDEI) 800 to develop a program line-up. Algorithms are used to assign programs in time slots.

Figure 2B:
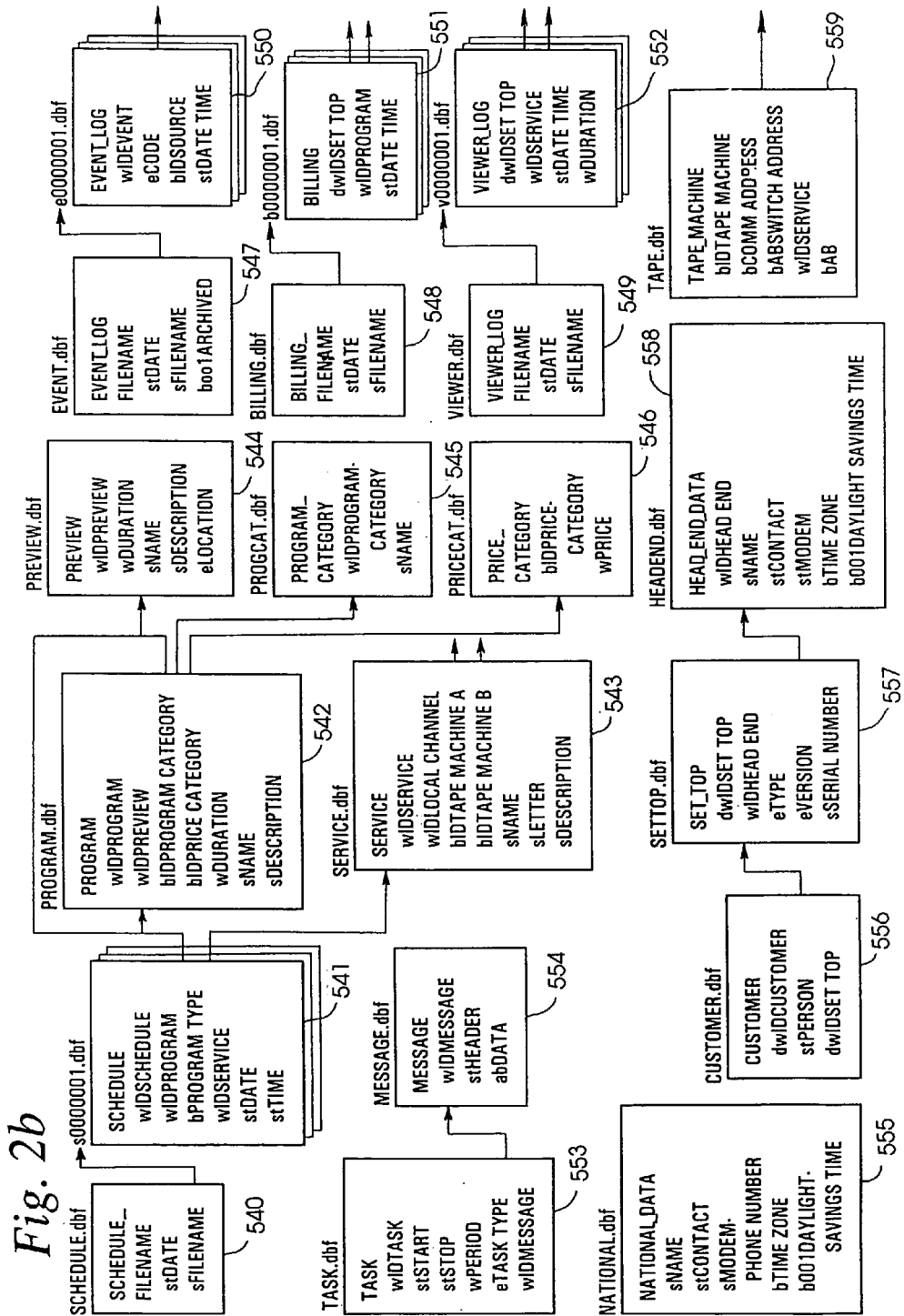
FIG. 2b is a diagram of the database structure for the databases supporting the operations of the CAP.

The operations center 202 may store information received from external sources, including set top terminals 220 in one or more databases. Following is an example of a database structure that can be used with the present invention. The database structure is shown diagrammatically in FIG. 2b. Each database file is listed below along with a description, record field details and explanation of relationships. The software data structures are defined after the description of the database structure.

The SCHEDULE Database file 541 contains scheduling data for a single day. There are many schedule files, one for each day of schedule information. The actual filename for a given days schedule is assigned under computer control. Schedules are broken up into single days so they may be easily created, dispatched and archived. A cross-reference of days to computer generated filenames is kept. Each scheduled event (either a program or a preview) has its own record entry and unique schedule ID This record references the corresponding scheduled program or preview and program type (either program or preview). The service to carry the scheduled program is also referenced. The starting date and time is also specified. Program duration is stored as a program attribute and is not included here. Note that program, preview and service records must be provisioned before they may be referenced in a schedule record.

Another SCHEDULE Database file 540 contains a cross-reference of starting dates data to computer generated filenames.

The PROGRAM Database file 542 contains Program records are contained in another database file 542, with each record representing a source program. Each program has a unique program ID. If the program has a corresponding preview, it is also referenced. Program category and price are also referenced. The structure of the program category database may be modified if multiple categories per program are desired. Program name, description and duration are also given. Note that preview, program category and price category records must be provisioned before they may be referenced in a program record.

The SERVICE Database file 543 contains service records with each record representing an available service. A service may be thought of as a virtual video channel. Virtual channels are non-existent channels which are mapped or created by hardware and software. Services are then mapped into local headend channels. Since initial distribution of video source material may be by "Federal Express" instead of a video channel, a service ID is used to identify the virtual channel being used for the desired service. "60 Minutes" could be distributed and then be mapped into any desired local headend channel. The service database exists at both the national site and at each local headend 208. Every service has a name, call letters and a description of the service. Every service also has an assigned local channel, "A" tape (or CD) machine ID and "B" tape (or CD) machine ID. Note that these last three parameters only apply to the service databases at the local headends 208. The local headend service database performs an equivalent function of a "channel map."

The PREVIEW Database file 544 contains preview records with each record representing a source preview. A preview is like a program that is scheduled and distributed over a service. It differs from a program in that multiple previews may be distributed over the same service at the same time. Also, previews are free. Each preview specifies its location on the TV screen. This is generally done by selecting from a menu of valid screen positions. Unlike programs, previews do not reference program and price categories or other previews.

The PROGRAM CATEGORY Database file 545 contains program category records with each record representing a valid program category. Examples of program categories are movies, sports, educational and news. Multiple program categories per program may be accommodated if desired with simple changes to the database structure.

The PRICE CATEGORY Database file 546 contains price category records with each record representing a valid price category. Price categories are used to provide pricing consistency throughout the system. It also provides flexibility at the headend 208 to price various categories differently should this be desired. For example, distributed movies may be assigned the price category "movie" at the national site. Each headend 208 could then charge differing amounts for their movies by manipulating their local price category database. If a current price structure needed to be changed, the change would be made once in the price category database instead of in each program record.

The EVENT LOG Database file 550 contains event data for a single day. There are many event files, one for each day of event information. The actual filename for a given days events is assigned under computer control. Events are broken up into single days so they may be easily archived. A cross-reference of days to computer generated filenames is kept.

Each event record contains a unique ID, an event code, ID of the process that generated the event and date/time stamp of the event.

The EVENT LOG FILENAME Database file 547 contains a cross-reference of start date to computer generated filenames.

The VIEWER LOG Database file 552 contains viewer log data for a single day. There are many viewer log files, one for each day of viewer log information. The actual filename for a given days viewer log data is assigned under computer control. Viewer log data is broken up into single days so it may be easily archived. A cross-reference of days to computer generated filenames is kept.

Each event record contains a unique ID, an event code, ID of the process that generated the event and date/time stamp of the event. The Marketing Information Interface 802 accesses the VIEWER LOG Database file as necessary to retrieve "program watched" information 820.

The VIEWER LOG FILENAME Database file 549 contains a cross-reference of date to computer generated filenames.

The BILLING Database file 551 contains billing data for a single day. There are many billing files, one for each day of billing information. The actual filename for a given days billing data is assigned under computer control. Billing data is broken up into single days so it may be easily archived. A cross-reference of days to computer generated filenames is kept.

Each event record contains a unique ID, an event code, ID of the process that generated the event and date/time stamp of the event.

The BILLING FILENAME Database file 548 contains a cross-reference of start date to computer generated filenames.

The NEWS FILENAME Database file 549 contains a cross-reference of date to computer generated filenames.

The SET TOP Database file 557 contains set top converter records with each record representing a unique set top converter. Each set top is assigned to a headend 208. Set-top type, software version and serial number is also stored. Note that headend records must be provisioned before they may be referenced in a set top record.

The HEAD END Database file 558 contains headend records with each record containing headend 208 data specific to a single headend 208. Each headend 208 has a name, contact name, address, phone number, modem information, time zone (relative to GMT) and daylight savings time flag. This information may be stored in a separate database file called Cable Franchise Configuration.

The NATIONAL Database file 555 contains a single record containing national site information. This includes site name, contact, modem information, time zone and daylight savings time flag.

The CUSTOMER Database file 556 contains customer records with each record containing customer data specific to a single customer. This includes personal information (name, address, phone number, . . . ) and assigned set top converter.

The TAPE MACHINE Database file 559 contains video tape or CD machine information. Each machine is assigned a unique ID, its control port address, its A/B switch address (if present), its assigned service and an A/B assignment. This database is only located at the headends 208.

The MESSAGE Database file 554 contains available system messages. They are detailed in nature and are pre-programmed. Each message has an associated function. To schedule a desired function, the appropriate message is referenced in the scheduler task list.

The TASK Database file 553 contains scheduled tasks to be performed periodically. It is used in conjunction with a scheduler process to control computer system functions such as data dispatch and retrieval, archival and database maintenance. Each task is assigned a unique ID, start time, stop time, period in minutes) and task type (single, periodic, round-robin). Functions are actually scheduled by scheduling the appropriate message to be sent to the appropriate process. Available messages are kept in a separate database. Note that these messages must be provisioned before they may be referenced in a task record.

4. Cable Headend

After the operations center 202 has compressed and encoded the program signals and transmitted the signals to the satellite, the cable headend 208 receives and further processes the signals before they are relayed to each set top terminal 220. Each cable headend site is generally equipped with multiple satellite receiver dishes. Each dish is capable of handling multiple transponder signals from a single satellite and sometimes from multiple satellites.

As an intermediary between the set top terminals 220 and the operations center 202 (or other remote site), the cable headend 208 performs two primary functions. First, the cable headend 208 acts as a distribution center, or signal processor, by relaying the program signal to the set top terminal 220 in each subscriber's home. In addition, the cable headend 208 acts as a network controller 214 by receiving information from each set top terminal 220 and passing such information on to an information gathering site such as the operations center 202.

Figure 3:
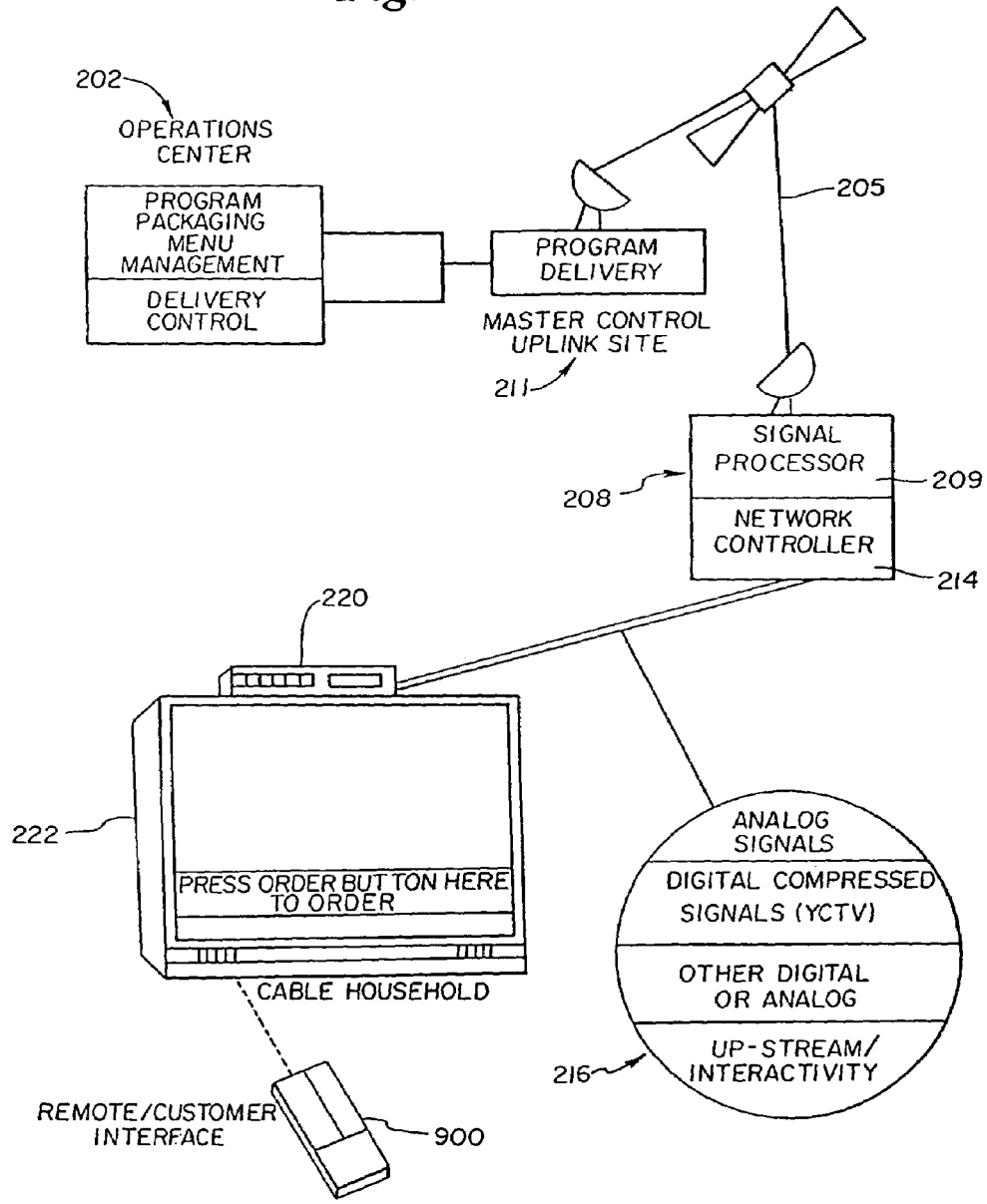
FIG. 3 is a schematic of the operation of the primary components of the system.

FIG. 3 shows an embodiment where the cable headend 208 and the subscriber's home are linked by certain communications media 216. In this particular embodiment, analog signals, digitally compressed signals, other digital signals and up-stream/interactivity signals are sent and received over the media 216. The cable headend 208 provides such signaling capabilities in its dual roles as a signal processor 209 and network controller 214.

As a signal processor 209, the cable headend 208 prepares the program signals that are received by the cable headend 208 for transmission to each set top terminal 220. In the preferred system, the signal processor 209 re-routes or demultiplexes and recombines the signals and digital information received from the operations center 202 and allocates different portions of the signal to different frequency ranges. Cable headends 208 which offer different subscribers different program offerings may allocate the program signals from the operations center 202 in various manners to accommodate different viewers. The signal processor 209 may also incorporate local programming and/or local advertisements into the program signal and forward the revised signal to the set top terminals 220. To accommodate this local programming availability, the signal processor 209 must combine the local signal in digital or analog form with the operations center program signals. If the local cable system uses a compression standard that is different than the one used by the operations center 202, the signal processor 209 must also decompress and recompress incoming signals so they may be properly formatted for transmission to the set top terminals 220. This process becomes less important as standards develop (i.e., MPEG 2). In addition, the signal processor 209 performs any necessary signal decryption and/or encryption.

As a network controller 214, the cable headend 208 performs the system control functions for the system. The primary function of the network controller 214 is to manage the configuration of the set top terminals 220 and process signals received from the set top terminals 220. In the preferred embodiment, the network controller 214 monitors, among other things, automatic poll-back responses from the set top terminals 220 remotely located at each subscribers' home. The polling and automatic report-back cycle occurs frequently enough to allow the network controller 214 to maintain accurate account and billing information as well as monitor authorized channel access. In the simplest embodiment, information to be sent to the network controller 214 will be stored in RAM within each subscriber's set top terminal 220 and will be retrieved only upon polling by the network controller 214. Retrieval may, for example, occur on a daily, weekly or monthly basis. The network controller 214 allows the system to maintain complete information on all programs watched using a particular set top terminal 220.

The network controller 214 is also able to respond to the immediate needs of a set top terminal 220 by modifying a program control information signal received from the operations center 202. Therefore, the network controller 214 enables the delivery system to adapt to the specific requirements of individual set top terminals 220 when the requirements cannot be provided to the operations center 202 in advance. In other words, the network controller 214 is able to perform "on the fly programming" changes. With this capability, the network controller 214 can handle sophisticated local programming needs such as, for example, interactive television services, split screen video, and selection of different foreign languages for the same video. In addition, the network controller 214 controls and monitors all compressors and decompressors in the system. The delivery system 200 and digital compression of the preferred embodiment provides a one-way path from the operations center 202 to the cable headend 208. In an embodiment, status and billing information is sent from the set top terminal 220 to the network controller 214 at the cable headend 208 and not directly to the operations center 202. Thus, program monitoring and selection control will take place only at the cable headend 208 by the local cable company and its decentralized network controllers 214 (i.e., decentralized relative to the operations center 202, which is central to the program delivery system 200). The local cable company will in turn be in communication with the operations center 202 or a regional control center (not shown) which accumulates return data from the set top terminal 220 for statistical or billing purposes. In alternative system embodiments, the operations center 202 and the statistical and billing sites are collocated. Further, telephone lines with modems are used to transfer information from the set top terminal 220 to the statistical and billing sites.

5. Set Top Terminal

The set top terminal 220 is the portion of the delivery system 200 that resides in the home of a subscriber. The set top terminal 220 is usually located above or below the subscriber's television, but it may be placed anywhere in or near the subscriber's home as long as it is within the range of the subscriber's remote control device 900. In some aspects, the set top terminal 220 may resemble converter boxes already used by many cable systems. For instance, each set top terminal 220 may include a variety of error detection, decryption, and coding techniques such as anti-taping encoding. However, it will become apparent from the discussion below that the set top terminal 220 is able to perform many functions that an ordinary converter box cannot perform.

The set top terminal 220 has a plurality of input and output ports to enable it to communicate with other local and remote devices. The set top terminal 220 has an input port that receives information from the cable headend 208. In addition, the unit has at least two output ports which provide communications from the set top terminal 220 to a television and a VCR. Certain menu selections may cause the set top terminal 220 to send control signals directly to the VCR to automatically program or operate the VCR. Also, the set top terminal 220 contains a phone jack which can be used for maintenance, trouble shooting, reprogramming and additional customer features. The set top terminal 220 may also contain stereo/audio output terminals and a satellite dish input port. Thus, the set top terminal is capable of receiving television programming, video and audio over a telephone line, a cable television cable and by satellite feed from a satellite.

Figure 4:
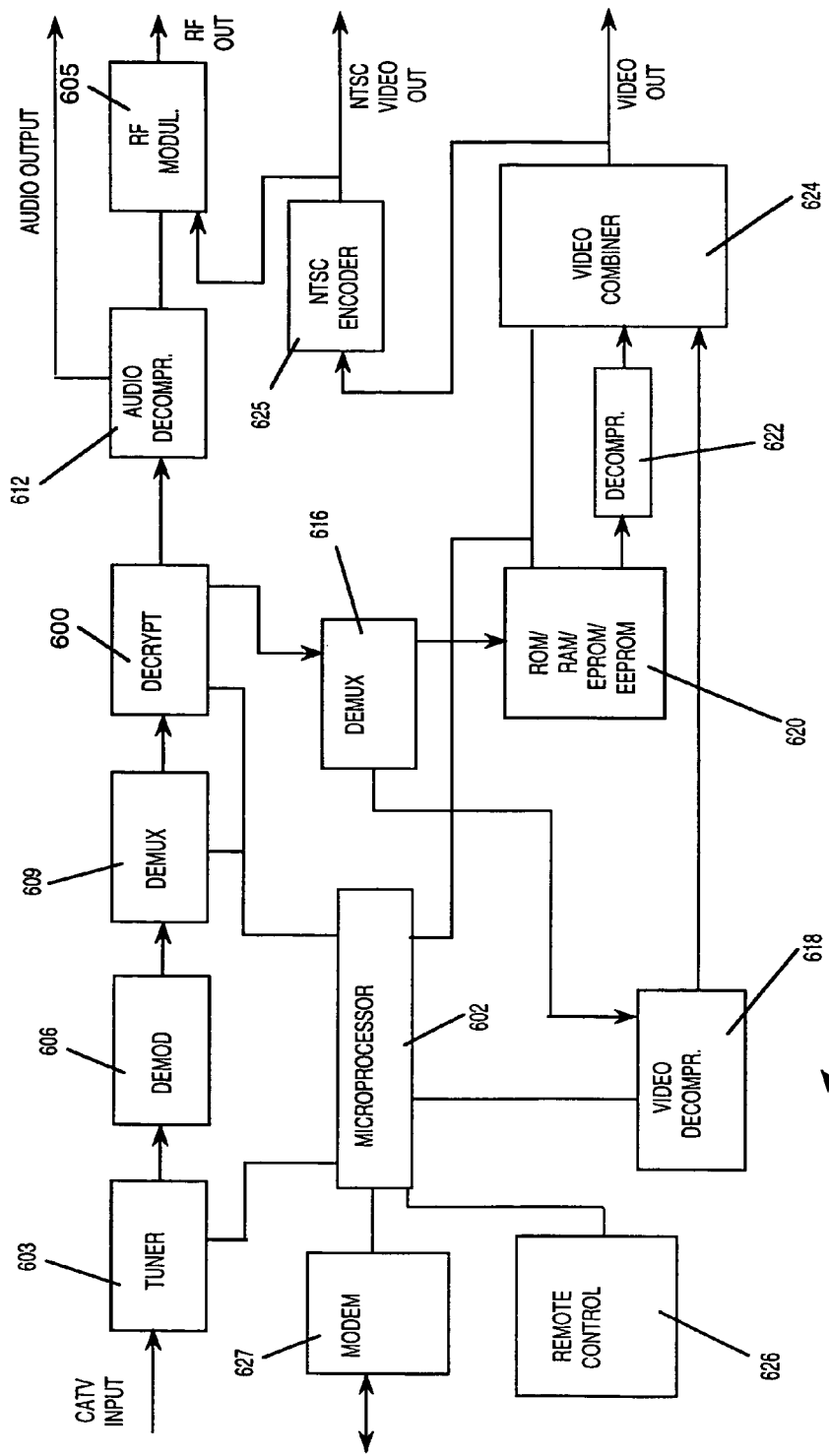
FIG. 4 is a diagram of the primary component of the set top terminal.

FIG. 4 shows the basic hardware components of the set top terminal 220. The set top terminal 220 has a tuner 603, digital demodulator 606, decryptor 600, and demultiplexers 609 and 616 as well as audio equipment 612 and a remote control interface 626 for receiving and processing signals from the remote control unit 900. An optional modem 627 allows communication between a microprocessor 602 and the cable headend 208. An NTSC encoder 625 provides a standard NTSC video output.

The microprocessor 602 is capable of executing program instructions stored in memory. These instructions allow a user to access various menus by making selections on a remote control (not shown in FIG. 4).

The manner in which the video is decompressed and the menus are generated from the program control information signal or STTCIS varies depending on the specific embodiment of the invention. Video decompressors 618 and 622 may be used if the video is compressed. The program control information signal may be demultiplexed into its component parts, and a video decompressor 618, graphic decompressor, text generator and video combiner 624 may be used to assist in creating the menus.

In addition to the menu format information that is stored in graphics memory, the set top terminal 220 also stores data tracking those programs that have been selected for viewing. By gathering this data, the set top terminal 220 can maintain an accurate record of all programs accessed/watched by storing the data in EEPROM or RAM. Subsequently, this data can be transmitted to the cable headend 208 or operations center 202, where it can be used in carrying out network control and monitoring functions. Such data transmissions between the set top terminal 220 and cable headend 208 or operations center 202 can be accomplished, for example, through upstream transmission over the cable network or over telephone lines through the use of telephone modems. Where upstream transmission over the cable network is used, the set top terminals 220 can complete data transmissions on a scheduled (e.g., using a polling response or status report to respond to polling requests sent from the cable headend 208 or operations center 202) or as-needed (e.g., using a random access technique) basis.

Figure 5A:
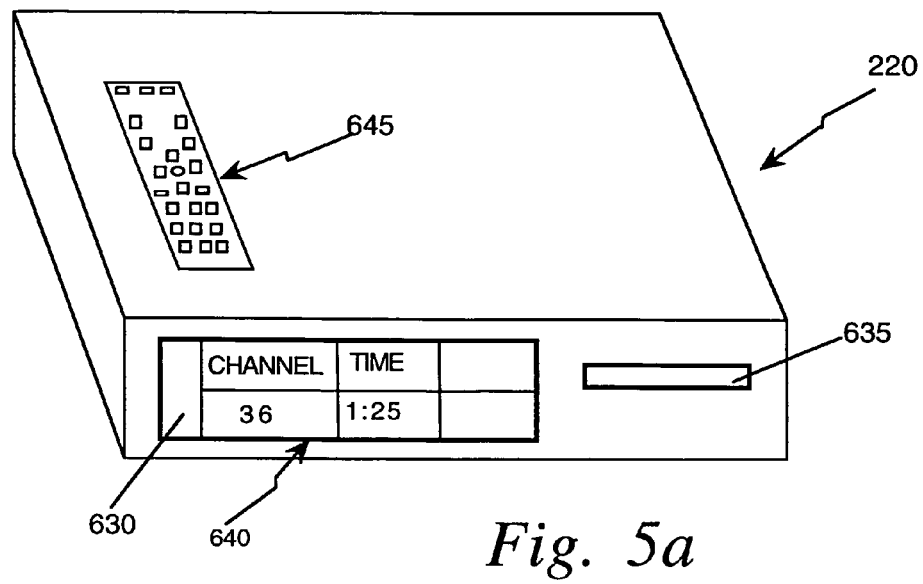
FIGS. 5a and 5b show front and rear views, respectively, of the set top terminal.

FIG. 5a shows the front panel of the set top terminal 220, which includes an infrared sensor 630 and a series of LED displays 640. In another embodiment, the infrared sensor 630 may be replaced with a radio-frequency sensor. The LED displays 640 may indicate with an icon or a letter (e.g. A-K) the major menu currently selected by the set top terminal 220 or the channels selected directly by a user, or menu channel selections (e.g., from 1 to 50). Further displays may include current channel, time, volume level, sleep time, parental lock (security), account balance, use of a hardware upgrade, second channel being recorded by VCR, use of the Level D music hardware upgrade in a separate room, and any other displays useful to a subscriber to indicate the current status of the set top terminal 220. The LEDs 640 may also provide an indication of the digital audio channel currently tuned.

The set top terminal 220 includes a flapped opening 635 on its front that allows the insertion of a magnetic cartridge (or similar portable storage device, including optical disk, ROM, EPROM, etc. not shown). This cartridge opening 635 allows the set top terminal 220 to be upgraded or reprogrammed locally with the use of a magnetic tape cartridge.

On the top or cover of the set top terminal 220 are located pushbutton controls 645. Any function that can be performed on the remote control (not shown) may also be performed at the set top terminal 220 using the duplicative pushbutton controls 645.

Figure 5B:
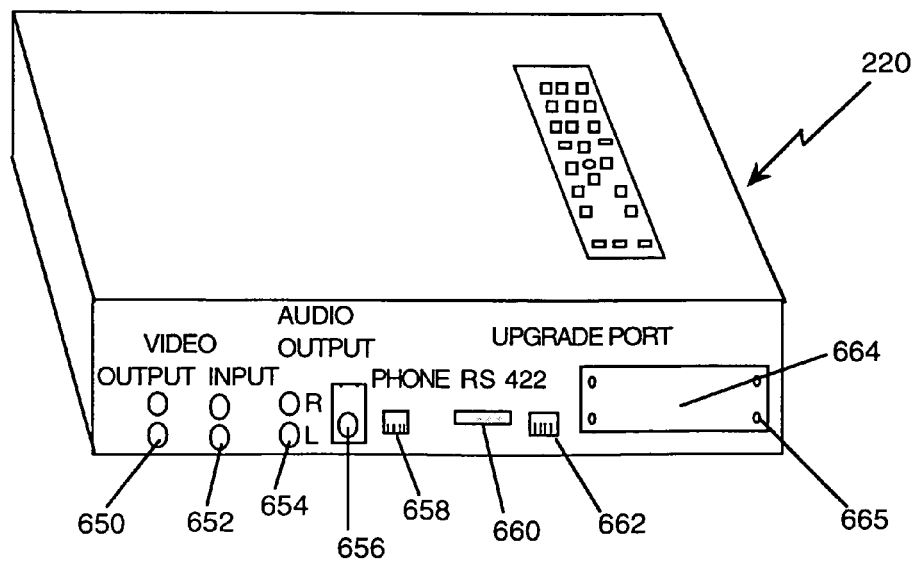

FIG. 5b shows the back of the set top terminal 220, which includes a pair of output terminals 650, pair of input terminals 652, pair of stereo/audio output terminals 654, satellite dish input port 656, telephone jack 658 and an RS-422 port 660. In addition, an upgrade port 662 and a cover plate 664 are held in place by a series of sheet metal screws. One of the output terminals 650 is for a television and the other is for a VCR. The set top terminal 220 is equipped to handle incoming signals on one or two cables using the input terminals 652. The phone jack 658 and an RS-232 or RS-422 port 660 are provided for maintenance, trouble shooting, reprogramming and additional customer features. In alternate embodiments, the telephone jack 658 may be used as the primary mode of communication between the cable headend 208 or operations center 202 and the set top terminal 220. This connection is possible through the local telephone, cellular telephone or a personal communications network (PCN).

The basic programming of each set top terminal 220 is located on ROM within the set top terminal 220. Random access memory, the magnetic cartridge capability, and the expansion card slot 635 each allow upgrades and changes to be easily made to the set top terminal 220.

In the preferred embodiment, the set top terminal 220 includes the hardware upgrade port 662, in addition to expansion card slots. The hardware upgrade port 662 accommodates a four-wire (or more) connection for: (1) error corrected, decrypted data output of the set top terminal 220, (2) a control interface, (3) decompressed video output, and (4) a video input port. In the preferred embodiment, multiple wires are used to perform each of the four functions. The four sets of wires are combined in a single cable with a single multipin connector.

In the preferred embodiment, multipin connections may be used for the multiwire cable. The multipin connection 662 may range from DB9 to DB25. A variety of small computer systems interface (SCSI) ports may also be provided. Alternatively, four or more ports may be provided instead of the single port depicted.

The hardware upgrade port 662 may be used to attach the various hardware upgrades described below to a set top terminal 220. The preferred embodiment has a number of hardware upgrades available for use with a set top terminal 220, including: (1) a Level A interactive unit, (2) a Level B interactive unit, (3) a Level C interactive unit with compact disc capability, (4) a Level D digital radio tuner for separate room use, and (5) a Level E information download unit. Each of these upgrades may be connected to the set top terminal 220 unit through the upgrade port 662 described earlier. The same four wires in a single cable described earlier may be used.

Existing set top converter boxes such as those made by Scientific Atlanta or General Instruments are presently unequipped to handle the menu selection system of the present invention. Thus, hardware modifications are necessary in order to use the menu selection system with existing set top converter technology.

Figure 6:
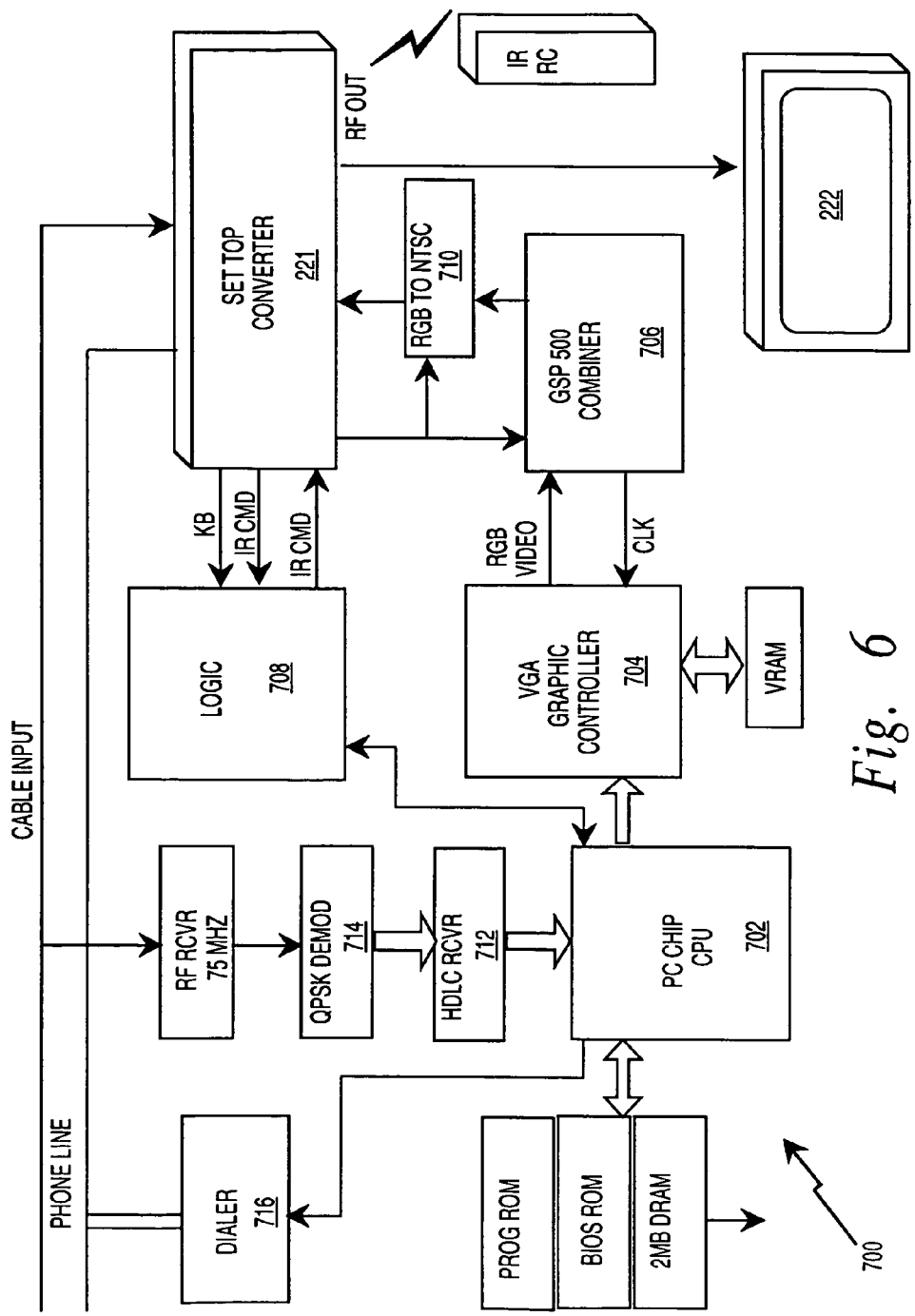
FIG. 6 is a diagram of a Turbo Card.

A Turbo Card addition to a set top converter is depicted in FIG. 6. The Turbo Card 700 shown provides the additional functionality needed to utilize the menu system with existing set top converter technology. The primary functions the Turbo Card 700 adds to the set top converter are the interpreting of program control information signals, generating of menus, sequencing of menus, and, ultimately, the ability of the viewer to select a channel through the menu system without entering any channel identifying information. The Turbo Card 700 also provides a method for a remote location, such as the cable headend 208, to receive information on programs watched and control the operation of the set top converter 221 and Turbo Card 700. The programs watched information and control commands may be passed from the cable headend 208 to the Turbo Card 700 using telephone lines.

The primary components of the Turbo Card 700 are a PC chip CPU 702, a VGA graphic controller 704, a video combiner 706, logic circuitry 708, NTSC encoder 710, a receiver 712, demodulator 714, and a dialer 716. The Turbo Card 700 operates by receiving the program control information signal from the cable headend 208 through the coaxial cable. The logic circuitry 708 of the Turbo Card 700 receives data, infrared commands, and synchronization signals from the set top converter 221. Menu selections made by the viewer on the remote control 900 are received by the set top converter's IR equipment and passed through to the Turbo Card 700. The Turbo Card 700 interprets the IR signal and determines the program (or menu) the viewer has selected. The Turbo Card 700 modifies the IR command to send the program selection information to the set top converter 221. The modified IR command contains the channel information needed by the set top converter 221. Using the phone line and dialer 716, the Turbo Card 700 is able to transmit program access information to the cable headend 208.

Functionally, the set top terminal 220 is the last component in the delivery system chain. The set top terminal 220 receives compressed program and control signals from the cable headend 208 (or, in some cases, directly from the operations center 202). After the set top terminal 220 receives the individually compressed program and control signals, the signals are demultiplexed, decompressed, converted to analog signals (if necessary) and either placed in local storage (from which the menu template may be created), executed immediately, or sent directly to the television screen.

After processing certain signals received from the cable headend 208, the set top terminal 220 is able to store menu templates for creating menus that are displayed on a subscriber's television by using an array of menu templates. Before a menu can be constructed, menu templates must be created and sent to the set top terminal 220 for storage. A microprocessor uses the control signals received from the operations center 202 or cable headend 208 to generate the menu templates for storage. Each menu template may be stored in volatile memory in the set top terminal 220. When the set top terminal receives template information it demultiplexes the program control signals received from the cable headend 208 into four primary parts: video, graphics, program logic and text. Each menu template represents a different portion of a whole menu, such as a menu background, television logo, cursor highlight overlay, or other miscellaneous components needed to build a menu. The menu templates may be deleted or altered using control signals received from the operations center 202 or cable headend 208.

Once the menu templates have been stored in memory, the set top terminal 220 can generate the appropriate menus. In the preferred embodiment, the basic menu format information is stored in memory located within the set top terminal 220 so that the microprocessor may locally access the information from the set top terminal instead of from an incoming signal. The microprocessor next generates the appropriate menus from the menu templates and the other menu information stored in memory. The set top terminal 220 then displays specific menus on the subscriber's television screen that correspond to the inputs the subscriber selects.

If the subscriber selects a specific program from a menu, the set top terminal 220 determines on which channel the program is being shown, demultiplexes and extracts the single channel transmitted from the cable headend 208. The set top terminal 220 then decompresses the channel and, if necessary, converts the program signal to an analog NTSC signal to enable the subscriber to view the selected program. The set top terminal 220 can be equipped to decompress more than one program signal, but this would unnecessarily add to the cost of the unit since a subscriber will generally only view one program at a time. However, two or three decompressors may be desirable to provide picture-on-picture capability, control signal decompression, enhanced channel switching or like features.

In addition to menu information, the set top terminal 220 may also store text transmitted from the cable headend 208 or the operations center 202. The text may inform the subscriber about upcoming events, billing and account status, new subscriptions, or other relevant information. The text will be stored in an appropriate memory location depending on the frequency and the duration of the use of the textual message.

Optional upgrades to enhance the performance of a subscriber's set top terminal 220 may also consist of a feature offered by the cable headend 208 or operations center 202 to which the user may subscribe. Available upgrades may include on line database services, interactive multi-media services, access to digital radio channels, and other services.

In the simplest embodiment, available converter boxes such as those manufactured by General Instruments or Scientific Atlanta, may be modified and upgraded to perform the functions of a set top terminal 220. The preferred upgrade is a circuit card with a microprocessor which is electronically connected to or inserted into the converter box.

6. Remote Control Device

Figure 7:
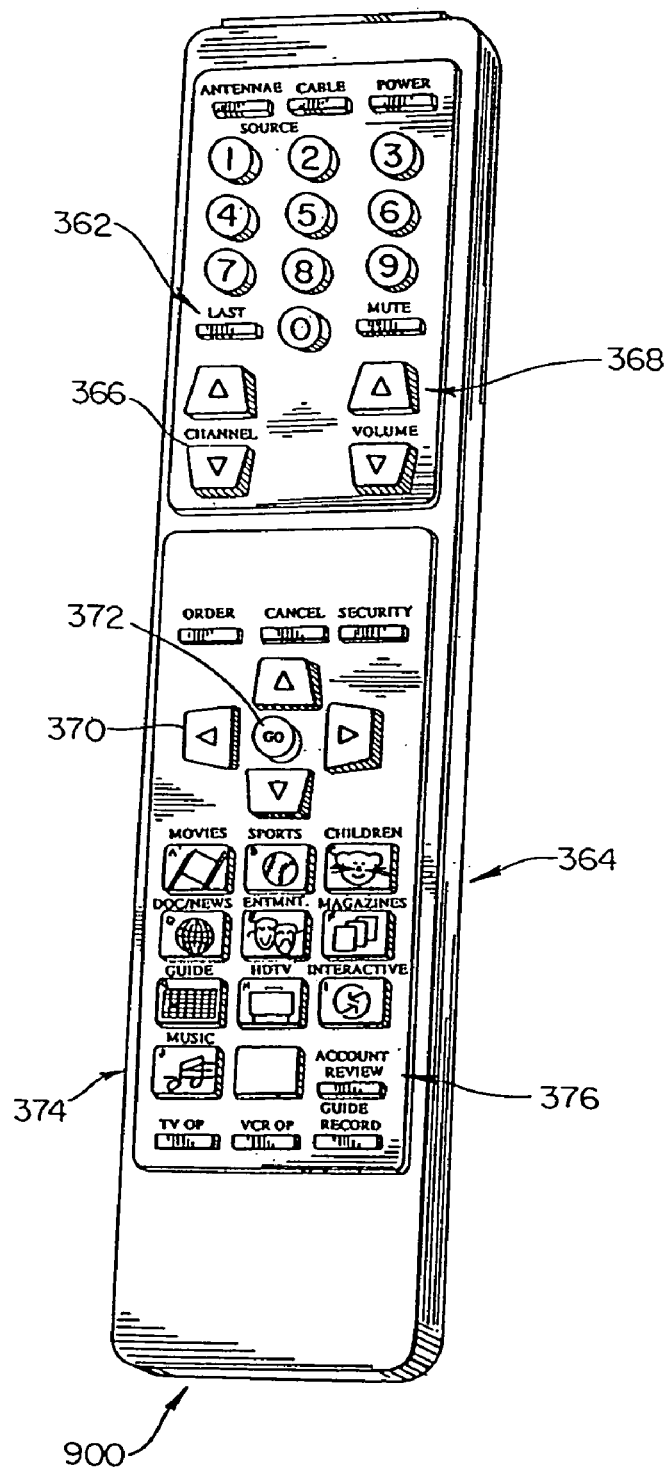
FIG. 7 is a perspective view of a remote control.

FIG. 7 shows an embodiment of the remote control 900 for use in the present invention. The standard television receiver remote control switches or buttons 362 are separated from the menu accessing ordering function buttons 364. The standard television receiver remote control buttons 362 include volume control, channel select, power and signal source buttons. The menu buttons 364 include cursor movement and select, menu select, and pay television buttons. However, the standard buttons 362 are separated from the menu access and ordering buttons 364 in the longitudinal direction of the remote, as opposed to the width-wise separation. Additionally, the color of the buttons or the surrounding background may differ between the standard television remote control buttons 362 and the menu buttons 364 to visually differentiate between these two groups of buttons.

The width and depth of the remote control unit 900 are considerably less than the length to allow the remote control unit 900 to fit easily within a user's palm. The remote control unit 900 in preferably has the center of mass balanced substantially near the longitudinal middle. This allows a user's thumb to naturally be placed in substantially the middle portion of the remote control unit 900, when it is picked up by a user.

Since the center of mass of the remote control unit 900 is placed substantially near the longitudinal middle of the remote 900, thereby having a user's thumb naturally fall in this same center region, the standard remote 362 and menu access 364 switches or buttons most frequently accessed and depressed by a user are placed within easy reach of the user's thumb. Channel and volume increment and decrement buttons are placed near this center of mass and longitudinal center line. The channel buttons are preferably beveled in opposing directions to allow a user to feel for and press a desired button without looking down at remote 900. Similarly, the volume buttons are preferably beveled in opposing directions for the same reason.

Additionally, the channel buttons could have a surface texture different from those of the volume buttons to allow even easier differentiation between channel and volume buttons. For example, the volume buttons could have a rough surface texture, while the channel buttons could have a smooth surface texture.

Also placed in the longitudinal center, within easy reach of a user's thumb, are cursor movement buttons 370 and "go" button 372. The "go" button 372 selects an option corresponding to the placement of the cursor. As opposed to buttons, a joystick may be used with a selection on the stick, or a trackball, depressible for selecting a desired choice. The cursor buttons 370 are placed ninety degrees apart, with the "go" button 372 placed within the center of the cursor movement buttons 370, as shown in FIG. 7. The cursor movement buttons 370 are preferably beveled inwardly toward the "go"

button 372. The "go" button 372 is recessed below the level of the cursor movement buttons 370 so that it is not accidentally pressed while depressing the cursor movement buttons 370. In addition to the beveling on the cursor movement buttons 370, they may also have a surface texture to allow a user to feel for and select the appropriate button without looking down at the remote 900. Directional arrows could be raised or recessed on the surface of the cursor movement buttons 370 for this purpose.

Menu select buttons 374 are placed near buttons 370 as shown in FIG. 7. Menu select buttons 374 are preferably the largest buttons on remote 900. Menu select buttons 374 preferably have icons or other graphics imprinted on their top surface or adjacent to the corresponding button. For example, a button for the sports major menu may contain a baseball icon. The icons represent the programming available on the particular major menu selected by the menu select buttons 374. The icons may also be raised above the level of the menu select buttons to provide a textured surface. This would allow a user to select an appropriate menu button 374 by feel, without looking at the remote control unit 900. The icons would require substantial differences in texture, while still providing a meaningful graphic related to the associated menu.

As shown in FIG. 7, labels and icons are provided for the following major menus: movies, sports, children's programming, documentary/news, entertainment, magazines, programming guide, HDTV (high definition television), interactive TV, music, and an additional button for further programming. Menu select buttons 374 may also be labeled A through J for the above programs, with the last button for all additional major menus labeled K-Z.

Although remote 900 is described with a variety of channel selection buttons, nearly all buttons from a standard remote control (section 362 buttons) could be eliminated. The present invention would allow a subscriber to use a remote control 900 containing only menu select buttons 374 and/or cursor movement and select buttons, 370, 374, respectively.

As used herein, "button" is contemplated to include all manner of switches or touch sensitive circuitry to activate a particular function in the remote control unit 900. Additionally, although the remote control unit 900 communicates with the set-top box by means of infrared transmission, other forms of communication are contemplated including ultrasound, radio frequency and other electromagnetic frequency communication.

7. Menu-Driven Program Selection

The menu-driven scheme provides the subscriber with one-step access to all major menus, ranging from hit movies to sport specials to specialty programs. From any of the major menus, the subscriber can in turn access submenus and minor menus by cursor or alpha-character access.

There are two different types of menus utilized by the preferred embodiment, the Program Selection menus and the During Program menus. The first series of menus, Program Selection menus, consists of an Introductory, a Home, Major menus, and Submenus. The second series of menus, During Program menus, consists of two primary types, Hidden menus and the Program Overlay menus.

Immediately after the subscriber turns on the set top terminal 220, the Introductory menu welcomes the subscriber to the system. The Introductory menu may display important announcements from the local cable franchise, advertisements from the cable provider, or other types of messages. In addition, the Introductory menu can inform the subscriber if the cable headend 208 has sent a personal message to the subscriber's particular set top terminal 220.

After the Introductory menu has been displayed the subscriber may advance to the next level of menus, namely the Home menu. In the preferred embodiment, after a certain period of time, the cable system will advance the subscriber by default to the Home menu. From the Home menu, the subscriber is able to access all of the programming options. The subscriber may either select a program directly by entering the appropriate channel number from the remote control 900, or the subscriber may sequence through incremental levels of menu options starting from the Home menu. The Home menu lists categories that correspond to the first level of menus called Major menus.

If the subscriber chooses to sequence through subsequent menus, the subscriber will be forwarded to the Major menu that corresponds to the chosen category from the Home menu. The Major menus further refine a subscriber's search and help guide the subscriber to the selection of his choice.

From the Major menus, the subscriber may access several submenus. From each submenu, the subscriber may access other submenus until the subscriber finds a desired television program. Similar to the Major menu, each successive level of Submenus further refines the subscriber's search. The system also enables the subscriber to skip certain menus or submenus and directly access a specific menu or television program by entering the appropriate commands on the remote control 900.

The During program menus (including Hidden Menus and Program Overlay Menus) are displayed by the set top terminal 220 only after the subscriber has selected a television program. In order to avoid disturbing the subscriber, the set top terminal 220 does not display the Hidden Menus until the subscriber selects the appropriate option to display a Hidden Menu. The Hidden Menus contain options that are relevant to the program selected by the viewer. For example, a Hidden Menu may contain options that enable a subscriber to enter an interactive mode or escape from the selected program.

Program Overlay Menus are similar to Hidden Menus because they occur during a program and are related to the program being viewed. However, the Program Overlay Menus are displayed concurrently with the program selected by the subscriber. Most Program Overlay Menus are small enough on the screen to allow the subscriber to continue viewing the selected program comfortably.

B. Network Controller Description

1. Monitoring and Control of Set Top Terminals

Figure 8:
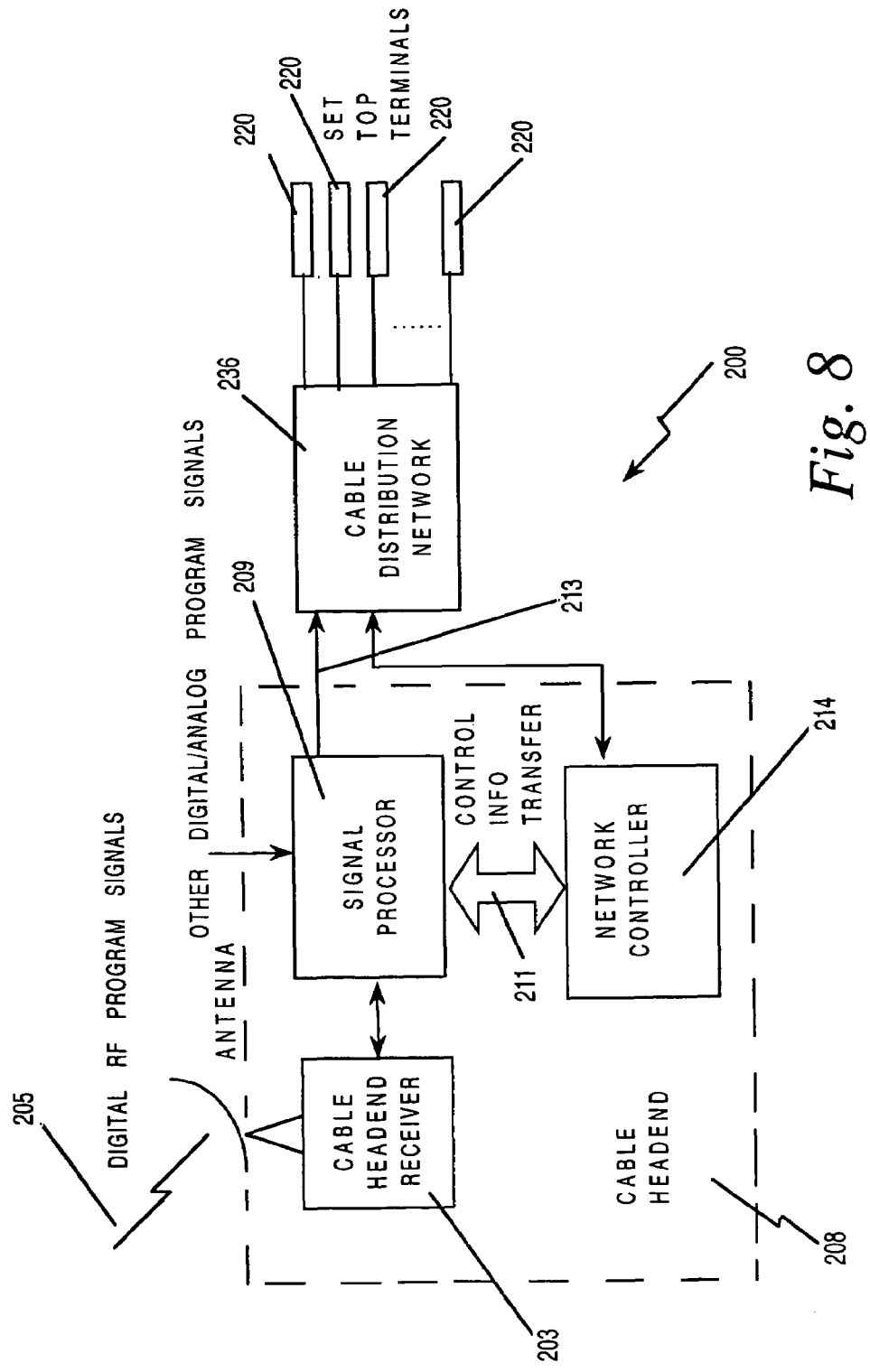
FIG. 8 is a diagram of the primary components of the cable headend.

FIG. 8 shows the network controller 214 of the present invention as part of a digital cable headend 208 operating in an expanded cable television program delivery system, indicated generally at 200. The network controller 214 monitors program selections at subscribers' homes, maintains accurate account and billing information and authorizes both subscriber channel access and particular set top terminals 220 to operate in the system.

The network controller 214 performs its monitoring and control capability by working with other system components housed, in part, within the cable headend 208. These cable headend components include a cable headend receiver 203 and a signal processor 209. As shown in the FIG. 8, digital RF program signals 205 are received and processed for further distribution to a subscriber's home through a set top terminal 220. The program signals 205 are digitally compressed and multiplexed signals that may be processed at the cable headend 208 or simply passed through to the cable distribution network. In the embodiment shown in FIG. 8, the program signals 205 are received by the cable headend receiver 203 and transmitted to the signal processor 209.

The signal processor 209 prepares the program signals 205 that are received by the cable headend 208 for transmission to each set top terminal 220. In the preferred system, the network controller 214 supervises and, in some cases, instructs the signal processor 209 in routing the signals to subscribers. In this way, the network controller 214 and signal processor 209 work with one another to perform basic control functions in the cable television system 200. Typically, this work is accomplished by the transfer of control information, represented at 211, between the network controller 214 and the signal processor 209.

Although it is preferred that the signal processor 209 and network controller 214 be co-located at the cable headend 208, the network controller 214 may be remotely located from the cable headend 208, as long as it remains in communication with the signal processor 209 in order to exchange control information 211.

In many instances, the program signals 205 received from the operations center 202 must be modified prior to being sent to the set top terminals 220. These modifications to the program control information 211 are made by the network controller 214 working in conjunction with the signal processor 209 to send a set top terminal control information stream (STTCIS). From the signal processor 209, the network controller 214 receives the program signals 205, which include cable franchise specific information added by the operations center 202. The network controller 214 modifies the program signals 205, if necessary, and communicates the new information back to the signal processor 209. The signal processor 209 then forwards the information to the set top terminal 220 in the form of the STTCIS, arrow 213. In most instances, the network controller 214 will modify the program signals 205 by adding additional information; however, the program signals 205 can be passed through the cable headend 208 to the set top terminal 220 without any modification.

The signal processor 209 and network controller 214 are both capable of handling the addition of simple local availabilities (e.g., local advertisements) into the signal sent to the set top terminal 220. The network controller 214 is also capable of handling more sophisticated local programming needs such as targeting video commercials, infomercials, interactive programming and certain data services. The network controller 214 receives all electronic signals sent by the set top terminal 220, including those sent in response to interactive service requests and some data service requests. The network controller 214 coordinates the necessary switching and access to allow the subscriber to enjoy these services.

The network controller 214 has the capability of performing "on the fly programming" changes, assisting in (i) dividing portions of subscriber's television screens (split screen video), (ii) selecting different audio signals for the same video (foreign languages), and (iii) interactive features. In addition, the network controller can create programming changes. For last minute changes to programming (such as for a local emergency or important regional events), an operator using the network controller 214 can modify the program signals 209 "on the fly" and change menus available to the subscriber. This accommodates short notice changes to program packaging that cannot be handled by the operations TV center 202 in advance.

For example, the network controller 214 may know the demographics of its subscribers through a database generated, in part, from prior subscriber choices, an interactive selection, or other means. Using the demographics information, the network controller 214 may target commercials to the correct audience by showing different commercials to subscriber's with different demographics. Information on programs watched may also be used to target commercials.

The subscriber may be shown menus of programs available in the subscriber's native language. The function of choosing the correct audio to correspond to the selected language may be handled by either the set top terminal 220 or the network controller 214 depending upon the configuration. Local programming in several languages or additional audio channels for a foreign language translation of a popular television program may be provided by the network controller 214. Using a picture-on-picture feature, sign language may be similarly made available to certain set top terminals 220 for the deaf. The sign language video may be transmitted to the set top terminal 220 on a separate channel. Also, a text overlay for the deaf may be easily produced on the lower part of the screen. The control signals for producing the text overlay may be handled by the network controller 214.

In other embodiments, the network controller 214 can act as a central computer and provide intra-set top terminal interactive games, inter-set top terminal interactive games, computer bulletin board type services, message services (Electronic mail), etc. For example, a subscriber may play war games with six of his (anonymous) fellow subscribers each in their own home each operating a separate tank. The network controller 214 gathers the players using set top terminal 220 communications and acts as the referee. The network controller software "plays" the game and generates the video control signals to be transmitted to the set top terminals 220. From the video control signals, the set top terminal generates a view of the playing field and shows movement of the tanks. Using a similar method, a bulletin board or message system can be set up to discuss a particular program such as "Twin Peaks Whodunit" for enthusiasts with set top terminals 220.

2. Monitoring and Control of Cable Headend Signal Processor

FIG. 9 shows the network controller's major components and how these components relate with other components of the cable system 200. The network controller's internal components include a network controller CPU 224, databases 226, control receiver 228, local memory 230 and telephone modem 232. The network controller's CPU 224 and databases 226 may be accessed through an operator control station, which may include peripherals such as a computer workstation, CRT display, and printer, represented by the workstation 234.

Information required to operate the network controller 214 will be stored in databases 226 and local memory 230 (e.g., either in RAM, ROM, or magnetic or optical Read/Write devices) at the cable headend 208 as well as in memory (RAM and/or ROM) within each subscriber's set top terminal 220. In the preferred embodiment, two-way communications between the network controller 214 and set top terminal 220 will occur over cable lines. Many other methods of communication, including those which do not require cables or wires, may be used with the present invention. Using two-way communication, interactive television programming can be accommodated through the network controller 214. In addition, the preferred network controller 214 will be able to access set top terminals 220 via phone lines for trouble shooting, special features or sophisticated reprogramming.

The network controller CPU 224 controls the interface, depicted at 211, between the network controller 214 and the signal processor 209. This interface 211 allows control information to flow or transfer between the two cable headend 208 components. Standard RS-232 or RS-422 links, an IEEE-488 bus or other interface media may be used. During standard operation, program control information is passed through this interface 211 to the network controller CPU 224 from the signal processor 209 (i.e., the program control information having been sent to the signal processor 209 over satellite from the operations center 202 with the RF program signals 205, not shown in FIG. 9). The network controller CPU 224 processes the program control information based on data stored in the network control databases. This processing includes modifying the program control information to accommodate regional programming needs.

After processing, the network controller CPU 224 passes the program control information, including any modifications, back to the signal processor 209 for distribution over the cable system 200, via the cable distribution network 236. In this fashion, the network controller 214 provides programming and network control instructions to the set top terminals 220 through the signal processor 209.

The processing of program control information by the network controller CPU 224 can also make use of any data received by the network controller's control receiver 228. The control receiver 228 is a microprocessor-based device that receives "status reports" directly from the set top terminals 220. The status reports received by the control receiver 228 generally include information that allows the network controller 214 to track, among other things, a subscriber's program access history, as described below. The control receiver 228 can store the status reports internally in a local storage or memory device and transfer them to the network controller CPU 224. Typically, the control receiver 228 is interfaced with the network controller CPU 224 using standard RS-232 or RS-422 links, an IEEE-488 bus or the like.

In the preferred embodiment, the network controller CPU 224 scans the control receiver 228 at a predetermined rate (e.g., once every few seconds) to initiate the status report transfer. Upon transfer, the network controller CPU 224 adds the data and control information in the status reports to the network control databases 226 by: checking for changes in previously received status information, processing the new information and updating the corresponding parameters in the network control databases 226. The network controller 214 processes the information stored in its databases with any program control information relayed through the signal processor 209 from the delivery system's operations center 202. This processing capability allows the network controller 214 to modify prior control signals and create new ones. The network controller 214 transfers both modified and unmodified control signals, along with any local combined program signals 205, to the signal processor 209 to be combined with others program signals 205 for distribution over the cable system 200.

3. Modifying the Program Control Information Signal

Tables A-C, described below, provide an example of some information that can be sent in the program control information signal to the set top terminals 220. The program control information signal generated by the operations center 202 provides data on the scheduling and description of programs. The program control information signal may be sent through the network controller 214 or, in an alternate configuration, directly to the set top terminal 220 for display to the subscriber. In the preferred embodiment, the program control information signal is stored and modified by the network controller 214 and sent to the set top terminal 220 in the form of a set top terminal control information stream (STTCIS). This configuration can accommodate, among other things, differences in individual cable systems and possible differences in set top terminal 220 devices.

The set top terminal 220 integrates either the program control signal or the set top terminal control information stream together with data stored in the memory of the set top terminal 220, to generate on-screen menu displays for assisting the subscriber in choosing programs for viewing. (Throughout the description the term "program control information" is being used to indicate control information coming from the cable headend 208 to the set top terminal 220, whether it is sent directly from the operations center 202, processed by the network controller 214 and then forwarded to the set top box (STTCIS), or transmitted over telephone lines.)

The types of information that can be sent using the program control signal includes: number of program categories, names of program categories, what channels are assigned to a specific category (such as specialty channels), names of channels, names of programs on each channel, program start times, length of programs, description of programs, menu assignment for each program, pricing, whether there is a sample video clip for advertisement for the program, and any other program, menu or product information. In addition, the program control information signal may be used periodically to reprogram or reconfigure a set top terminal 220 or group of set top terminals 220 (described in detail in co-pending patent application U.S. Pat. No. 5,798,785, entitled, REPROGRAMMABLE TERMINAL FOR SUGGESTING PROGRAMS OFFERED ON A TELEVISION PROGRAM DELIVERY SYSTEM, filed by the same assignee incorporated herein by reference).

The goal of the menu driven program selection system 200 used with the present invention is to allow the subscriber to choose a program by touring through a series of menus utilizing the remote control 900 (FIG. 3) or similar device providing cursor movement. The final choice in the series of menus will identify one particular channel and one time for activation of that channel. Armed with a channel and activation time, the set top terminal 220 can display the selected program on the television for the viewer. To achieve this goal one embodiment of the present invention assigns an intelligent alpha-numeric code to each program. This alpha-numeric code identifies the category of the program, the menu in which the program should be displayed, its transmission time(s), and the position on the menu that the program should be displayed.

In this embodiment, the program control information, including menu codes, is sent continuously from the operations center 202 to the network controller 214, and ultimately to the set top terminal 220. For example, four hours worth of programming information can be sent via the program control information signal continuously using the information shown in Tables A-C.

Table A shows the basic programming information that may be sent to the set top terminal 220. The program descriptions shown are coded abbreviations. For example, C for comedy, N for news, S for sports, A for cartoons, and TX for text. If there is a textual description for a program, such as a movie, the description may be given following that program's coded description or may be communicated following the four hours' worth of programming information. As is shown in the coded listing, program descriptions for programs greater than a half hour in length need not be repeated (each half hour). The video description code informs the set top terminal 220 of whether there is still or live video available to advertise the program.

For example, a sporting program may be assigned a code of B35-010194-1600-3.25-Michigan St. vs. USC. The letter B would assign the program to category B, sports. The second alpha-numeric character number 3 would assign the program to the third menu of the sports category. The third character of the code, number 5, assigns the program to the fifth program slot on the third menu. The next six characters, Jan. 1, 1994, represent the date. The following four characters, 1600 represent the start time which is followed by the length of the program and the program name. This entry represents a sports show, a college football game, which will be aired at 4:00 PM on New Years day 1994.

In the 12:30 Channel 1 entry of Table A, two menu codes are shown. By allowing two menu codes, programs that may fit under two different category descriptions may be shown in both menus to the subscriber. With this minimal amount of information being communicated to the set top terminal 220 on a regular basis, the terminal is able to determine the proper menu location for each program and the proper time and channel to activate for the subscriber after his menu selection.

TABLE A

| *Program name | *Program length | *Menu code | *Description | *Video |
|---|---|---|---|---|
| 12 PM | | | | |
| 1 Cheers | .5 | E24 | C | N |
| 2 Terminator | 2.0 | A33 | Tx | S |
| 3 PrimeTime | 1.0 | D14 | N | N |
| 4 Football Special | .5 | B24 | S | N |
| * | | | | |
| * | | | | |
| * | | | | |
| * | | | | |
| 12:30 PM | | | | |
| 1 Simpsons | .5 | E14 & C13 | C | S |
| 4 Football Game | 3.0 | B13 | S | N |
| * | | | | |
| * | | | | |
| * | | | | |

Table B shows an example Events Table that may be downloaded to a set top terminal 220 using the Event Data file, which contains information about events and pricing. As shown in the table, the three columns of the Events Table identify the field number, the field itself and the type of information downloaded in the Event Data file. The first column contains the field numbers 1 through 11. The middle column contains the corresponding field parameters, including the event type, event ID, global channel ID, price, start time, end time, start date, end date, P-icon, name and description. The third column contains corresponding field type information. As shown in this field type information typically consists of an unsigned integer; hours, minutes and seconds; months, day and year; and ASCII character identifier.

TABLE B

| Field # | Field Type | |
|---|---|---|
| 1 | Event Type<br>1 = YCTV ™<br>2 = Pay-Per-View<br>3 = Reg. TV | Unsigned Int |
| 2 | Event ID | Unsigned Int |
| 3 | Global Channel ID | Unsigned Int |
| 4 | Price (in Cents) | Unsigned Int |
| 5 | Start Time | HH:MM:SS |
| 6 | End Time | HH:MM:SS |
| 7 | Start Date | MM/DD/YY |
| 8 | End Date | MM/DD/YY |
| 9 | P-Icon | ASCIIZ |

TABLE B-continued

| Field # | Field Type | |
|---|---|---|
| 10 | Name | ASCIIZ |
| 11 | Description | ASCIIZ |

Table C shows an example Event Data file. In particular, Table C shows two data streams corresponding to two event types. The first data stream identifies a YCTV™ event in the first field. The second field designates the event ID, which is 1234 in this example. The third field includes the global channel ID number two. The fourth field indicates the cost of 50 cents for this event. The fifth and sixth fields indicate the respective start and end times of 3:00 a.m. to 3:00 p.m., respectively. The seventh and eighth fields show the corresponding start and end date, designated as Aug. 25, 1993 and Aug. 27, 1993, respectively. Field nine indicates the P icon set to PBS.PCX graphics file. Finally, fields ten and eleven indicate the name and description of the event selected, which in this case is Sesame Street and Barney. The second data stream in the Event.Dat example shown in Table C includes analogous information for Terminator IV, which is designated in field one as a pay-per-view event.

TABLE C

Event Data Example

1'1234'2'50'03:00:00'15:00:00'08/25/93'08/27/93'pbs.pcx'Sesame Street & Barney's Sesame Street and Barney Abstract
2'1234'2'50'20:00:00'22:00:00'08/25/93'08/25/93't4.pcx'Terminator 4'Terminator 4 Abstract The program control information signal and STTCIS can be formatted in a variety of ways and the on-screen menus can be produced using different methods. For instance, if the program control information signal carries no menu format information, the menu format for creating the menus can be fixed in ROM at the set top terminal 220. This method allows the program control information signal to carry less information but has the least flexibility since the menu formats cannot be changed without physically swapping the ROM holding the menu format information.

In the preferred embodiment, the menu format information is stored at the set top terminal 220 in temporary memory, either in a RAM or EPROM. This configuration provides the desired flexibility in the menu format while still limiting the amount of information needed to be communicated through the program control information signal. New menu format information would be sent using the program control information signal or the STTCIS to the set top terminals 220 each time there was a change to a menu.

In the simplest embodiment, the menus remain fixed and only the text changes. Thus, the program control information signal can be limited to primarily text and a text generator can be employed in the set top terminal 220. This simple embodiment keeps the cost of the set top terminal 220 low and limits the bandwidth necessary for the program control information. Another simple embodiment uses a separate channel full-time (large bandwidth) just for the menu information.

4. Processing the Program Control Information Signal

Figure 10A:
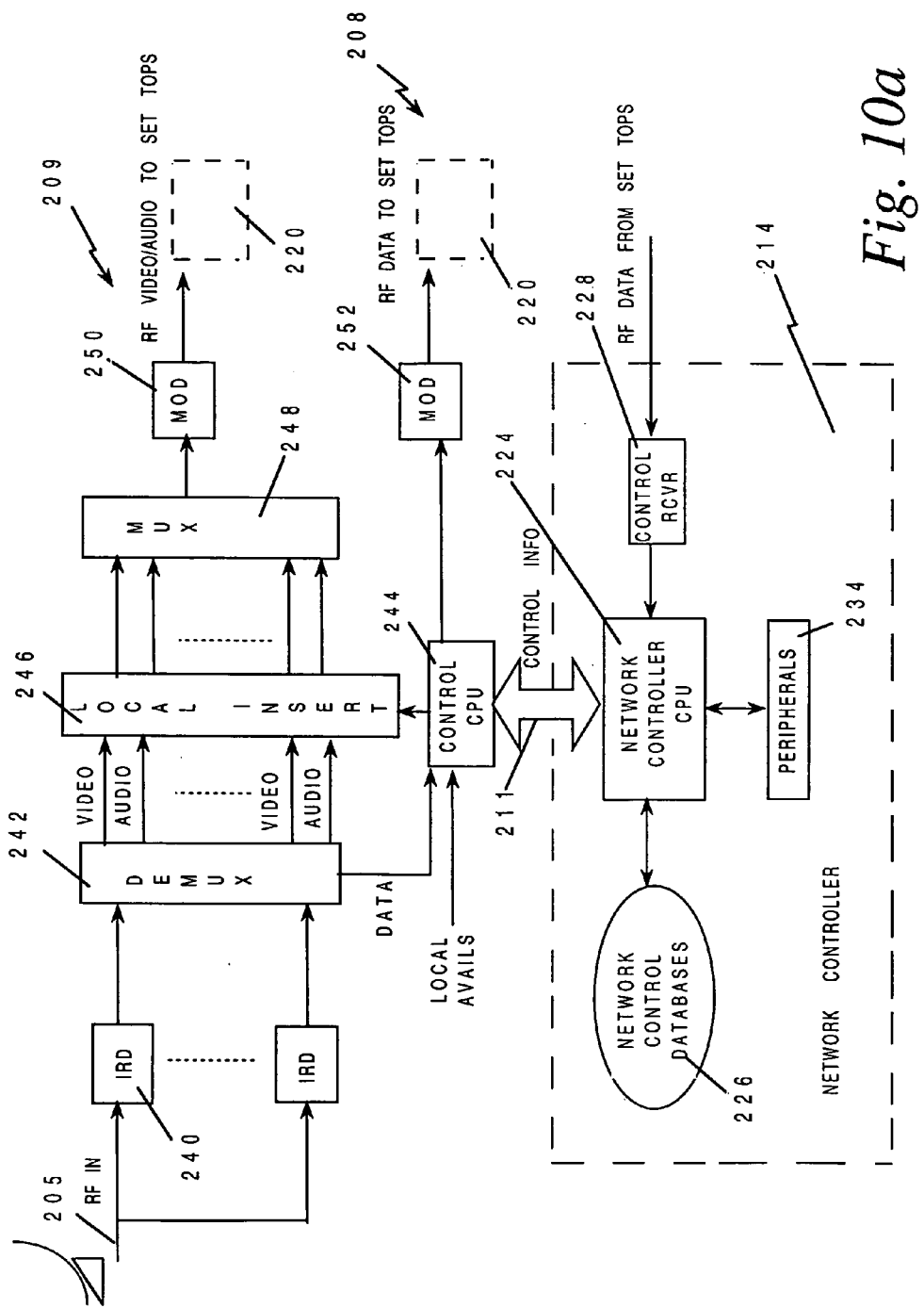
FIG. 10a is a schematic of a basic cable headend having network controller components.
Figure 10B:
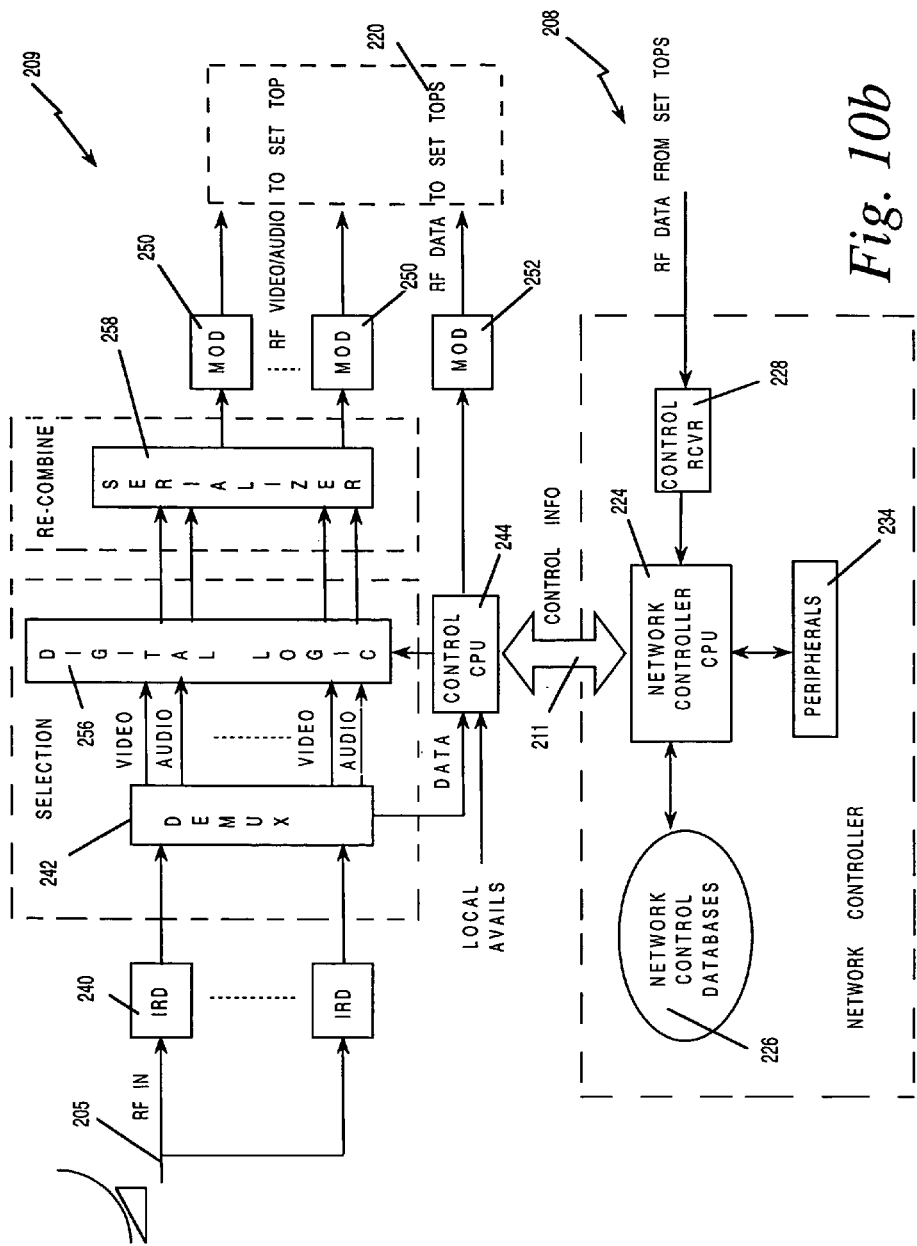

FIGS. 10*a* and 10*b* show a more detailed schematic of the components of the cable headend 208, focusing on the interplay between the network controller 214 and the major hardware components of the signal processor 209. The network controller 214 uses, among other components, the signal processor 209 to implement its monitoring and control capabilities. Although the network controller 214 of the present invention will work with nearly any cable headend signal processing equipment, it is preferred that the signal processing equipment be modem equipment capable of handling digitally compressed video.

FIG. 10a depicts an embodiment of the basic signal processing capabilities of the cable headend 208 and shows connections to components of the network controller 214. As shown in the figure, RF cable signals 205 are received at the headend 208 through a bank of integrated receiver demodulators (IRDs) 240. Each IRD 240 includes customary RF processing equipment, including a low noise amplifier, a demodulator and other filtering devices (not shown). As each RF feed is fed through the individual IRDs 240, the signals are manipulated and transferred to the demultiplexer and other signal processing equipment for further processing. The demultiplexer 242 splits each cable TV signal into its respective video and audio signal components. In addition, the demultiplexer 242 extracts data from the cable television signals and inputs such data to the control CPU 244.

The control CPU 244 exchanges control information with the network controller 214, as shown at 211. This control information is exchanged between the signal processor's control CPU 244 and the network controller CPU 224. In particular, the network controller 214 and signal processor 209 pass control information through the interface linking the two CPUs in order to perform any modifications to the program control information signal. The network controller CPU 224 oversees such modifications, accessing various network control databases 226 for guidance in instructing the signal processor's control CPU 244. The instructions provided by the network controller 214 in turn guide the signal processor 209 in combining and/or adding programming signals and advertisements for transmission to the set top terminals 220.

The local insertion component 246 of the signal processor 209 allows the control CPU 244 to execute the instructions received from the network controller 214 and insert any local programming and advertisements. Once such regional programming and advertisements have been inserted, the local insertion component 246 passes the various signals to a multiplexer 248 that combines the various programming and advertising signals. The output of the multiplexer 248 is transferred to RF modulator 250 that disseminates the composite video and audio signals to the set top terminals 220. The data extracted from the cable television signals by the demultiplexer 242, which is also sent to the control CPU 244, is transmitted to the set top terminal 220 using a separate RF modulator 250.

The network controller 214 accommodates two-way RF data communications with the set top terminals 220. Upstream data transmissions from the set top terminals 220 are received by the network controller's control receiver 228. These upstream data transmission capabilities are described in detail below.

FIG. 10b diagrams another embodiment of a basic cable headend 208 having a network controller 214 and more sophisticated signal processing equipment. Again, RF cable television signals 205 are fed into a bank of IRDs 240 as described above. These signals 205 are demultiplexed into individual video and audio signal components, with data being extracted and sent to the control CPU 244. The individual video and audio signal components are fed into a digital logic circuit 256 that is flexible enough to select individual video and audio signals for repackaging. The network controller 214 oversees such repackaging by: (i) receiving the program control information from the control CPU 244, (ii) modifying or manipulating the signal as necessary, and (iii) transferring the modified program control information signal back to the control CPU 244.

With instructions from the network controller 214, the control CPU 244 may insert local avails into the digital logic system 256 and execute the various selections of individual video and audio signals for subsequent transmission to the set top terminals 220. Once individual video and audio signals have been selected and all local insertions have been made, the outputs of the digital logic circuitry 256 are transferred to a serializer 258 which recombines all the signals into a serialized format. The serially-formatted signals are in turn transferred to RF modulators 250 for distribution over the cable network 200. The selection and recombining components of the signal processing equipment are described in greater detail in a co-pending patent application, U.S. Pat. No. 5,628,195, entitled DIGITAL CABLE HEADEND FOR CABLE TELEVISION DELIVERY SYSTEM, incorporated herein by reference; however, such sophisticated combining circuitry is not necessary for the operation of the network controller 214. Rather, a simpler signal processing system may readily be used.

In the embodiments diagramed in FIGS. 10a and 10b, the signal processor 209 may, acting alone or in conjunction with control instructions from the network controller 214, incorporate local programming and/or local advertisements into the program signals and forward the revised signal to the set top terminals 220. To accommodate this local programming availability, the signal processor 209 must combine the local signal in digital or analog form with the program signals 205 received from operations center 202. If a local cable system 200 uses a compression algorithm or standard that is different than the one used by the operations center 202, the signal processor 209 must also decompress and recompress incoming signals so they may be properly formatted for transmission to the set top terminals 220. In addition, the signal processor 209 performs any necessary signal decryption and/or encryption.

Figure 11:
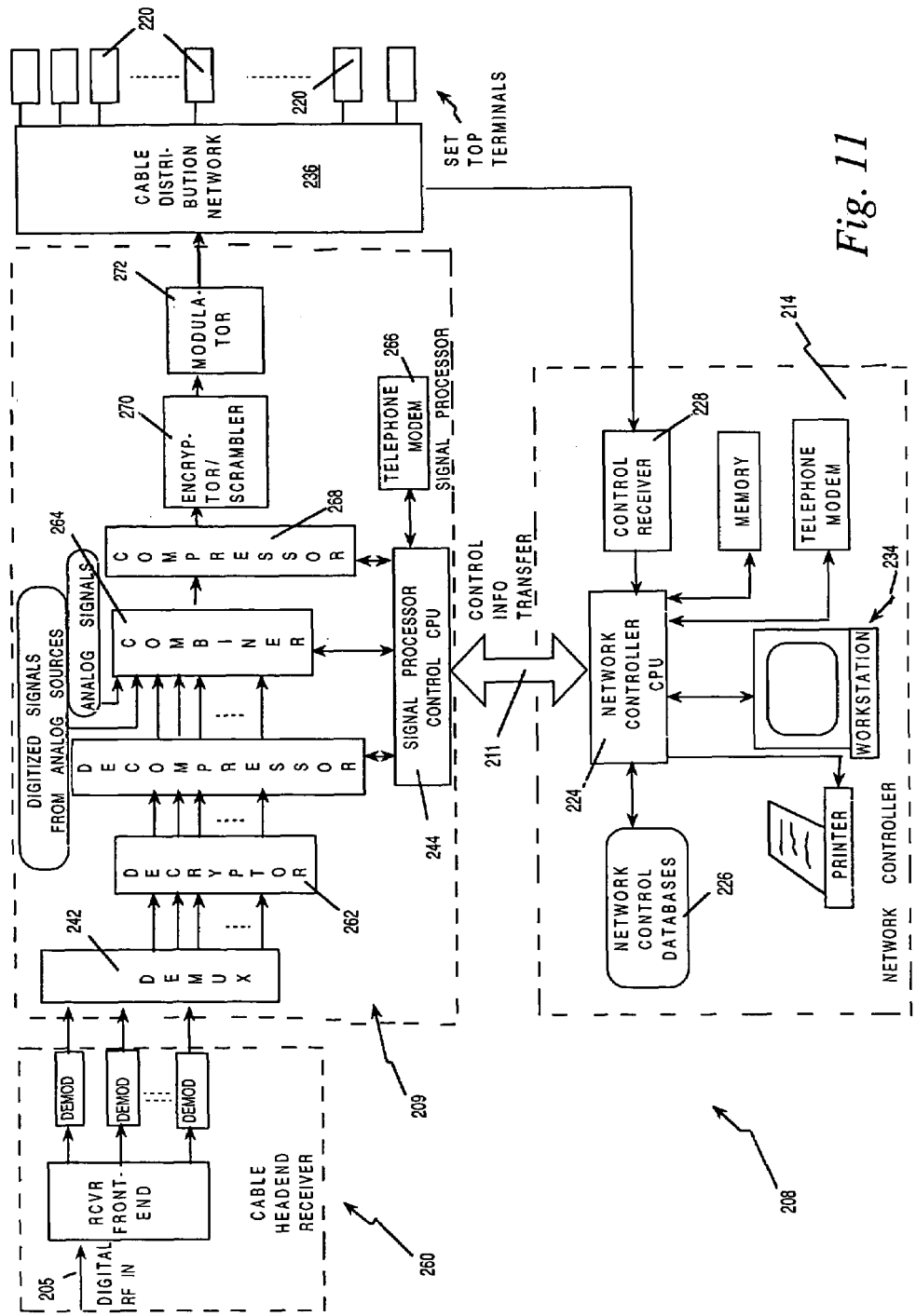
FIG. 11 is a detailed diagram of the components of the cable headend.

FIG. 11 diagrams an alternative embodiment of a digital/analog cable headend 208. In particular, this embodiment includes decompression and recompression capabilities, showing the types of signal processing components that the network controller 214 may control. As shown in FIG. 11, the cable headend 208 receiver front-end, indicated at 260, demodulates the received transponder signals 205, which may contain four, six, eight or more audio/video channels of information, into a digital bit stream of multiplexed digitized MPEG or MPEG 2 format video. The signal processor 209 receives the multiplexed signals and initially performs any demultiplexing required to process the received signals. The demultiplexers 242 separate the multiplexed signals into separate individual MPEG or MPEG 2 format digital channels. Depending on the transponder signal received, the demultiplexer 242 may have four, six, eight or more cross connects to the combiner 264. The outputs of the demultiplexers 242 are selectively enabled by the control CPU 244. Those outputs of the multiplexer 248 that are enabled are then input to the combiner.

Decrypting may be necessary and can be conducted by a separate decrypting device 262 included as part of the signal processor's internal components. The signal processor's control CPU 244 may be controlled by a remote site (such as a national site) via a modem or similar connection 266. Therefore, the remote site is able to control the output of the demultiplexers 242. Alternatively, instead of enabling the outputs of the demultiplexers 242, the inputs of the combiner 264 may be selected by the control CPU 244. By enabling or selecting multiplexer 248 outputs, the control CPU 244 is able to control which television programs are combined and transmitted to the viewers.

The combiner 264 combines the enabled or selected outputs of the demultiplexers 242 into the proper format and outputs the signals through a compressor 268, and an encryptor 270 (if desired), to a digital modulator 272. The modulator 272 outputs a modulated RF carrier combined with other carriers onto the cable distribution network 236. The set top converter terminals 220 in subscribers' homes select and demodulate a particular channel selected by the user. As selections are made, the set top terminal 220 stores the programs accessed in its local storage for later transmission to the network controller 214 at the cable headend 208.

FIG. 12 shows another embodiment of the cable headend 208 components with a file server 215 and the network controller 214. As shown in the figure, the cable headend 208 includes signal reception equipment 233, an authorization component 235, a file server 215, MPEG decoders 251, a buffer with frame repeat 252, channel modulators 238, and the network manager 214. The network controller 214 includes several components. These components include a receiver 254 or set of receivers 254 (including a demodulator 254', demultiplexer 254" and/or buffering circuitry 255), a work station 234, a program control information (PCI) signal processing capability 257, a network controller central processing unit (CPU) 224, databases 226, control software 261 and an instruction memory 263 (which stores computer program instructions that may be executed by the network controller CPU 224). These components are exemplary of the components that reside within the network manager 214; however, other components, such as additional storage (e.g., RAM, ROM, EPROM, and EEPROM), processors, work stations, receiver equipment, signal processing devices, and additional software may also be included in the network manager 214.

The network manager 214 uses such components in its coordination and management of cable headend 208 operations. For example, the network controller CPU 224 is linked or connected to all other components in the network manager 214. The network controller CPU 224 also includes connections or links, either directly or indirectly, with other cable headend 208 components.

As shown in FIG. 12, the network controller CPU 224 is linked to the authorization component 235 through a data and signal interface 267 (which may be the same or an interface separate from the interface 267' that connects the authorization component 236 with the file server 215). The network controller CPU 224 also coordinates and manages file server 215 functions through a separate interface 231. These interfaces between the network controller CPU 224, on the one hand, and the authorization component 235 and file server 215, on the other hand, may be direct or indirect through one or more interfaces. Such interfaces may be RS-232, RS-422, or IEEE-488 compatible. The network controller CPU 224 also monitors and, in some instances, instructs the channel modulators 238 in regard to program distribution and signal processing activities over a separate connection or interface 269.

Within the network manager 214, the network controller CPU 224 includes a number of internal connections, links, or interfaces. Such links, connections or interfaces include direct or indirect full duplex data and signal paths, including a connection 271 to receiver 254, a connection 273 to work station 234, a connection 274 to the PCI signal processing equipment 257, a connection 276 with the databases 226, a connection 278 with the instruction memory 263, a connection 279 with the control software 261, as well as other connections to additional internal components as described herein. The network controller CPU 224 uses these links, connections, and interfaces to exchange data and program signals with other network manager components and devices. Using such components and devices, the network manager 214 performs its cable headend 208 operations.

The receiver 254 or set of receivers 254 is equipped to receive upstream data transmissions 247 from the subscriber. This receiver 254 or receivers 254 may simply be a telephone modem or more sophisticated control receiver equipment that is adapted to receive upstream data transmissions 247 directly from the cable distribution network 210. The network controller CPU 224 coordinates such reception by the receiver 254 or set of receivers 254.

The PCI signal processing equipment 257 is interfaced with the cable headend 208 signal reception equipment 233. The PCI signal processing equipment 257 enables the network manager 214 to receive the program control information signal from the operations center 202 or another remote site through an interface 241 with the signal reception equipment 233. The program control information signal is received by the network manager 214 and processed by the network controller CPU 224 using the control software 263.

In some instances, the network controller CPU 224 stores the data carried by the program control information signal. This data includes data on program packages and menu content and can be stored within the network manager databases 226. The network manager 214 can modify the program control information signal and transmit the modified program control information signal to those set top terminals 220 in the cable distribution network 210, which require the use of such data in order to generate menus or perform other local processing capabilities.

The databases 226 include a variety of databases in which data from upstream transmissions 247 from the subscribers can be stored. The databases 226 may also store information and data on program packaging, menu content, advertisements and billing. No set number of databases 226 are required for the network manager 214 to perform its operations, and a single temporary database may be used. In the preferred embodiment, however, the network manager 214 uses several databases 226 that are accessed 276 during network management operations.

The network controller CPU 224 also acts with the instruction memory 263 as needed in order to run certain control and network management software 261. Such software may be stored in the instruction memory 263 or in one or more other storage locations within the network manager 214.

By maintaining links with the authorization component 235 and the file server 215, the network manager 214 is flexible enough to maintain up-to-date programs watched information. Such programs watched information can be based on the upstream data transmissions 247 that are received over the cable distribution network 210 or through a telephone line 245. The network manager's 214 connection 231 with the file server 215 allows the network manager 214 to coordinate and manage intelligent selection and spooling of programs, menus and advertisements stored in the file server 215. Alternatively, the software resident within the network manager 214 may reside within the file server 215 itself or certain functions may be split between the two cable headend components.

Figure 13A:
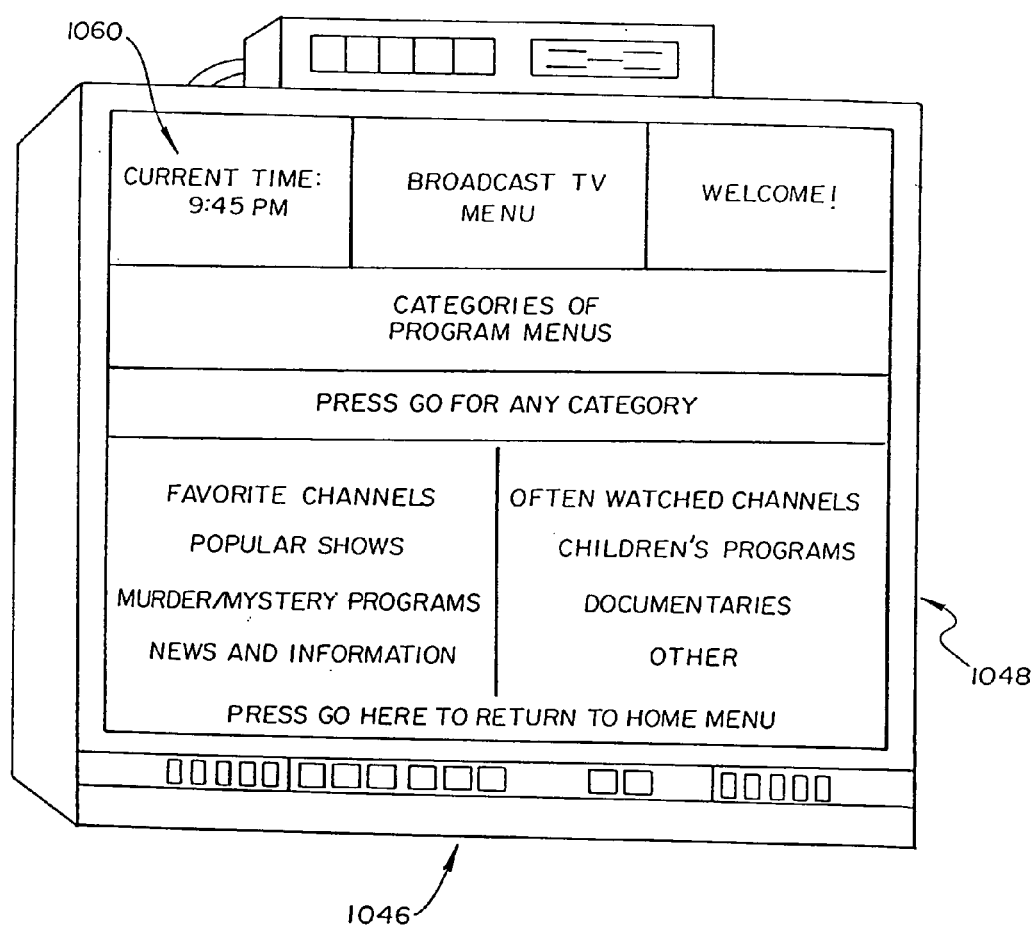
FIG. 13a is a drawing of a broadcast television menu screen.
Figure 13B:
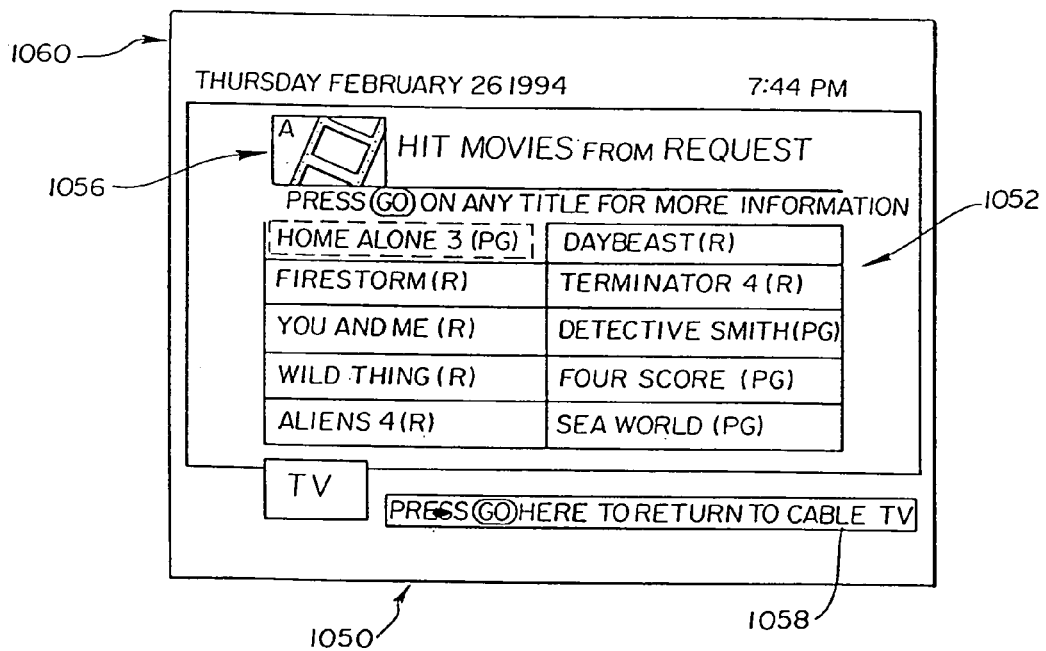
FIG. 13b is a drawing of a hit movie menu screen.
Figure 13C:
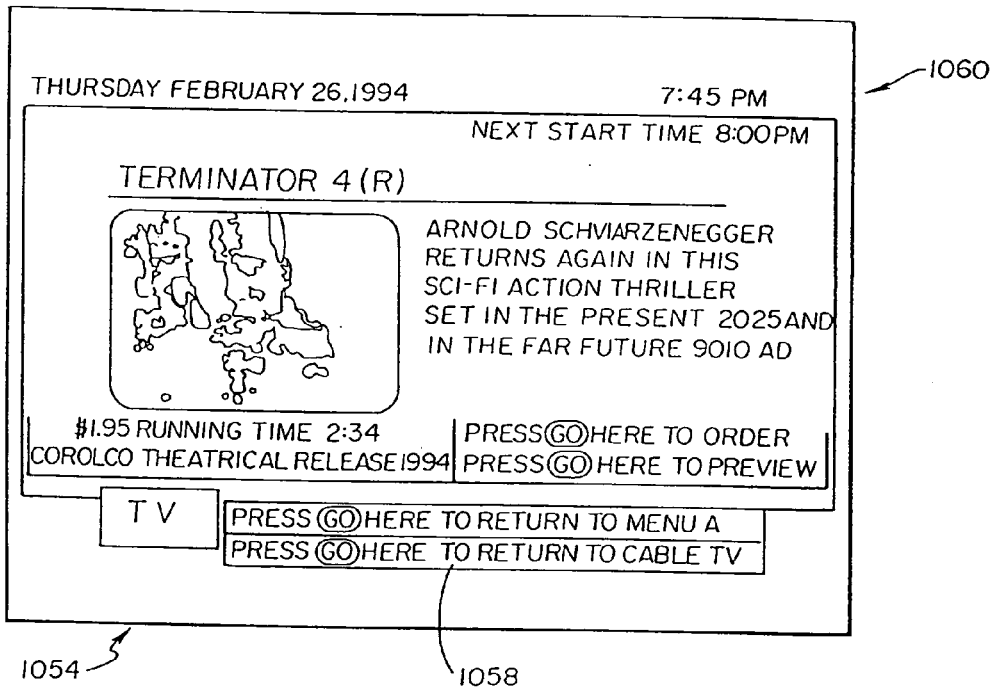
FIG. 13c is a drawing of a hit movie description menu screen.

5. Changing Menu Content by Modifying the Program Control Information Signal FIGS. 13a through 13c are sample menu screens produced by a set top terminal 220 using the program control information signal. FIG. 13a shows a menu which enables the viewer to select a program category from among a choice of eight program categories 1048. FIG. 13b shows a menu 1050 for the viewer to select a hit movie from among ten hit movies 1052. FIG. 13c depicts a menu 1054 which provides information about a movie and enables a viewer to order the movie for viewing.

FIGS. 13a through 13c show text generated by a set top terminal 220. This text is generated using information received via the program control information signal by a text generator (not shown) in the set top terminal unit 220. Those portions of the text that generally remain unchanged for a period of weeks or months may be stored in EEPROM or other local storage. For example, the text "HIT MOVIES from" 1056 will consistently appear on each hit movies' major menu. This text may be stored on EEPROM or other local storage. Further, text such as that which appears at the lower center part of the screen "PRESS HERE TO RETURN TO CABLE TV" 1058 appears many times throughout the menu sequence. This text may also be stored locally at the set top terminal 220.

Text which changes on a regular basis, such as the movie titles 1052 (or other program selections), will be transmitted to the set top terminal 220 by either the operations center 202 or the cable headend 208. In this manner, the cable headend 208 may change the program selections available on any menu by modifying the program control information signal sent by the operations center 202 and transmitting the change.

It is preferred that the text, e.g., 1048, 1052, 1056, etc., be generated by the set top terminal 220 separately from the graphics because the text can be stored locally in a more compact manner requiring less storage space at the set top terminal 220. In addition, it allows for easy communication of text changes from the operations center 202 or cable headend 208 to the set top terminal 220.

FIGS. 13a through 13c show the use of day, date and time information 1060 on menus. This information may be obtained in a variety of ways. The day, date, and time information 1060 may be sent from the operations center 202, the cable headend 208 (signal processor 209 or network controller 214), the uplink site 204, or generated by the set top terminal unit 220 internally. Each manner of generating the day, date, and time information 1060 has advantages and disadvantages which may change given the particular embodiment and costs.

In the preferred embodiment, the day, date, and time 1060 are generated at a central location such as the operations center 202 and are adjusted for regional changes in time at the cable headend 208. In particular, the network controller 214 modifies the PCI signal to accommodate regional day, date and time information and changes and additions in regional programming and advertisements. These modifications are automatically processed by the network controller CPU 224 upon initiation of the Modifying PCI software routine, as described below. In an alternate embodiment, the network controller's control station operator can manually enter programming, advertising and menu modifications.

6. Receiving Information from Set top Terminals

Figure 14A:
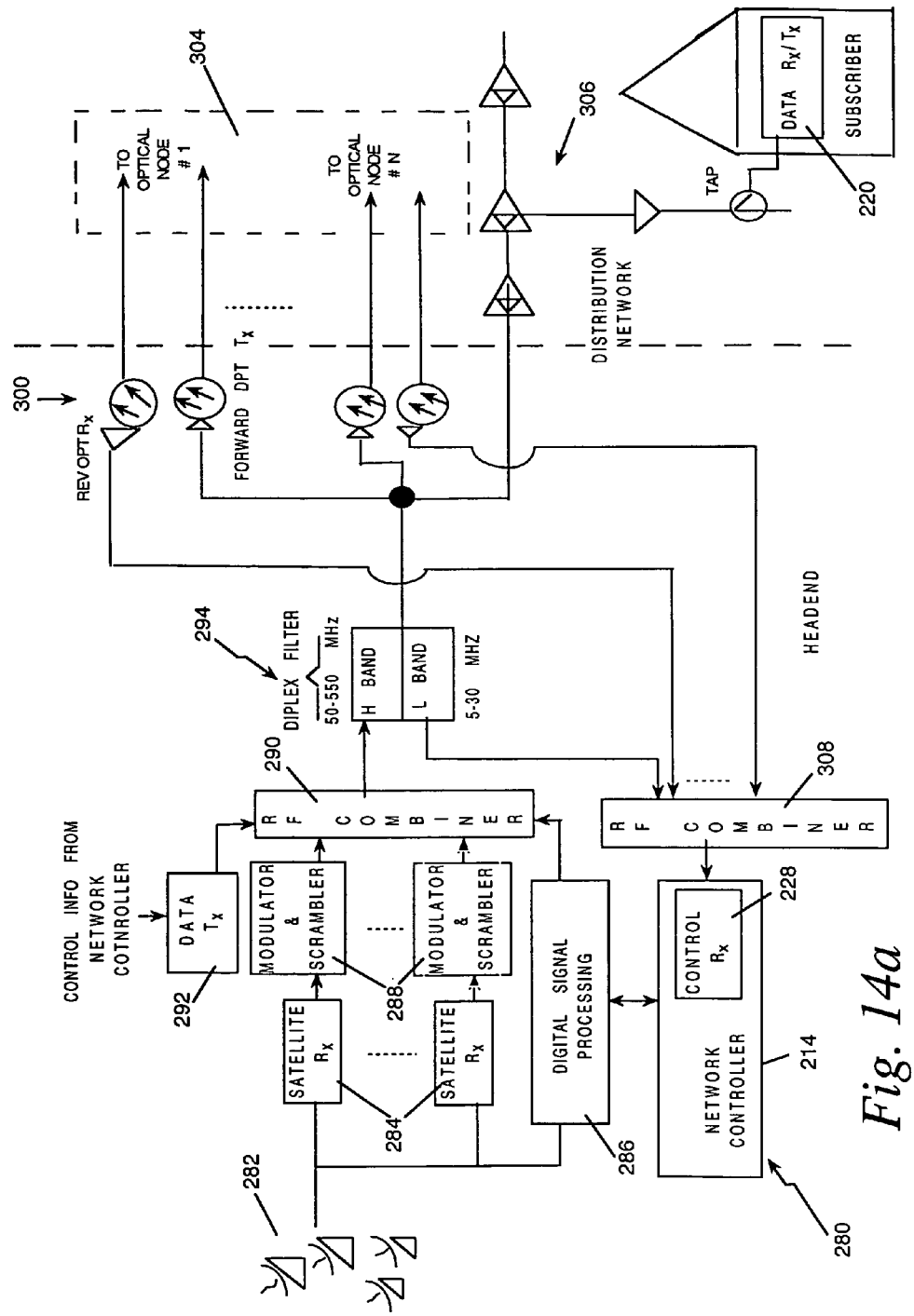
FIG. 14a is a diagram for out-of-band two-way data transmission for a digital/analog headend.
Figure 14B:
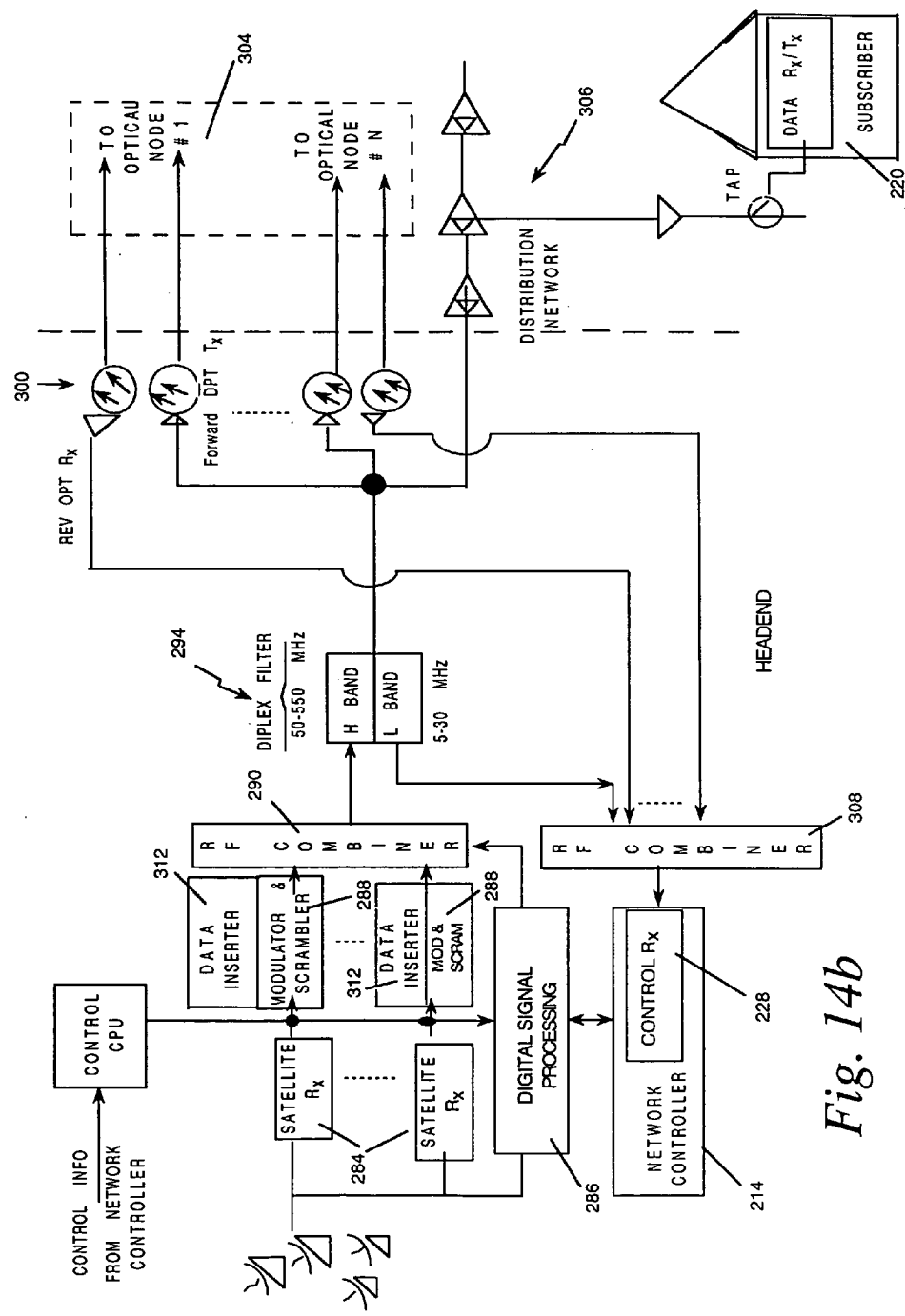
FIG. 14b is a diagram for in-band two-way data transmission for a digital/analog headend.

The network controller 214 is equipped to receive information from the set top terminals 220 on a regular or random basis. FIGS. 14a and 14b diagram separate embodiments for upstream data transmission for a digital/analog cable headend 208. In particular, FIG. 14a diagrams an out-of-band two-way data transmission system 280 wherein satellite feeds 282 are received at the cable headend 208 by a number of satellite receivers 284 and digital signal processing equipment 286. The satellite receivers 284 are used for analog transmissions and the digital signal processing equipment 286 is used to process digital programming signals. The analog signal paths allow analog cable television programming signals to be received by the set of satellite receivers 284 and to be passed to a series of modulators and scramblers 288 the output of the modulators and scramblers 288 is sent to an RF combiner 290.

A data transmitter (Data TX) 292 makes use of the control information transferred to the signal processing equipment from the network controller 214. This data transmitter inserts data into the RF combiner 290. Through the use of a separate data transmitter, any downstream data transmissions may be sent to a set top terminal 220 on an out-of-band frequency (i.e., out of the frequency band used for video signal transmissions).

Digital signals are also input to the RF combiner 290 from the digital signal processing equipment 286. These digital signals are typically assigned to separate frequency bands. Once the data, analog and digital signals have been combined using the RF combiner 290, the composite signals are further processed at the cable headend 208 for distribution over the cable network. This further processing involves using a diplex filter 294 that accommodates two-way RF communications over the cable distribution network.

The diplex filter 294 requires that the various sets of signals be translated to different frequency bands. Typically, services to the home are sent in a downstream band, which begins at 54 MHZ and extends today to typically 550 MHZ. Other systems that use a maximum frequency less than or greater than 550 MHZ, however, may readily be accommodated by the embodiment shown in FIG. 9a. Downstream services may include TV channels, FM radio, digital/audio signals and various control and information data streams.

Upstream transmissions from the set top terminal 220 are typically sent in the frequency band between 5 and 50 MHZ. Other frequency limits may, however, be employed in special cases. For example, the industry is currently experiencing movement toward using 5 to 42 MHZ for upstream services.

Although the diplex filter 294 is not an inherently bi-directional device, it may be made bi-directional by splitting the spectrum between downstream and upstream signals, as described above. The diplex filter 294 effectively becomes bi-directional by passing high-band signals in the downstream direction and passing low-band signals in the upstream direction. For downstream transmission capability, all signals in the high-band of 50 to 550 MHZ are passed to a fiber/coax translation point, indicated generally at 300.

At the fiber/coax translation point 300, optical energy is relayed to the various optical nodes 304. This distribution of optical energy typically involves splitting the optical energy among the nodes 304 and transporting the energy downstream on one or more downstream fibers. In addition, electrical energy signals are sent over coaxial cables, through a series of amplifiers 306 along the cable for distribution to individual subscribers. Individual subscribers simply tap into the amplifiers along the coaxial cable in order to receive programming and downstream data signals.

Upstream data transmission are sent to the cable headend 208 from each optical node 300 over fiber and input into the cable headend's RF combiner 308. Upstream transmissions over cable are accommodated using carrier frequencies in the lower frequency band. These upstream data transmissions over the coaxial cable are passed through the diplex filter 294, which filters out all high-band frequencies and passes all low-band frequencies. Subsequently, the diplex filter 294 transfers such low-band frequencies to the RF combiner 308. The RF combiner 308 combines all upstream data transmissions from the set top terminals 220 and inputs these combined data signals into the network controller 214 for later processing.

FIG. 14b shows an alternative embodiment to FIG. 14a. In particular, FIG. 14b shows the same overall configuration as the embodiment above (and is commonly numbered) although downstream data transmissions from headend 208 to the set top terminals 220 are accomplished through in-band two-way data transmission. Thus, the primary difference between the diagrams shown in FIGS. 14a and 14b is that the latter embodiment uses a method of inserting data into the downstream programming signals themselves for distribution to the set top terminals 220 in the cable network.

Basically, the data placed on the programming signals using a set of data inserters 312 that are electrically connected to each modulator and scrambler component 288. In this way, data can be inserted in-band along with video and audio signals, thereby modulating the data on the same respective carrier frequencies used by the video and audio signals. The inserted data is thus combined with video and audio signals and input into the RF combiner 290 for downstream distribution. As described above, digital signals are also combined using the RF combiner 290 and disseminated over the cable network. Upstream transmissions are accomplished as described above in conjunction with the discussion for FIG. 14a.

Upstream information received from the set top terminals 220 typically includes, for example, program access data gathered at each set top terminal 220. Such information may be communicated to the network controller 214 through a variety of methods including any of the following methods: (1) cyclic polling, (2) random access, and (3) telephone modems. Cyclic polling and random access methods make use of the two-way RF system diagramed in FIGS. 14a and 14b, described above.

As described below, the preferred embodiment employs a cyclic polling method. Although various polling schemes will work with the present invention, a roll-call polling scheme is preferred over other schemes such as hub polling or token-passing since roll-call polling provides the greatest degree of centralized control.

Figure 15A:
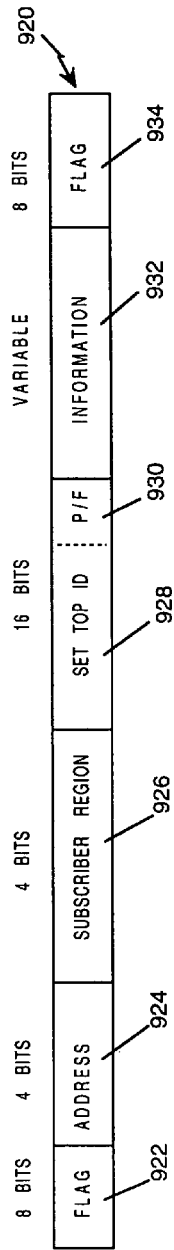
FIG. 15a is a diagram of the polling request message format.

Using this preferred method, program access information is stored at each set top terminal 220 until it is polled by the network controller 214 for information retrieval using a polling request message format 920 as shown in FIG. 15a. This frame format 920 may include such program control information as shown in Tables A-C above, typically consisting of six fields: (1) a leading flag 922 at the beginning of the message, (2) an address field 924, (3) a subscriber region designation 926, (4) a set top terminal identifier 928 that includes a polling command/response (or P/F) bit 930, (5) an information field 932, and (6) a trailing flag 934 at the end of the message.

The eight-bit flag sequence that appears at the beginning and end of a frame, 922 and 934, respectively, is used to establish and maintain synchronization. Such a sequence typically consists of a "01111110" bit-stream. The address field 924 designates a 4-bit address for a given set top terminal 220. The subscriber region designation 926 is a 4-bit field that indicates the geographical region in which the subscriber's set top terminal 220 is housed. The set top terminal identifier 928 is a 16-bit field that uniquely identifies each set top terminal 220 with a 15-bit designation followed by an appended P/F bit 930. Although field size is provided by this example, a variety of sizes can be used with the present invention.

The P/F bit 930 is used to command a polling response from the set top terminal 220 addressed, as described below. The frame format 920 also provides a variable-length information field 932 for other data transmissions, such as information on system updates. The frame format 920 ends with an 8-bit flag 934 (or trailing flag) that is identical in format to the leading flag 922, as set forth above. Other frame formats will be apparent to one skilled in the art and can be easily adapted for use with the system.

Using any such polling request message format 920, the network controller 214 interrogates each set top terminal 220 sequentially, one by one. In this type of access strategy, the network controller 214 is designated as the central controller of the cable distribution network 200 and is responsible for control of the communications links between itself and the set top terminals 220. This control includes issuing commands to the set top terminals 220 and receiving responses back from the set top terminals 220.

Basically, the network controller 214 instructs the signal processor 209 to transmit to each set top terminal 220 a polling request, which asks whether a set top terminal 220 has any information to transmit. The set top terminals 220 are identified by the unique address and set top terminal identifier 928. It is preferred that the set top terminal 220 transmit information and messages to the network controller 214 only when given permission by the network controller 214 to do so.

Where, for example, specialty programs have been accessed since the previous poll, the set top terminal 220 is given permission to transmit a polling response in the form of a status report that includes any such access information. The network controller's control receiver 228 is tasked with the receipt of set top terminal 220 polling responses or status reports. These status reports generally include information that allows the network controller 214 to track a subscriber's program access history. As described above, the control receiver can store the status reports locally and/or transfer them to the network controller CPU 224.

The network controller CPU 224 immediately processes each polling response as it is received from each set top terminal 220. The network controller CPU 224 updates pertinent databases 226 with the received information, and then sends another polling request to the next set top terminal 220 on its list. A set top terminal 220 with no information to transmit so indicates in a reply to the network controller 214. Once all set top terminals 220 have been given permission to transmit status reports, a cycle is complete and a new cycle begins.

Through a polling cycle, the network controller 214 acquires the information needed to operate the system 200. During the cycle, the network controller 214 sends signals to the set top terminals 220 to authorize both their operation and access to specific channels. If, for example, a subscriber has failed to pay a recent bill, the network controller 214 can deauthorize the subscriber's set top terminal 220. Likewise, when a subscriber orders a program or channel, the network controller 214 checks the subscriber's account for good standing by reading the proper database file. After the check, the network controller 214 then either authorizes or deauthorizes access by the set top terminal 220 using the data transmitted in a modified program control information signal. As a result, the cycle requires a series of requests and responses to operate.

Figure 15B:
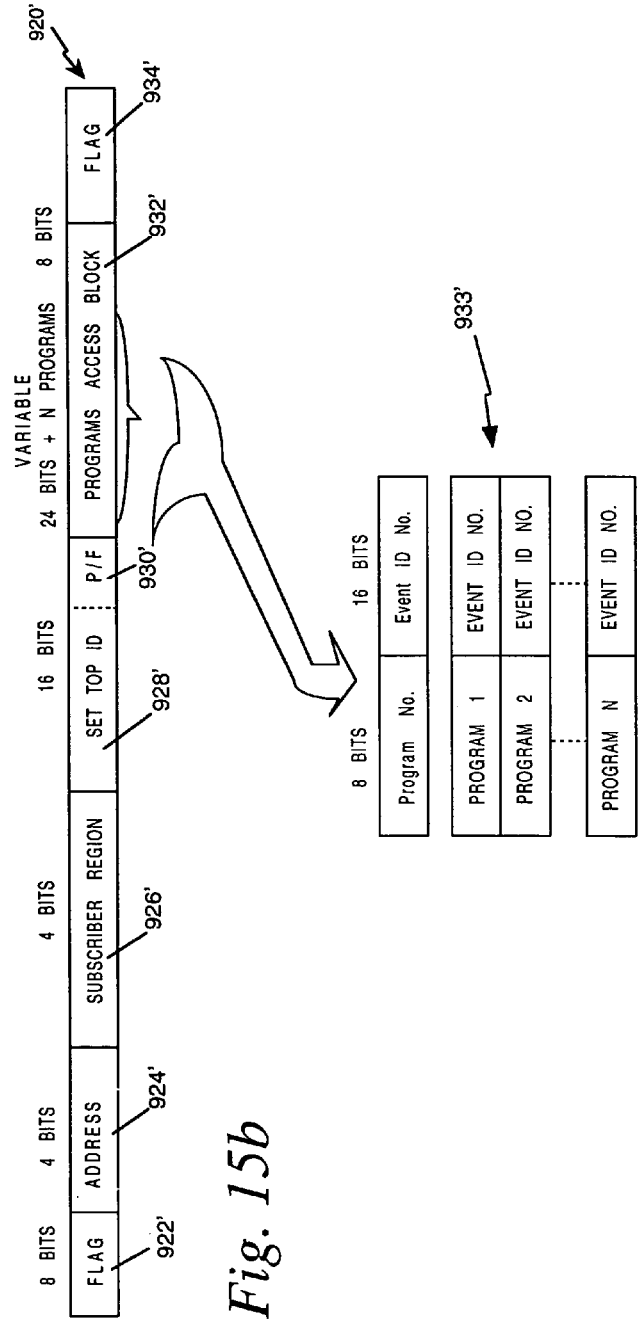
FIG. 15b is a diagram of the polling response message format with an expanded view of the programs accessed block field.

FIG. 15b shows an example frame format 920' for the status reports received from the set top terminals 220 during the polling cycle. This frame format is substantially identical to the polling request message format 920 (FIG. 15a), and includes: (1) a leading flag at the beginning of the message, (2) an address field, (3) a subscriber region designation, (4) a set top terminal identifier that includes a polling command/response (or P/F) bit, (5) an information field, and (6) a trailing flag at the end of the message, each designated by a common number with respect to FIG. 15a, but with the prime indicator (') added.

Again, the information field 932' remains variable in length so that the status of an indeterminate number of programs accessed, as represented at 933', can be included in the frame. In this way, the control message length of the polling request message is minimal since the network controller 214 does not transmit such access information. After a polling response by a given set top terminal 220, however, the control message length increases in proportion to the number of programs accessed.

During transmission, the P/F bit 930, 930' is used to carry out the polling function. In particular, the P/F bit 930 is set to a "1" position to command a polling response from the set top terminal 220 whose address is identified in the frame 928. The set top terminal 220 addressed must respond to the command with the same P/F bit 930' also set to the "1" position. The response will include the number of programs accessed and their corresponding event identification numbers as shown in FIG. 15b at 933'. In cases where the set top terminal 220 has not accessed any programs since the previous polling cycle, the set top terminal 220 responds with the P/F bit 930' set to "1" and the programs access block denoting zero programs accessed.

The second method for the network controller 214 to receive information from the set top terminals 220 is through the use of a random access scheme. In an alternate embodiment that uses this method, individual set top terminals 220 can send control-related messages to the network controller 214 without being polled. This scheme is particularly useful in networks where subscriber regions include potentially large numbers of subscribers. High concentrations of subscribers may be found, for example, in large metropolitan areas. In such cases, the polling cycle can be replaced with a more sophisticated random access strategy such as carrier-sense multiple access with collision detection (CSMA/CD). In this scheme, each set top terminal 220 must "listen" before it transmits and then does so only if it senses an idle medium. When the return link to the network controller 214 is silent, a given set top terminal 220 can transmit its messages. Any messages sent from a set top terminal 220 to the network controller 214 would set the P/F bit 930' to a "0" position to indicate that the message is not in response to any command or polling request. In addition to CSMA/CD, other random access schemes can be used with the system, such as CDSL.

The third method for the network controller 214 to receive information from the set top terminals 220 is through the use of telephone modems. In an alternate embodiment, the set top terminals 220 communicate program access information and orders to the network controller 214 using telephone modems. In this embodiment, the set top terminals 220 are equipped with a modem port to facilitate such operation. Thus, communications between a given set top terminal 220 and the network controller 214 can be established over telephone lines when cable traffic or other primary traffic is congested. The preferred method of using telephone modems is in combination with a control or "hit" signal from the network controller 214. A group (or region) of set top terminals 220 is "hit" simultaneously by the network controller 214 via the cable. Only those set top terminals 220 within the group that have data for the network controller 214 call the network controller 214 by modem. The network controller 214 is equipped with a bank of modems (organized to rollover telephone calls) to answer the incoming calls.

Among the three methods discussed for the network controller 214 to receive information from the set top terminals 220, the use of the cyclic polling scheme depicted in FIGS. 15a and 15b, is preferred. Polling is preferred because it allows the network controller 214 to conduct and control communications with set top terminals 220 over the cable network in an orderly fashion. In particular, the network controller 214 can schedule data retrieval by polling the set top terminals 220 one by one. A random access method, on the other hand, does not allow the network controller 214 to maintain such orderly communications. Instead, the network controller 214 receives data from the set top terminals 220 at random, depending on when the cable medium is idle. This random reception of data lessens the degree of control that the network controller 214 has over set top terminal transmissions. Likewise, the third method, which uses telephone modems, is less desirable than the polling method since the use of modems does not allow for upstream interactivity over the cable medium.

7. Processing Information Received from Set top Terminals

Figure 16:
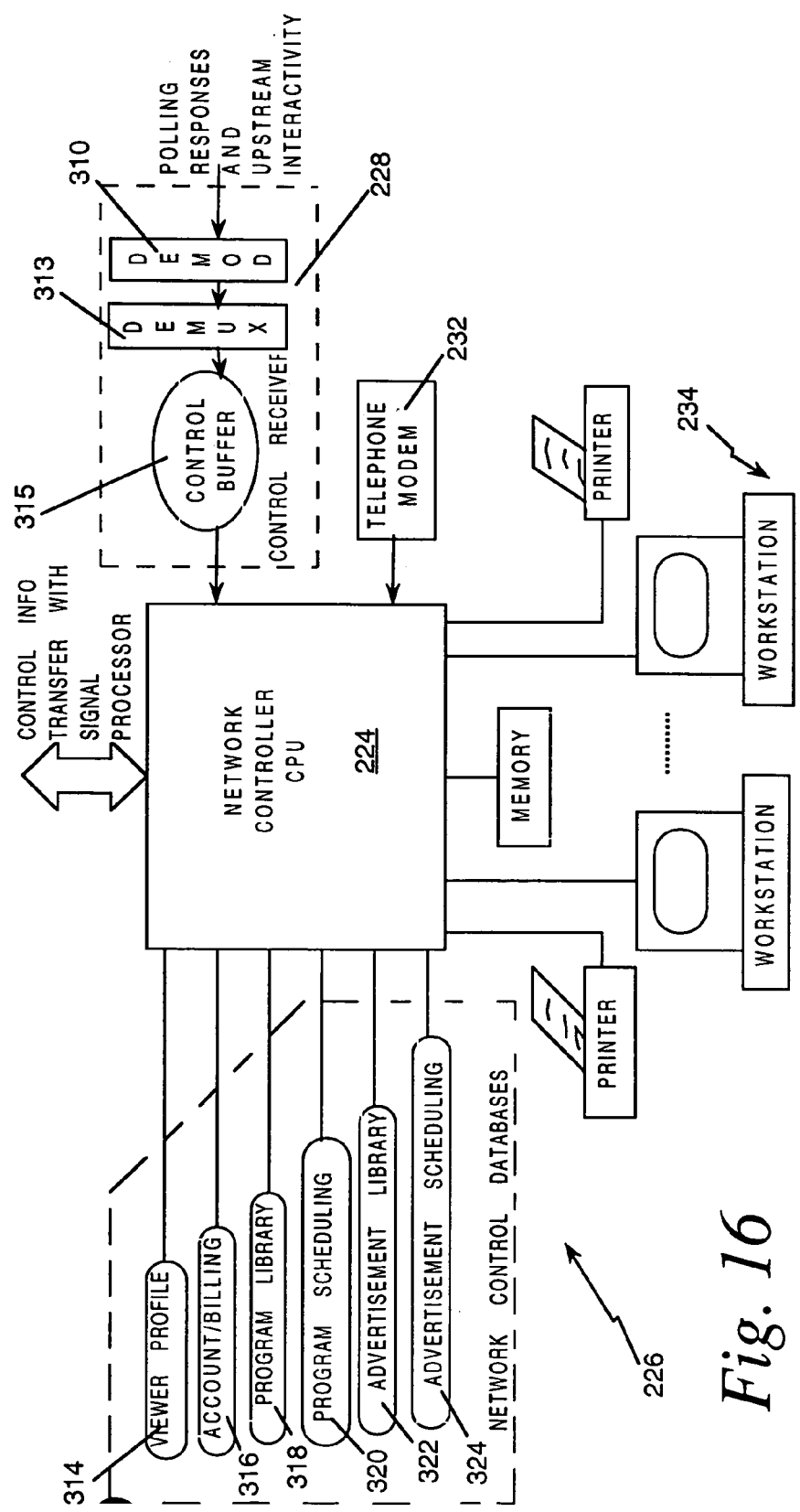
FIG. 16 is a diagram of the network controller CPU and its relational components.

Regardless of the scheme used by the set top terminals 220 to access the network controller 214, any polling responses and upstream interactivity is received by the network controller's control receiver 228 as shown in FIG. 16, depicting the components of the control receiver 228, which includes a demodulator 310 and demultiplexer 313 to demodulate and demultiplex transmissions received from any set top terminal 220 in the cable distribution network 200. As described above, the control receiver 228 transfers, through a control buffer 315, the received information to the network controller CPU 224 for processing.

Processing is accomplished by the network controller CPU 224. Operator instructions are input to the network controller CPU 224 through the operator control station 234 that includes, for example, a computer/workstation with a CRT display, printer and other peripherals. Multiple operator control stations 234 can be used to assist in control operations.

Regional operator control stations (not specifically shown, but substantially identical to stations 234) may be used and may include multiple operator control stations each assigned to a particular subscriber region corresponding to a geographic region where set top terminals 220 are located. Thus, each regional operator control station is assigned to a subscriber region, providing monitoring and control capabilities over such regions. All regional program control information is transferred to the network controller CPU 224 for processing, as in the case where a single control station 234 is used. Likewise, during this processing, portions of the network control databases 226 may also be updated.

No set number of databases 226 are required for the network controller 214 to perform its operations, and a single temporary database may be used. In the preferred embodiment, however, the network controller 214 uses several databases (indicated at 226) that are accessed during network control operations. These databases 226 are identified in FIG. 16 and include: (1) the Viewer Profile database 314, (2) the Account/Billing database 316, (3) the Program Library database 318, (4) the Program Scheduling database 320, (5) the Advertisement Library database 322, and (6) the Advertisement Scheduling database 324.

Figure 17:
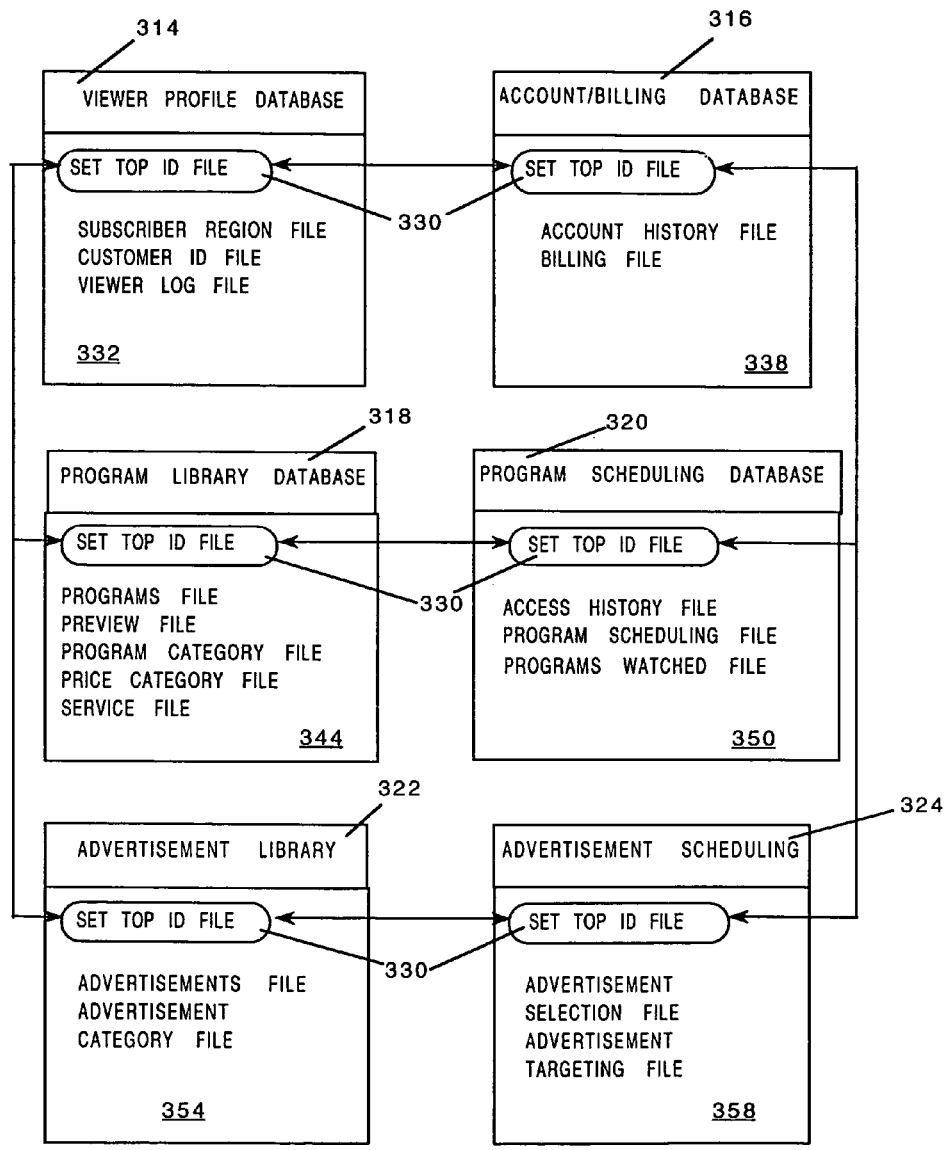
FIG. 17 is diagram of the network control database structure.

FIG. 17 shows one example of a network controller's basic database structure including the databases identified in the preceding paragraph. The data stored in these databases is not simply raw data. Rather data may be processed, correlated and appropriately indexed to create a true relational database 226.

As shown in FIG. 17, the Viewer Profile database 314 includes: (i) a Set top ID File, (ii) a Subscriber Region File, (iii) a Customer ID File and (iv) a Viewer Log File, the latter three files being indicated generally as a file group 332. The Set top ID File 330, common to each of the databases comprising the network controller's database 226, contains set top converter records with each record representing a unique set top terminal 220. Examples of information stored in this file includes set top terminal type, software version and set top terminal identification/serial number. The Set top ID File 330 contains the key data that links each relational database with one another, as described below.

The Subscriber Region File, part of file group 332, includes information such as headend 208 assignment, regional operator control workstation assignment and a designation for the subscriber's geographical area. The Customer ID and Viewer Log Files, part of file group 332, include the subscriber's personal information, such as name, address and telephone number, and information on the subscriptions to cable services for each customer as well as a personal profile for each viewer, respectively.

The personal profile consists of demographic information that may be gathered in a number of ways. The set top terminal 220 builds the personal profile for each viewer and stores the information in a memory file by viewer name. To build a personal profile in the preferred system, the viewer answers a series of questions presented on a series of menu screens. These personal profile screens request the viewer to input information such as name, sex, age, place of birth, place of lower school education, employment type, level of education, amount of television program viewing per week, and the number of shows in particular categories that the viewer watches in a given week such as, sports, movies, documentaries, sitcoms, etc. Any demographic information which will assist the set top terminal 220 in targeting advertisements to the viewer may be used.

In addition to gathering demographics at the set top terminal 220, the personal profile can be compiled using other methods. For instance, the information can be gathered using questionnaires sent by mail and subsequently entered in the Viewer Profile Database 314 by the network controller's control station operator.

As an alternative to gathering demographic data, a simulated profile can be generated using an algorithm similar to that described below that analyzes access history and viewing habits. Using test information generated from a statistically significant number of viewers, the simulated profile algorithm estimates the viewer's age, education, sex and other relevant information. The analysis requires reviewing the viewer's programs watched and statistically comparing the viewer's programs watched with the test group. Also, the algorithm can place the subscriber or viewer in a viewer category. This analysis is transparent from the subscriber's point of view and attempts to accurately profile the viewer. Various viewers or viewer categories can later be targeted with different advertisements.

The Account/Billing database 316 includes (i) the Set top ID File 330, and (ii) an Account History File, and (iii) a Billing File, the latter two files indicated at 338. The Set top ID File, as described above, contains information unique to each subscriber, including set top terminal type, software version and set top terminal identification/serial number. The Account History and Billing Files contain information concerning each subscriber's past bills and account record and information on the most recent bill, including data from which the next billing report can be generated, respectively.

The Program Library database 318 include (i) the Set top ID File 330, and (ii) a Programs File, (iii) a Preview File, (iv) a Program Category File, (v) a Price Category File and (vi) Service File, the latter five files identified at 344. As usual, the Set top ID File identifies each set top terminal 220 by identification number. The Programs File contains information on every program offering in the system, including name, length and type of program. The Preview File contains information on previews for specialty programs stored in the Programs File. The Program Category File contains a set of categories into which each program may be placed, such as movies, sports, science fiction and news. The Price Category File contains information on pricing for various categories of programs, grouping programs and services into categories by price. The Service File maintains information on the various cable services available in the system 200.

Figure 21:
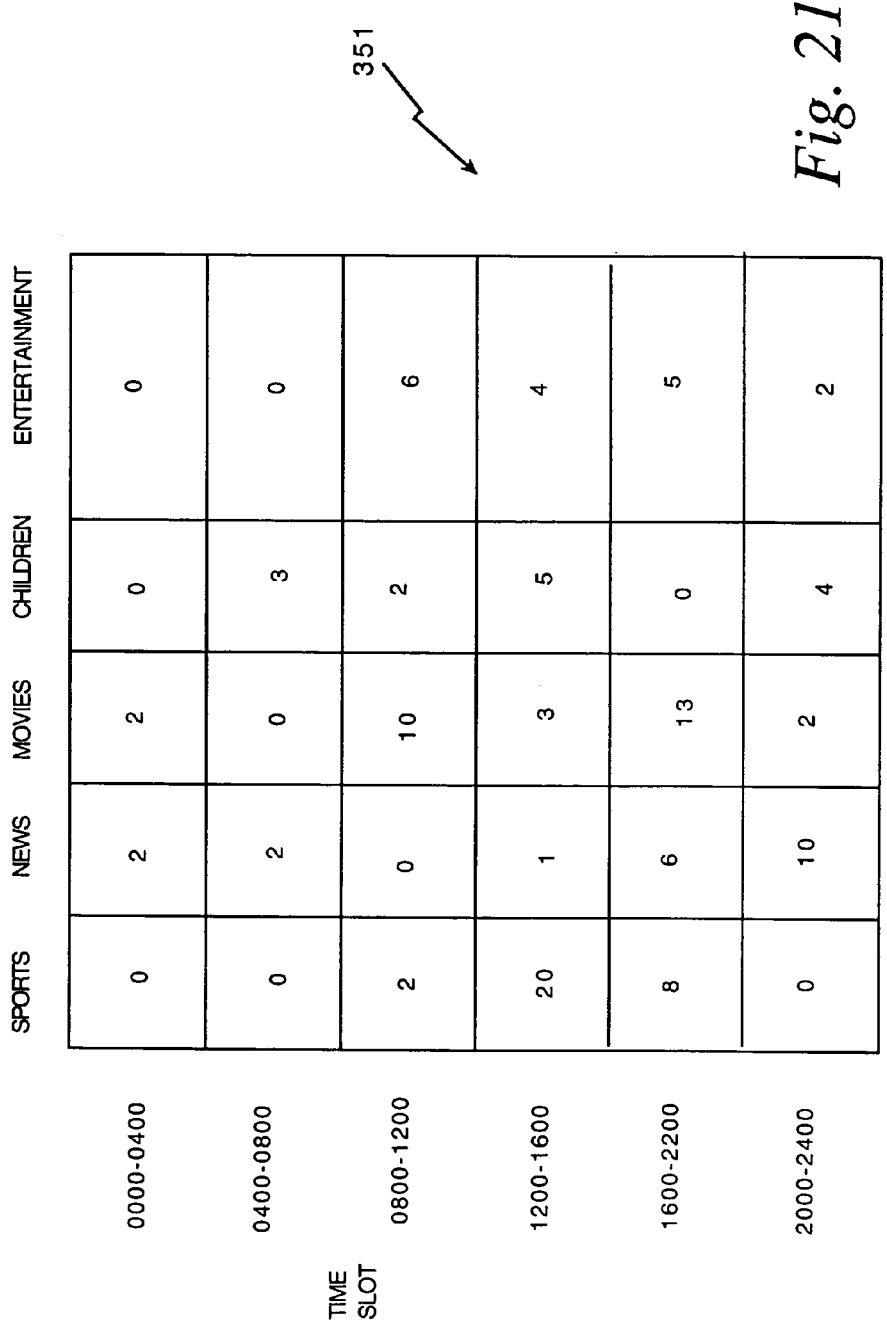
FIG. 21 is a diagram of a sample programs watched matrix.

The Program Scheduling database 320 includes (i) the Set top ID File 330, and (ii) an Access History File, (iii) a Programs Watched Matrices File and (iv) a Program Scheduling Library, the latter three files indicated at 350. The Access History File contains information on the programs that the set top terminal 220 has accessed and the Programs Watched Matrices contains information on the number of programs watched in a given program category during different times of day. Relative to the Programs Watched Matrices file, a programs watched matrix is shown in FIG. 21 and further described below. The Program Scheduling File contains information on the times of day and the corresponding programs that are being offered for viewing at each subscriber location.

The Advertisement Library database 322 includes (i) the Set top ID File 330, and (ii) an Advertisements File, and (iii) an Advertisement Category File, the latter two files being indicated at 354. The Advertisements File contains information on every advertisement in the system, including name, length and type of advertisement, and the Advertisement Category File contains a set of categories into which each advertisement can be placed.

The Advertisement Scheduling database 324 includes (i) the Set top ID File 330, and (ii) an Advertisement Selection File, and (iii) an Advertisement Targeting File, the latter two files identified at 358. The Advertisement Selection File contains information on the advertisements that have been offered to each subscriber and keeps track of the ones that have been selected. The Advertisement Targeting File contains information on the advertisements and advertisement categories that have been chosen by the system as being of the most interest to a specific subscriber.

The network control databases 314, 316, 318, 320, 322, 324 comprising the database 226 are relational databases generally keyed to information in a single file. Specifically, the relational key is a set top terminal 220 identification number stored in Set top Terminal ID File 330, as shown in FIG. 16. This set top terminal identification number allows the database files that correspond to a particular subscriber to be linked together by a common reference. In other words, the databases are structured such that subscribers are referenced in each database file by a unique set top terminal identification number. In this way, each database may be accessed based on set top terminal identification number alone. Thus, using a subscriber's set top terminal identification number, the network controller CPU 224 can access and process information pertaining to that subscriber from any of the above described database files. In configurations where multiple set top terminals 220 are allocated to a single customer (or household), a unique subscriber identification number may be added to the database 226 to group the set top terminals 220 by customer. With the set top terminal identification as a relational key, many additional databases may be created that correlate and store pieces of subscriber-specific information from the six databases and underlying files.

The network manager is capable of processing subscriber communications in order to target specific commercials and advertisements to a subscriber. Such advertisement targeting may be based on historical viewing (or programs watched) data and/or other data that is available at the network manager 214. Advertisements that may be targeted include video, commercials and infomericals, with infomericals being time-varying video segments (e.g., thirty seconds, fifteen minutes).

Advertisements can be targeted using at least three different advertisement insertion methods, namely where the targeted advertisement is: (i) inserted at the cable headend 208 and sent to a subscriber with an analog set top terminal 220, (ii) inserted at the cable headend 208 and sent to a subscriber with a digital set top terminal 220, or (iii) embedded in a program signal (e.g., inserted at a remote location such as the operations center) and simply relayed without change by the cable headend 208 to any set top terminal.

Advertisements may be inserted before, during or after a program. Advertisements during programs and after programs may be targeted in advance as opposed to real-time targeting. Using any of the above three methods, advertisements may be inserted into program signals for distribution to the subscribers. Before, however, an advertisement may be inserted, the specific advertisement must be intelligently selected and spooled from the file server 215.

Advertisements may be intelligently selected for targeting using at least four techniques. These techniques include: (1) using programs watched data, demographics data, and/or other data stored in the network management databases 262 to target an individual subscriber with a specific advertisement for display; (2) collectively analyzing programs watched matrices, demographics information or other data stored in the network management databases 262 in order to target a group of set top terminals 220 with an advertisement; (3) performing an independent advertisement insertion using the network manager 214 components; and (4) ignoring the advance indication for an advertisement insertion so that the advertisement embedded in the program signal sent from the operations center 202 or another remote source can be sent to a subscriber without interruption.

Using the first technique, advertisements may be targeted to individual subscribers based on programs watched data, demographic data and/or other data stored in the network controller databases 26. Various data analysis techniques may be used to target advertisements. For example, where programs watched information is used, the network manager 214 may process a programs watched matrix in order to assist in the intelligent selection of an advertisement for targeting.

The network manager 214 stores a programs watched matrix for each subscriber in the cable distribution network 210. The programs watched matrices are stored in the network management databases 226 and updated as requests for programs are received in the upstream data transmissions 247 from a subscriber. Various other methods of storing program watched data may be used.

FIG. 21 illustrates a sample programs watched matrix. As shown in the figure, the matrix is stored in a format with rows of time slots and columns of program categories. The example in FIG. 21 shows six four-hour time slots and various program categories, including sports, news, movies, children and entertainment. The time slots and program categories may be varied as appropriate.

As subscriber requests are received, the network manager 214 processes these requests and simultaneously updates the programs watched matrix for that subscriber once a program has been requested. In this way, the network manager 214 maintains an up-to-date programs watched matrix for each subscriber in the cable distribution network 210. These programs watched matrices may be used in determining the advertising material that is sent to a particular subscriber.

For instance, upon receiving an advance indication of an advertisement insertion point in a program, the network manager 214 may read the counts for the various program categories in the current time slot from the stored programs watched matrix for that subscriber and select an appropriate advertisement. In one embodiment, network manager 214 uses its network controller CPU 244 and control software and/or instruction memory 263 in order to complete the processing. For example, the network controller CPU 224 determines the program category with the most frequently watched programs (i.e., the program category having the most counts). Once the network management CPU 260 has identified the most frequently watched program category, an advertisement may be selected from a corresponding advertisement category.

In determining the program category having the most frequently watched programs or counts, the network controller CPU 224 and control software 261 is flexible enough to choose between program categories that have an equal number of programs watched counts. In order to break such a tie, the network controller CPU 224 and control software 261 can use demographics or other data stored in the databases 226 to weight the program categories and determine the category of most importance to a particular subscriber. Alternatively, a program category may be selected by default.

Various weighting algorithms may be used to determine the most important program category where more than one category has the same number of programs watched counts. In addition, a number of correlation algorithms may be used to correlate the program category selected with the advertisement category or subcategory from which the targeted advertisement is to be selected.

Another technique for determining or identifying an advertisement for targeting involves intelligently selecting an advertisement for a group of subscribers. For example, a group of subscribers may be formed from a group of requests for the same program and the network manager 214 targets that group of subscribers with the same advertisement. For example, the network manager 214 can group together all subscribers who request the same program within a certain time period (e.g., a five-minute interval). Thus, as multiple requests for the same program are received, the programs watched matrices for those subscribers who have requested the program within the designated time period may be collectively analyzed. In this way, the programs watched matrices for those subscribers may be accumulated and an advertisement targeted to that group of subscribers can be determined based on an accumulated programs watched matrix. Once the programs watched matrices have been accumulated to generate such an accumulated or collective programs watched matrix, the processing steps are analogous to those performed in the previous technique.

Yet another technique allows the network manager 214 to simply select an advertisement for insertion into a program signal. The selection can be independent of subscriber-specific data, thereby accommodating insertions for such purposes as local advertisements.

Finally, the network manager 214 may ignore any advertisement insertion indications. This technique allows the operations center 202 or another remote site to insert an advertisement into the program signal that will be distributed to all subscribers. This technique accommodates the national advertisement insertion method described above.

8. Overview of Software Routines

Figure 18:
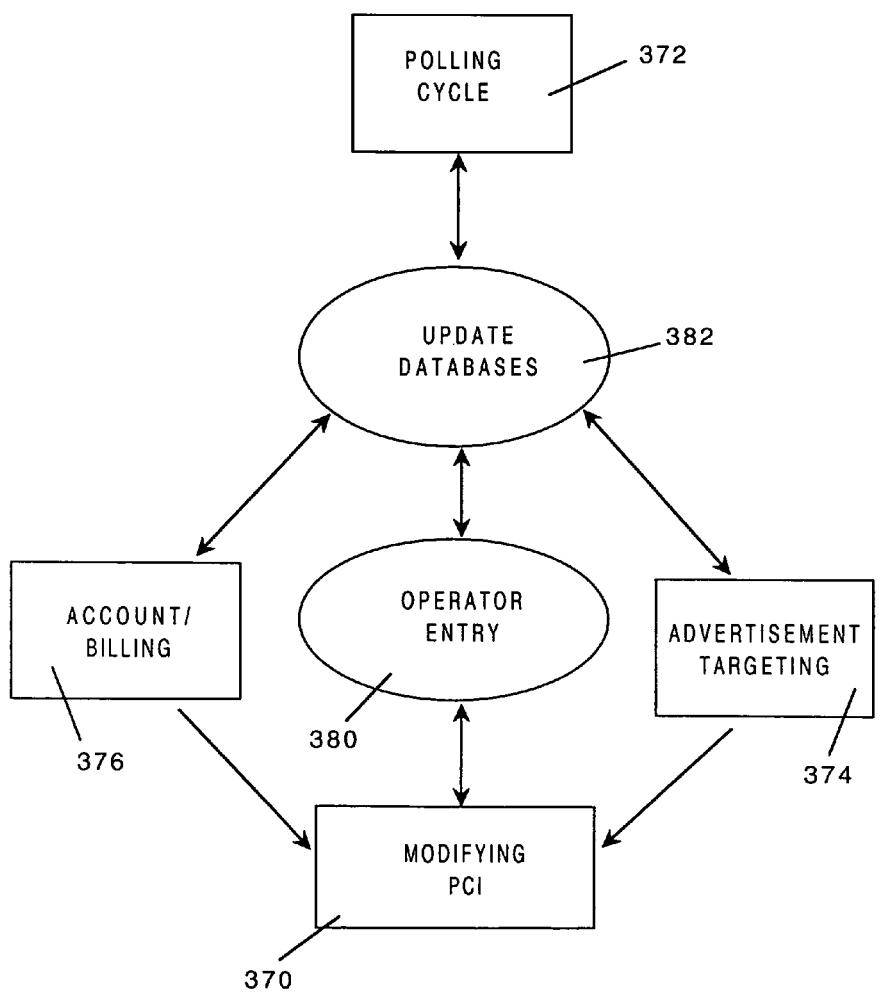
FIG. 18 is a diagram of the relationship between the major software routines.

FIG. 18 shows the major software routines initiated and executed by the network controller CPU 224. These routines are: (1) the Modifying PCI routine 370, (2) the Polling Cycle routine 372, (3) the Advertisement Targeting routine, and (4) the Account/Billing routine 376. Together, these routines, along with the operator entry and update functions 380, 382, respectively, enable the network controller 214 to perform its major functions.

The Modifying PCI routine 370 is the software that enables the network controller 214 to modify the program control information (PCI) signal received from the signal processor 209. This software routine generally allows the network controller CPU 224 to modify the PCI signal content so that changes and additions in programming and advertisements can be accommodated. Such changes and additions include access authorizations and deauthorizations in the form of authorization and deauthorization messages, respectively.

The Polling Cycle routine 372 is the software sequence that interactively executes the network controller's polling cycle allowing the network controller 214 to schedule and perform polling of all set top terminals 220 operating in the system 200. The software also provides the network controller 214 with a means of processing status reports received from set top terminals 220 in response to polling requests. For a random access system (not depicted), the software of this routine 372 would be changed.

The Advertisement Targeting routine 374 is the software that generates packages of television commercials and advertisements geared towards particular viewers and makes use of a viewer's demographic information and viewing habits to determine those advertisements that are of most interest to that particular viewer. In so doing, the routine 374 outputs packages of advertisements targeted towards each viewer.

The Account/Billing routine 376 is the software that the network controller CPU 224 runs to generate billing reports for each set top terminal 220. In general, the routine 376 correlates the programs accessed with pricing information to generate each report.

9. Modifying PCI Routine

Figure 19:
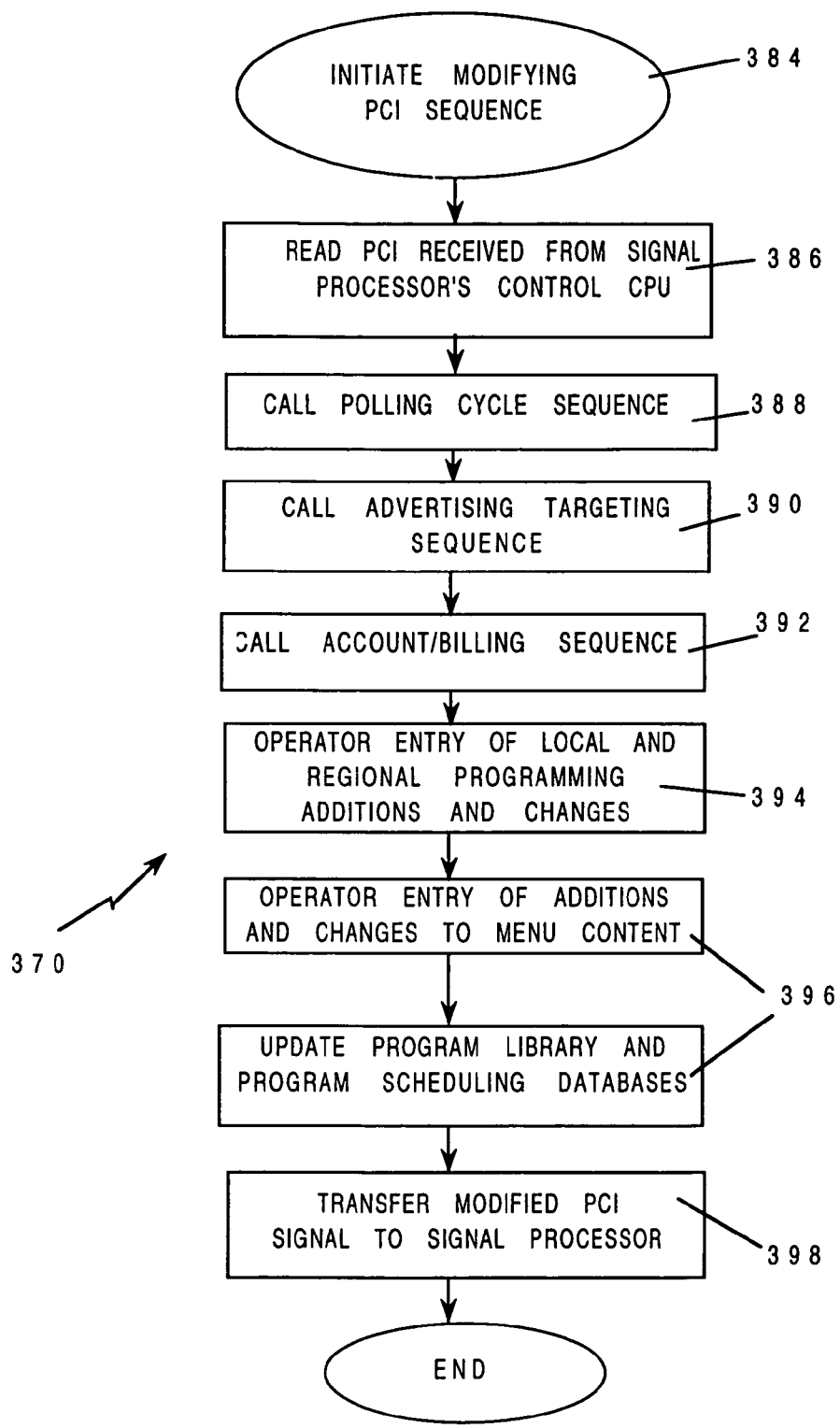
FIG. 19 is a block diagram of the software flow chart for the Modifying PCI routine.

FIG. 19 shows a software flow diagram for the network controller's Modifying PCI routine 370. The Modifying PCI routine (or sequence) is initiated, block 384, automatically by the network controller CPU 224 upon receipt of the program control information (PCI) signal from the signal processor 209. Once the network controller 214 receives the PCI signal, the network controller CPU 224 begins processing the signal by reading the PCI data carried by the signal, block 386.

After reading the PCI data, the network controller CPU 224 "calls" other routines to interactively process data and continue the modification process for each set top terminal 220. First, the network controller CPU 224 calls the Polling Cycle routine 372, at block 388, in order to request data retrieval of the information stored at individual set top terminals 220. Such information includes data on the programs accessed and those ordered for later viewing. As polling responses are received from the set top terminals 220, the network controller CPU 224 next calls, block 390, the Advertisement Targeting routine 374, which generally arranges groupings of commercials for different subscribers based, in part, on viewer demographic information and program access history.

The network controller CPU 224 next calls 392 the Account/Billing routine to begin processing all programming and channel access requests. The Account/Billing routine determines, among other things, whether the subscriber's account is in good standing, verifying that past bills have been paid and that access authorization is warranted. Upon completion of this verification process, a verification message will be sent to the network controller's operator control station 234 indicating that access should be granted.

In the preferred embodiment, an access authorization code may automatically be processed by the network controller CPU 224 and appended to the PCI signal originally received from the signal processor 209. This modified PCI signal and access authorization code will then be transferred back to the signal processor 209 for transmission to the set top terminals 220.

With continued reference to FIG. 19, in an alternate embodiment that uses the Modifying PCI Routine 370, at blocks 394 and 396, the operator manually enters any changes in programming and menu content, along with access authorizations, into the program scheduling database 320. The manual entry of programming and menu content in this embodiment, blocks 394, 396, requires that the operator access the database information generated and updated by the other routines and make necessary changes in the program scheduling database. The network controller CPU 224 reads this updated database information, generates a modified PCI signal, and sends, block 398, the signal to the signal processor 209.

If a subscriber account is delinquent, access to any new programs or channels ordered will not be authorized. Instead, the network controller CPU 224 will deny authorization and generate a deauthorization message to be included in the PCI signal that will be returned to the signal processor 209 for transmission to the set top terminals 220. Alternatively, the network controller CPU 224 generates a delinquency message that is transferred to the CRT display at the network controller's operator control station 234. Upon reviewing the message, the operator may then manually enter message text to be included in the PCI signal that informs the subscriber of a delinquent account.

10. Polling Cycle Routine

Figure 20:
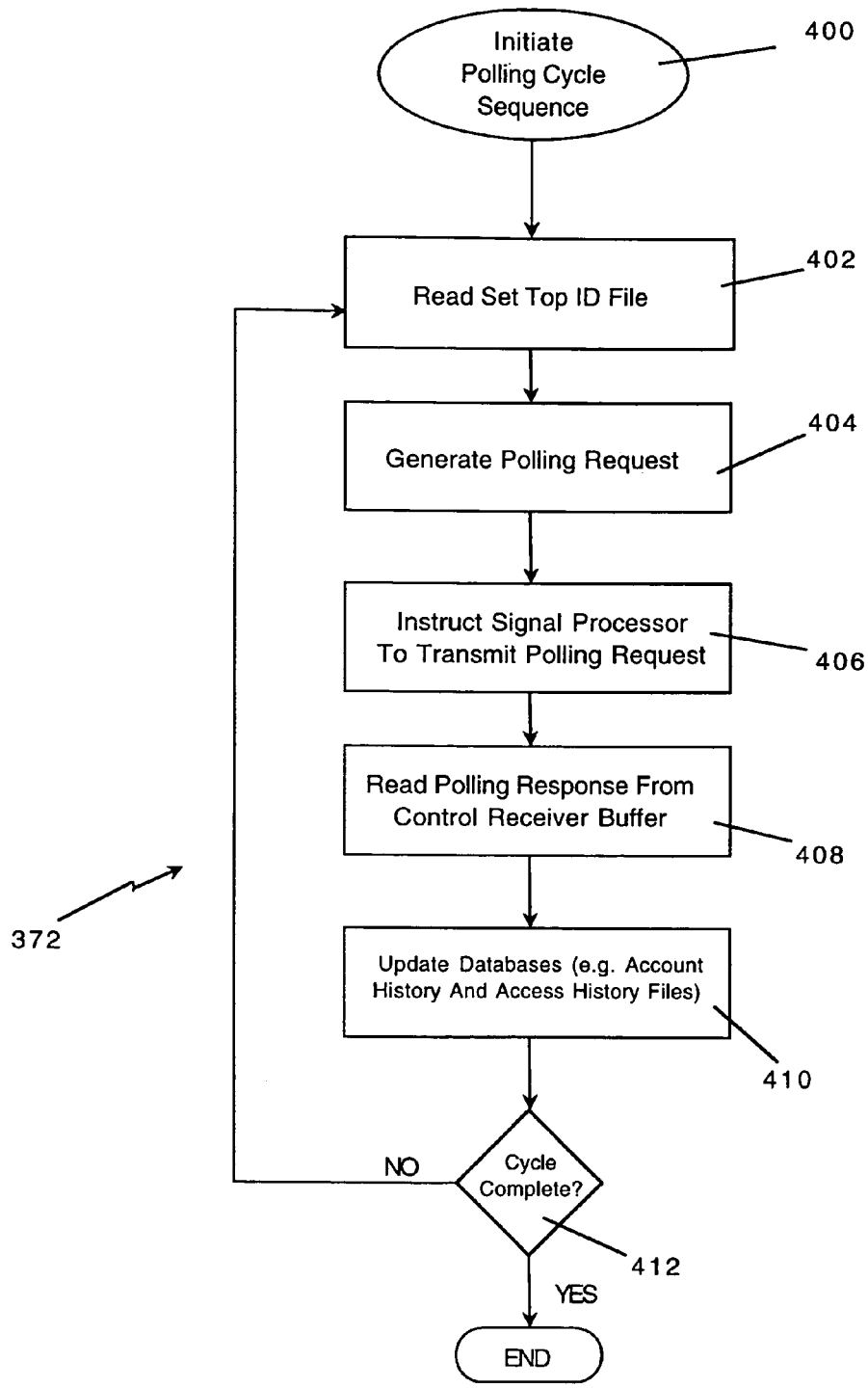
FIG. 20 is a block diagram of the software flow chart for the Polling Cycle routine.

FIG. 20 shows a software flow diagram for the network controller's Polling Cycle routine 372, which interactively executes the network controller's polling cycle. The number of iterations correspond to the number of set top terminals 220 being polled. The network controller CPU 224 initiates the Polling Cycle sequence periodically on a predetermined basis, block 400. Typically, this period is set by the operator at the network controller's operator control station 234 at once per day, although other periods (e.g., multiple times per day or once per week) can be used.

Upon initiation of the sequence 400, as depicted at function block 402, the network controller CPU 224 reads the Set top Terminal ID File 330 and begins generating, block 404, a polling request frame (shown in FIG. 15a and described herein above) for the first set top terminal 220 identified in the file 330. Once the necessary polling request information is complete, the frame is transferred to the signal processor CPU 244 through the interface between the signal processor 209 and network controller 214. After transfer to the signal processor 209, the frames may be transmitted to the set top terminals 220, block 406. Meanwhile, the network controller's control receiver 228 awaits the corresponding response.

Upon receipt of a polling response, as depicted at block 408, the network controller CPU 224 reads the received information from the control buffer 315. The network controller 214 reads the information field of the polling response frame format, as described above. The network controller CPU 224 processes, indexes and stores the data in an appropriate format, updating the corresponding database files with the information received, block 410. The processing and indexing of the raw data into a relational database 226 is important to the ability of the network controller 214 to quickly take actions such as targeting commercials without lengthy processing time. The polling routine subsequently returns to the Set Top Terminal ID File 330, as shown at decision block 412, to continue the polling cycle for the next set top terminal 220 identified in the file 330. When the routine 372 sequences through the last set top terminal 220, the cycle is complete and the routine 372 ceases until the next polling period.

Most often, the files that require updates during the polling cycle are the Access History File and the Programs Watched Matrices File, both indicated generally at 350 in FIG. 17, and the Account History File 338. For example, FIG. 21 shows an example of a 30-day programs watched matrix, denoted 351, for one set top terminal 220 (not shown in FIG. 21). The matrix 351 is divided into six rows, corresponding to six four-hour time slots. The columns of the matrix 351 are divided, as necessary, by the program categories available for viewing. Each entry in the matrix 351 denotes the number of programs watched in a particular program category and time period.

After the status report is received on each set top terminal 220, the polling response routine (see FIGS. 15*a* and 15*b*) determines which time slot and category of program numbers in the matrix 351 need to be increased. Thus, entries in the matrix 351 are updated upon receipt of each set top terminal's polling status report, thereby maintaining a running total of the programs watched. For example, during the 0800-1200 time period, the matrix 351 shows that this set top terminal 220 has been used to watch ten movies during the past month. Preferably the program watched identifying information is stored in addition to the running totals in the Programs Watched Matrices file. Use of programs watched matrices is further described in the following section describing the Advertisement Targeting routine.

11. Basic Advertisement Targeting Routine

Figure 22:
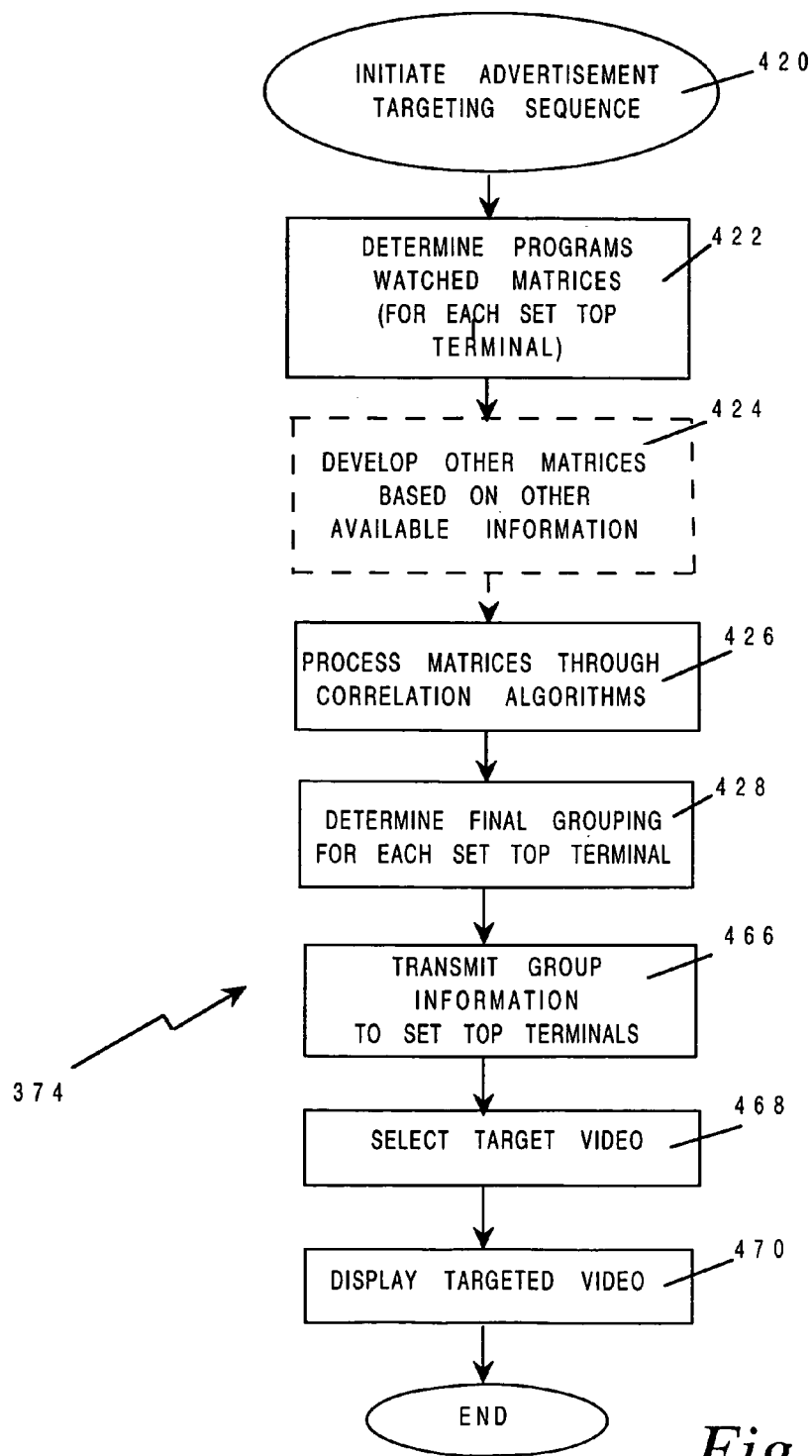
FIG. 22 is a block diagram of the software flow chart for the Basic Advertisement Targeting routine.

FIG. 22 shows the seven primary functions of the basic advertisement targeting routine 374. The function of this routine is to target video for set top terminals 220 based on historical viewing data and other data that is available at the network controller 214. Advertisements that may be targeted include video, commercials and infomericals, with infomericals being time varying video segments (e.g., thirty seconds, fifteen minutes).

When initiated, block 420, the first subroutine, identified at function block 422, accesses the programs watched matrices (exemplified by matrix 351) stored in the Programs Watched Matrices file in the Program Scheduling database 320. The subroutine uses a unique set top terminal ID to access a specific matrix for one set top terminal 220. These matrices are maintained and updated by the polling response routine.

The second subroutine, function block 424, which develops other matrices based on other available information, is an optional subroutine not required for the functioning of the system. For groups of set top terminals 220 or for each individual set top terminal 220, matrices may be developed based on the demographic information, billing information, pricing information, age information and other information which may be stored in the network controller 214 databases.

The third subroutine, block 426, processes all matrices through a set of correlation algorithms. In particular, this subroutine 426 takes matrices developed in the first two subroutines and processes the matrices until reaching a final matrix.

Figure 23:
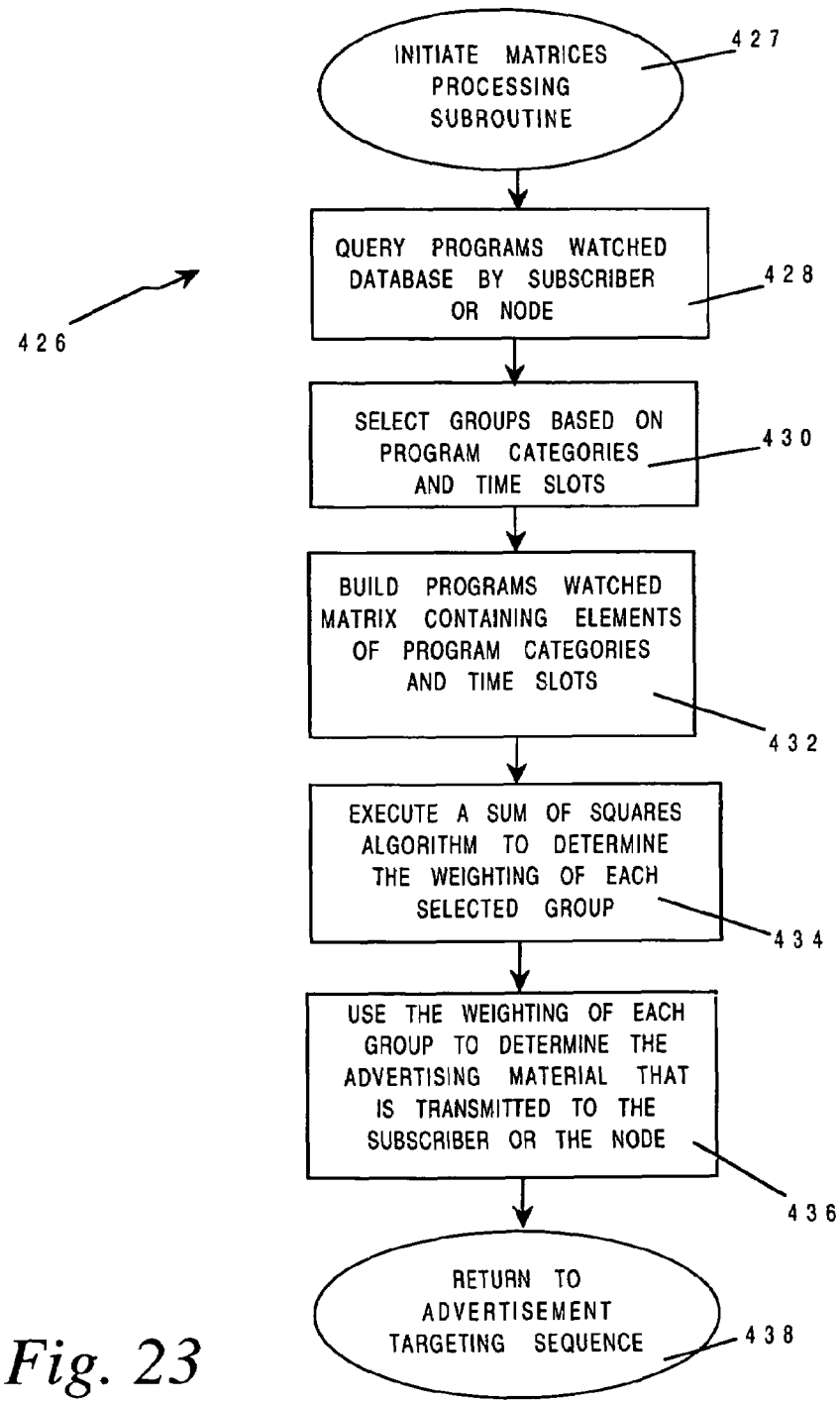
FIG. 23 is a block diagram of the subroutine flow chart for processing programs watched matrices through correlation algorithms.

FIG. 23 diagrams an embodiment of this matrices processing subroutine 426 which is called by the advertisement targeting sequence shown in FIG. 17. As shown in FIG. 23, the subroutine 426 is initiated 427 and then accesses or queries, block 428, the programs watched file and gathers information regarding either an individual subscriber or a node of subscribers. The software can gather the programs watched 110 information in this way for individual subscribers or a set of subscribers.

Once the programs watched information has been gathered from the databases, the routine 426 selects and groups, function block 430, programs watched based on program categories and time slots. The software initially takes each program category (e.g., sports, news, movies, etc.) and establishes the number of programs watched for a given time slot. The time slots may be set to any length of time, including, for example, one, two, three or four hour time frames. The software will loop through such a counting process for each group and timeslot and then proceed to build a programs watched matrix, block 432, based on the program categories and time slots. Essentially, all programs watched in a particular category and time slot will be entered into the programs watched matrix. Once the matrix has been built, the subroutine 426 will process the matrix for a given subscriber or node of subscribers through the correlation algorithms.

A number of correlation algorithms may be used to weight each selected program category group. For example, as shown at block 434, a sum of squares algorithm may be used to determine the weighting. Once the groups have been weighted, the weighted groups will be correlated, as at block 436, with various advertisements stored in the network control databases. The software can then select a set of the most heavily weighted advertisements for transmission to individual subscribers or sets of subscribers in a cable distribution network node. Having determined the weightings of each group and prioritizing the groups accordingly, the subroutine returns 438 to the advertisement targeting sequence 374 of FIG. 22.

Referring back to FIG. 22, the fourth subroutine, as represented at function block 428, uses the final matrix developed by the correlation and weighing algorithm described above, to select a grouping (or selective filter) for each set top terminal 220. The final groupings of advertisement that may be sent to the set top terminals 220 or node of set top terminals 220 may use a subroutine as diagramed in FIG. 24.

Figure 24:
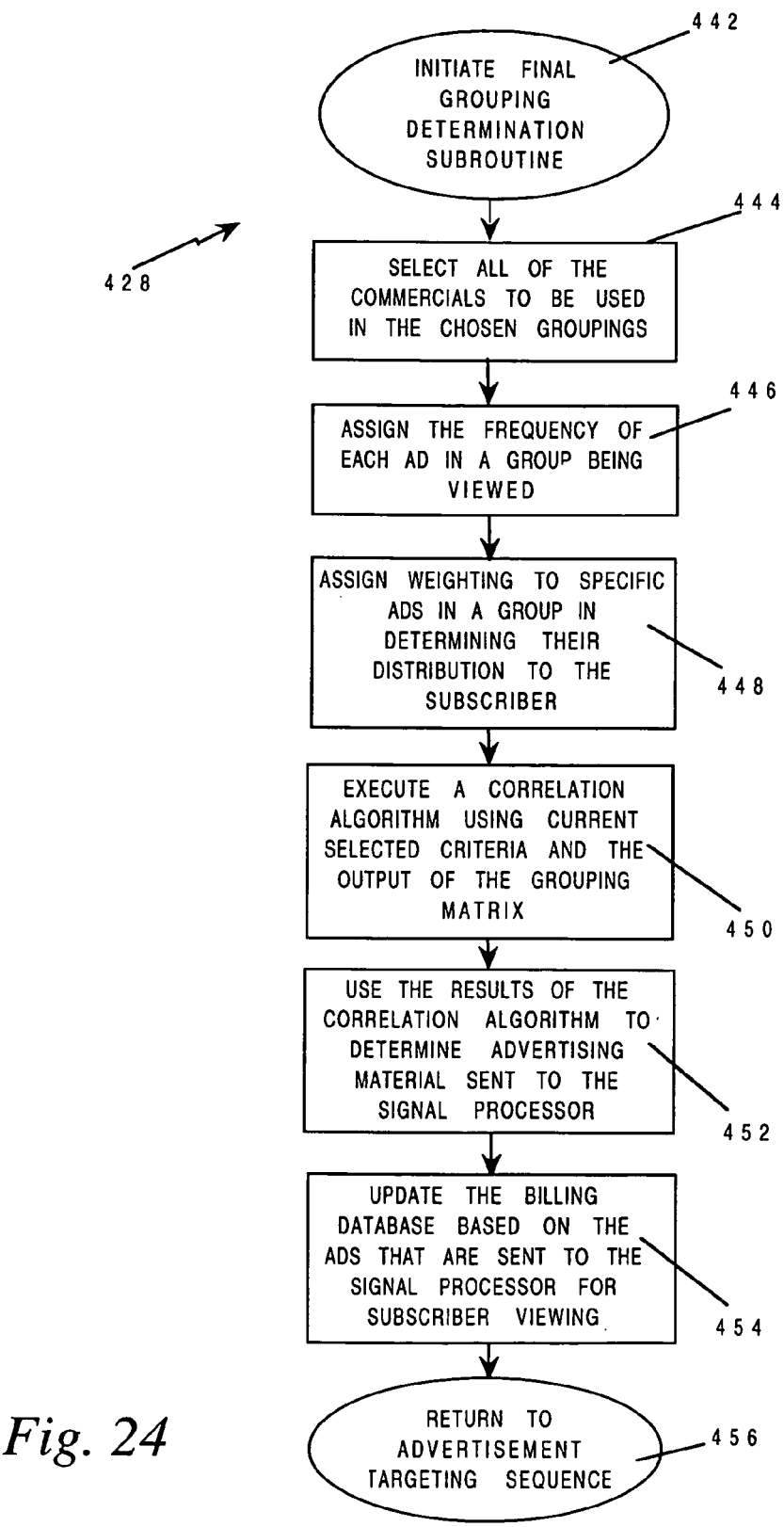
FIG. 24 is a diagram of the subroutine flow chart for determining final groupings of set top terminals.

The subroutine 428 depicted in FIG. 24 is called or initiated by the advertisement targeting sequence 374 of FIG. 22 in order to determine the final groupings. Basically, this subroutine selects a set of commercials that will be used in the chosen groupings, function block 444. This selection process typically involves advertisements from various advertisement categories (from a number of advertisers which have purchased "air time"). Each advertisement will subsequently be assigned a number of times that it will be shown in a given time frame, block 446. This frequency of display may be based on various factors, including the number of requests and cost paid by the respective advertisers to have the commercial displayed. Such factors are used in the next step of the subroutine, block 448, which assigns a weighting to specific commercials or advertisements in each advertisement category or group. These weightings are used to prioritize the advertisements that will be sent to individual set top terminals 220 or nodes of set top terminals 220.

Once the advertisements have been weighted, the software executes its correlation algorithm, 450, using selected criteria (i.e., the various factors used to weight the advertisements) as well as the output of each programs watched matrix. Any number of correlation algorithms and weighting algorithms may be used with the software, including the sum of squares weighting algorithm described above.

The results from the correlation algorithm subsequently determine the advertisements and programming material that is sent to the signal processor 209 for distribution over the cable network, as represented at block 452. Once the subroutine 428 completes these steps, the network controller CPU 224 updates the account and billing database based on the ads that are sent to the signal processor 209 for subscriber viewing, as shown at block 454. These billing database updates allow the advertisers to track the costs and frequency of the advertisements targeted to specific set top terminals 220 or nodes of set top terminals 220. Following the updates, the subroutine returns to the advertisement targeting sequence shown in FIG. 22, block 456.

Figures 25A, 25B:
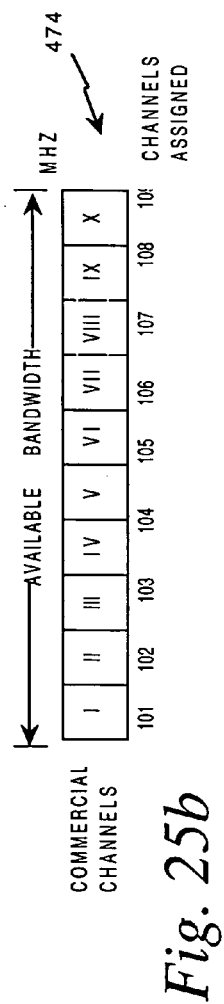
FIG. 25a is a diagram showing a sample assignment of advertising channels to set top terminal groups watching particular categories of programs.
FIG. 25b is a diagram assigning available bandwidth for multiple advertising channels.

Referring to FIG. 25a, set top groupings (A through E) 460 are shown. The number of set top groupings available is determined by the bandwidth available to transmit commercials. The bandwidth of the system will limit the number of commercials which are available at the set top terminal 220 at any given time.

Referring back to FIG. 22, the fifth subroutine, represented at function block 466, prepares set top group information for transmission to the set top terminals 220. This subroutine 466 modifies the PCI signal and includes set top group information in the information field of the frame format given earlier. The various methods for transmitting the group information to the set top terminals 220 are described below.

The sixth subroutine, block 468, selects the target video and is the last decision making process in targeting a commercial for a viewer and, can be performed by either the set top terminal 220 or the network controller 214. In the preferred embodiment, the set top terminal 220 performs this last step by correlating (or matching) the program being watched by the viewer with the set top group information that has been previously transmitted by the network controller 214, and the targeted video is then displayed, as shown at block 470. FIG. 25a shows an exemplary table matching set top terminal groups 460 and program category being watched 470 with a specific channel (continuously) showing commercials. The commercial channels are shown in FIG. 25b at 474 and are assigned Roman numerals I through X, for example. The number of set top groupings and channels showing commercials can vary. FIG. 25b shows a division of available bandwidth to carry ten videos, ten commercial channels. In this example, the channels 474 are numbered 101-110.

The network controller 214 will transmit group information to a set top terminal shown as row names 460 on FIG. 25a. The network controller 214 will also transmit data which informs the set top terminal 220 which of the multiple commercial channels 474 is assigned to a television program category shown as Columns 470 on FIG. 25a. Each set top terminal 220 only requires the data related to that set top terminal's assigned group (or row). For example, in FIG. 25a, the set top terminal in group A (row A) is provided with data on the commercial channel which are assigned for sports programs as I, children's programs as IV and movie category as III. In this manner, each set top terminal 220 is only required to store information related to its own grouping. Therefore, a set top terminal 220 which is in group A only needs to store the information related to group A, which is found in row A of FIG. 25a. This information includes one commercial channel assignment for each of the eight program categories. Using this information, the set top terminal 220 first determines the category of the television program currently being watched and then is able to quickly determine which channel to switch the viewer when an advertisement availability occurs during the program.

The network controller 214 can also perform the step of correlating program category watched 470 and set top terminal grouping 460 to select the target video. In order for the network controller 214 to perform this function, it must have information on the program currently being watched by the viewer. To obtain this information in a polling system, set top polling must occur on a real-time basis (i.e., 10 minutes).

During the target commercial selection process, the set top terminal programming will default to the existing commercial during a program if it is missing any of the information needed to determine which of the continuously playing commercial channels to show. In alternative embodiments, the default that is shown on the regular programming channel will correlate with one of the assigned set top groupings and program categories. FIG. 25a shows, at 478, that the default has been assigned to set top terminal grouping C for program categories "children" and "entertainment."

The three preferred methods to transmit targeted commercials to a set top terminal 220 are: (1) the Additional Bandwidth method (or individual video access); (2) the Multiple Channel method, and (3) the Split Screen method. Each method has certain advantages and disadvantages. The Additional Bandwidth method allows the most flexibility by more specifically targeting commercials before the commercials are transmitted to a set top terminal 220. However, it requires a great deal of available bandwidth in the delivery system. This is difficult with a cable system 200 but possible when a telephone or personal communications system is used to transmit the commercials to the set top terminal 220.

The Additional Bandwidth method allows the network controller 214 to run through a set top terminal's specific correlation algorithms and target specific commercials from hundreds for each set top terminal 220. This method allows for the greatest customizing of targeting and allows for a greater selection of commercials to be shown. Only after a commercial advertisement is selected by the network controller 214 for the specific set top terminal 220 does transmission of the commercial occur.

The Multiple Channel method requires a set top terminal 220 "transparently" to change channels during a scheduled advertisement from the channel of the currently viewed program to the channel which is carrying the targeted commercial. Although this channel changing method may be transparent to the viewer, it creates difficulty in terms of timing and synchronizing the commercials to begin and end during an advertisement availability occurring in the normally scheduled program. The channel changing is done within the set top terminal 220 using the existing tuner(s) (not depicted). Alternatively, in set top terminals 220 equipped with two tuners, the terminal can use the second tuner to tune the channel showing the commercial. Set top terminals with two tuners are described in detail in co-pending patent application Ser. No. 08/160,194, entitled, ADVANCED SET TOP TERMINAL FOR CABLE TELEVISION DELIVERY SYSTEMS, incorporated herein by reference.

Again, the channel changing is transparent to the viewer who believes the same channel is continuously being shown. The Multiple Channel method has the disadvantage of requiring that sufficient additional channels be available (but less bandwidth than Additional Bandwidth method).

The Split Screen method transmits multiple commercials on a single channel using a split screen technique; commercials being pre-recorded and prepared prior to transmitting to the set top terminal 220. Although many commercials can be transmitted on a single channel, in the preferred form of the split screen method, only four commercials are shown. As the number of commercials increases the size and the amount of video information transmitted for each commercial decreases proportionately (i.e., 6, 8, 12, etc.). Using split screen methodology, either a masking technique or a scaling and repositioning of video technique must be used at the set top terminal 220 to show the ad. The masking and repositioning-scaling techniques are further defined in U.S. Pat. No. 5,734,853, entitled, SET TOP TERMINAL FOR CABLE TELEVISION DELIVERY SYSTEMS, which is incorporated herein by reference. The scaling and repositioning technique produces better quality commercials, but requires expensive equipment at the set top terminal 220. The set top terminal 220 will perform audio switching with the split screen method to amplify the correct audio.

12. Alternatives to Basic Advertisement Targeting Routine

Figure 26:
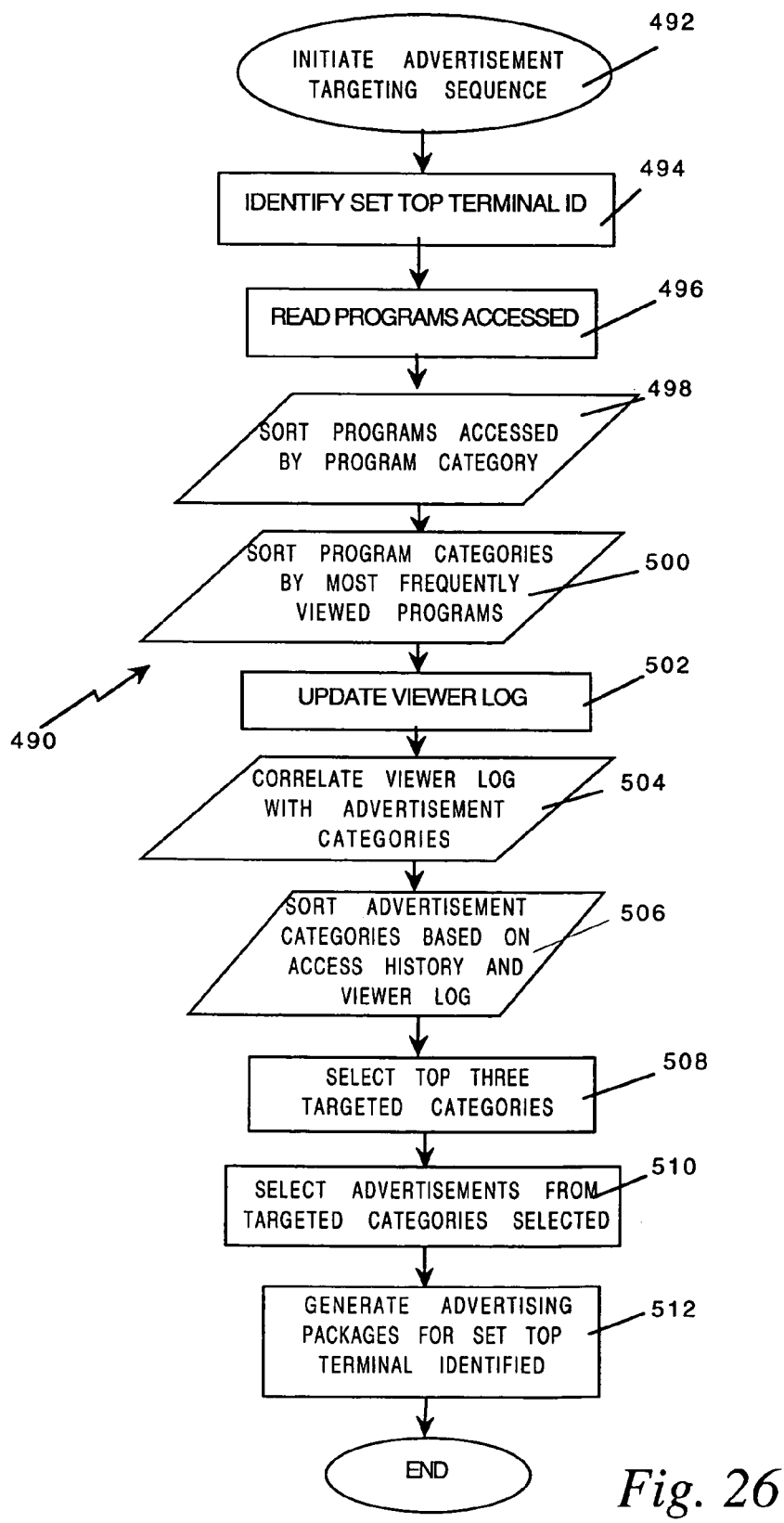
FIG. 26 is a diagram of the software flow chart for an alternative to the Basic Advertisement Targeting routine.

FIG. 26 shows a software program flow 490 that is an alternative to the network controller's Basic Advertisement Targeting routine 374, depicted in FIG. 22. The alternative program 490 allows each set top terminal 220 to be individually targeted with specific advertisements and is initiated automatically, block 492, by the network controller CPU 224 upon receipt of each polling response from a set top terminal 220. Thus, once the network controller 214 receives program access information from a set top terminal 220, the network controller CPU 224 begins the process of selecting a package of advertisements that is based on, among other things, that subscriber's demographic information and viewing history.

Upon receipt of a polling response from a set top terminal 220, the network controller CPU 224 reads the set top terminal identifier, 494, and the programs accessed, 496, from the polling response (or status report) (depicted in FIG. 15*b*). The network controller 214 writes information on the programs accessed to the Program Scheduling database 320, updating the Access History File which contains listings of all programs accessed within the past week, month or year.

With continued reference to FIG. 26, the network controller CPU 224 then calls a subroutine that sorts the programs accessed by program category, block 498. In turn, the program categories are sorted, 500, based on the number of times that programs appearing in each particular category are accessed. In so doing, this sorting subroutine determines and ranks those programs and program categories that are most frequently viewed by that set top terminal 220.

The subroutine can interactively produce rankings for different time slots in a given day. In this way, different rankings can accommodate different viewing preferences during those time slots for a single set top terminal 220. For example, where rankings for eight three-hour time slots are desired, the subroutine determines a ranking of programs and program categories for each three-hour viewing period. Thus, a different ranking may be produced, for instance, for a morning time slot and an evening time slot. All rankings of programs and program categories for that set top terminal 220 are written to the Viewer Profile database 314, updating the Viewer Log File, as at function block 502.

Next, the network controller CPU 224 calls a subroutine that correlates the updated Viewer Log File with the Advertisement Categories File in the Advertisement Library database 322, block 504. By correlating these two files with one another, the subroutine assigns or correlates various categories of television commercials to each ranking of programs and program categories in the Viewer Log File. The categories of television commercials and advertisements that may be so assigned are found in the Advertisement Categories File indicated generally at 354 as part of the library 322 and may include: (1) Household Goods/Products, (2) Home Improvement and Maintenance, (3) Personal Hygiene, (4) Entertainment Items and Events, (5) Sporting Goods and Events, (6) Motor Vehicles and Related Products, (7) Foodstuffs and Beverages, and (8) Miscellaneous. Where, for example, the viewer has watched a sporting event, the Sporting Goods and Events, Home Improvement and Maintenance, and Foodstuffs and Beverages categories may be assigned to that particular sporting event/program and Sports program category.

Once the programs and program categories ranked in the Viewer Log File are correlated with the advertisement categories in the Advertisement Categories File, the routine calls a sorting subroutine that ranks the groups of advertising categories correlated based on other information in the database files. In the preferred system, this ranking is primarily based on data in the updated Access History File and the updated Viewer Log File, as shown at function block 506. By using data on the viewer's past program selections and demographic information, the subroutine ranks the correlated categories of advertisements according to those likely to be of most interest to that viewer.

After the advertisement categories have been sorted and ranked, the routine selects the top three advertisement categories as the targeted categories for a given time slot and viewer, block 508. Individual advertisements are then chosen from the Advertisements File, with all selections made from the targeted categories, 510. The advertisements that are selected are written to the Advertisement Targeting File from where advertising packages can be generated, function 512, for transmission to the set top terminal 220. Such packages are generated by the network controller CPU 224, which accesses the Advertisement Targeting File and includes the targeted advertisements in the PCI signal. The entire routine is repeated for each set top terminal 220 and, alternatively, each viewer.

13. Account/Billing Routine

Figure 27:
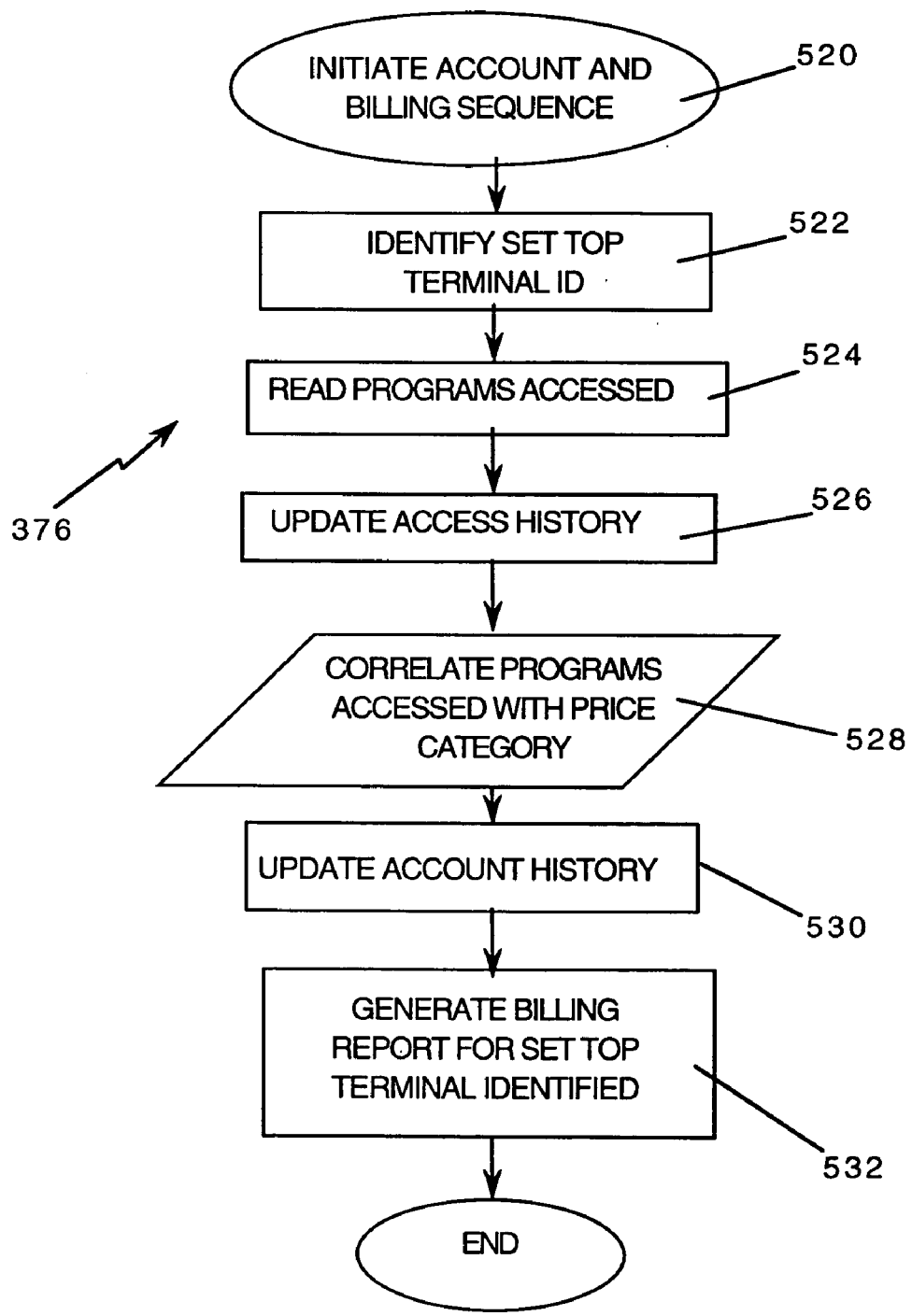
FIG. 27 is a diagram of the software flow chart for the Account/Billing routine.

FIG. 27 shows a software flow diagram for the network controller's Account/Billing routine 376, initiated automatically at block 520 by the network controller CPU 224 upon receipt of each polling response from a set top terminal 220. Upon receipt of such a response, the network controller CPU 224 identifies the set top terminal identifier from the polling response, block 522. The program access block in the polling response is also read, function 524, and the Access History File is updated with the received information, function 526. The routine then calls a subroutine that correlates the updated information in the Access History File with the Price Category File in the Program Library database, block 528. Once all programs accessed since the last polling cycle are assigned to a price category, the pricing information from each category is written to the Account History File, updating the file at 530. The network controller CPU 224 generates a billing report for each set top terminal 220 based on the updated account history, function 532. This billing report can be sent to the set top terminals 220 in a polling request. Specifically, in one embodiment, the information field of the frame format described in FIG. 14*a* is used to provide the set top terminal 220 with billing information.

Account information for each set top terminal 220 can be viewed through a monthly account review menu. The account information necessary to create the monthly account review menus may be stored either in the memory of the set top terminal 220 or at a remote location that communicates with the set top terminal 220. In the simplest embodiment, the set top terminal 220 records a subscriber's selections locally and calculates the monthly account review based upon the subscriber's selections which require the payment of fees. This monthly account information is stored locally and sent to the network controller 214 upon polling.

The Account/Billing routine is capable of processing account and billing information generated in other embodiments. For example, in an alternate embodiment, the subscriber's viewing selections and billing information may be continuously maintained at the network controller 214 or a remote site connected via communication lines to the cable headend 208. The network controller 214 or the remote site must regularly transmit the monthly account information to the set top terminal 220.

Each embodiment, such as local billing storage at the set top terminal 220, billing by the network controller 214 or billing by a remote site, has advantages and disadvantages. If the account information and processing is done locally at the set top terminal 220, each set top terminal 220 must be provided with the memory and necessary processing capability to maintain the account. This greatly increases the cost of a set top terminal 220. If the account information is maintained remotely, the remote site must remain in regular contact with the set top terminal 220 in order to provide the subscriber with billing information. To accommodate homes with multiple viewers two or more set top terminals 220 may be placed on a single bill or two accounts may be created for one set top terminal 220.

Figure 28:
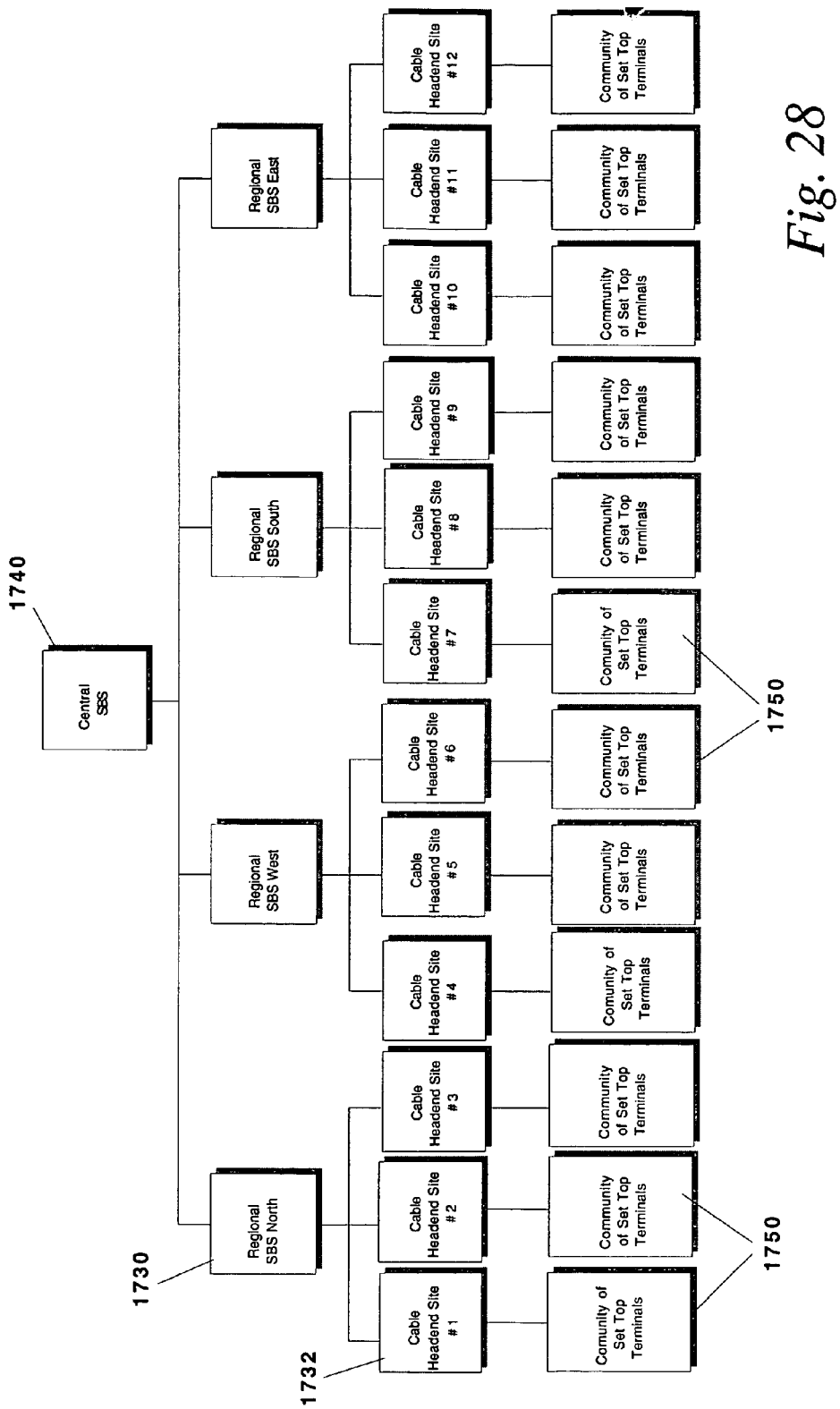
FIG. 28 is a diagram of an embodiment that uses remote statistical and billing sites.

FIG. 28 shows another embodiment in which billing may be accomplished through the use of remote statistical and billing sites (SBS). In this arrangement, statistical and billing information from individual communities of set top terminals 1750 is communicated through cable headend sites to regional statistical and billing sites 1730 (SBS). A regional SBS may serve several cable headend sites, shown at 1732. The regional SBS 1730 calculates billing and statistical information and passes necessary billing information back downstream through the network controller 214 at the cable headend 208 to an appropriate single set top terminal 220 in a subscriber's home. In addition, the regional SBS 1730 communicates the billing and statistical information received on program viewer choices to the central SBS 1740.

The central SBS 1740 accumulates the data received from a number of regional statistical and billing sites and calculates national statistical and billing information. In the preferred embodiment, the regional SBS 1730 prints and mails bills to subscribers. The central SBS 1740 can calculate program ratings, shares and HUTS (homes using televisions) for the nation and by region. With information from interactive TV programs, sophisticated statistical information may be gathered through the network controllers of the cable headends.

This arrangement for billing and statistical information provides the operators of the system with the advantages of distributive processing.

Remote billing sites may serve regions of the country by having each cable headend 208 in a region of the country connected to one regional billing site. The information from the regional billing sites may then be communicated on a less frequent basis to the operations center 202 or a central billing location. This method of distributed processing of billing enables the central billing location to receive fewer communications and be more efficient. In addition, the communication links between the cable headend's network controller 214 and regional sites will be of shorter distance than communication links to the operations center 202 from the cable headends 208. This should result in a cost savings to the system operator.

Regional statistical and billing may, however, be eliminated and all communications from the cable headend 208 may proceed to the Central SBS 1740. In fact, the Central SBS 1740 can be collocated with the operations center 202 and all functions performed at one central location. If the cable program packaging and delivery system 202 is established in just one locale, the network controller 214 can perform all the statistical and billing procedures.

The terms and descriptions used herein are set forth by way of illustration only and are not meant as limitations. Those skilled in the art will recognize that numerous variations are possible within the spirit and scope of the invention as defined in the following claims.

What is claimed is:

1. An apparatus that gathers programs watched data, comprising:

a plurality of terminals connected to corresponding televisions and to a television program delivery system, each of the terminals including a memory that stores program access information;

a receiver coupled to the plurality of terminals, the receiver receiving the program access information, wherein the program access information is stored as programs watched data in a programs watched matrix and is recorded as counts, the counts corresponding to a number of times a program category is watched at the associated terminal, wherein each of an associated terminal is assigned a unique programs watched matrix, and wherein the unique programs watched matrix is updated as additional program access information is provided by the associated terminal;

means for creating terminal group information indicating group assignments for the terminals by correlating the programs watched counts with categories of data, wherein the data categories include demographic data, and wherein the data categories are available for providing programming to the terminals; and means for transmitting the terminal group information to the terminals in a control information stream.

2. An apparatus that gathers programs watched data, comprising:

a plurality of terminals connected to corresponding televisions and to a television program delivery system, each of the terminals including a memory that stores program access information;

a receiver coupled to the plurality of terminals, the receiver receiving the program access information, wherein the program access information is stored as programs watched data in a programs watched matrices;

a plurality of databases, wherein each of the plurality of databases receives information from programs watched matrices, the information including a terminal address, a group identifier, and program counts, the databases including one or more of viewer profile, account billing, program scheduling and advertisement scheduling databases;

means for creating terminal group information indicating group assignments for the terminals using the programs watched matrices, wherein the means for creating terminal group information further comprises indicating group assignments for the terminals by correlating programs watched counts stored in the programs watched matrices with categories of data, wherein the data categories include demographic data, and wherein the data categories are available for providing programming to the terminals; and means for transmitting the terminal group information to the terminals in a control information stream.

3. An apparatus that gathers programs watched data, comprising:

a plurality of terminals connected to corresponding televisions and to a television program delivery system, each of the terminals including a memory that stores program access information;

a receiver coupled to the plurality of terminals, the receiver receiving the program access information, wherein the program access information is stored as programs watched data in a programs watched matrix, a controller in the television program delivery system, the controller coupled to the plurality of terminals, the controller adapted to issue a message directing each of the terminals to provide the program access information, wherein the message is a polling request message sent over one of a cable television cable and a telephone line, and wherein a response message is returned over one of the cable television cable and the telephone line, and wherein the program access information is provided in the response message, the response message comprising:

a leading flag;

an address field including an address of the terminal;

a subscriber region designation that includes a geographical region in which the terminal is located;

a terminal identifier that uniquely identifies the terminal;

an information field that includes a command to provide the program access information; and a trailing flag;

means for creating terminal group information indicating group assignments for the terminals using the programs watched matrix, wherein the means for creating terminal group information further comprises indicating group assignments for the terminals by correlating programs watched counts stored in the programs watched matrix with categories of data, wherein the data categories include demographic data, and wherein the data categories are available for providing programming to the terminals; and means for transmitting the terminal group information to the terminals in a control information stream.

4. A system that gathers programs watched data in a broadcast television delivery system, comprising:

means for gathering programs watched data from one or more set top terminals in a broadcast television delivery system;

a database that stores the gathered programs watched data;

means for accessing the stored programs watched data;

means for counting the accessed programs watched data to determine programs watched counts corresponding to a frequency of programs watched by the one or more set top terminals in the broadcast television delivery system, wherein the programs watched counts are arranged in at least one programs watched matrix;

means for creating set top terminal group information indicating a group assignment for a set top terminal by correlating the programs watched counts with categories of data, wherein the data categories comprise demographic data, and wherein the data categories are available for providing programming to the set top terminal; and means for transmitting the set top terminal group information to the set top terminal in a control information stream that instructs the set top terminal in selecting the programming.

5. The system of claim 4, further comprising:

means for extracting data from an information field of a program control information signal, wherein the extracted data includes program information;

means for creating a polling request message that directs a set top terminal to initiate transmission of a set top terminal status report;

means for processing the received set top terminal status reports to produce polling response data; and means for integrating the polling response data with the extracted data from the information field of the program control information signal.

6. The system of claim 5, wherein the creating means comprises:

means for reading database files using the access means, wherein the database tiles are relationally keyed to one another through a set of set top terminal identification numbers individually unique to a particular set top terminal;

means for formatting the polling request message, wherein the formatted polling request message includes at least one set top terminal identification number; and means for enabling at least one polling command bit in the formatted polling request message, wherein the enabled polling command bit commands transmission of the set top terminal status reports.

7. The system of claim 5, wherein the processing means comprises:

control receiving means for demodulating the received set top terminal status reports;

means for reading at least one information field in the received set top terminal status reports, wherein the information field includes the programs watched data;

means for sorting the information fields in the received set top terminal status reports by a set top terminal identification number; and temporary memory means for accumulating the sorted information fields for the set top terminals, wherein the accumulated sorted information fields produce the polling response data.

8. The system of claim 7, further comprising connection means for linking the processing means to the database, wherein the polling response data may be stored in the database, updating the programs watched matrices.

9. The system of claim 7, wherein the control receiving means comprises a Radio Frequency demodulator for receiving upstream data transmissions from the one or more set top terminals.

10. The system of claim 7, wherein the control receiving means comprises a telephone for receiving data transmissions from the one or more set top terminals over telephone lines.

11. An apparatus for use in a cable television program delivery system, the cable television delivery system coupled to one or more set top terminals, the one or more set top terminals capable of generating programs watched data, the apparatus comprising:

means for gathering programs watched data for a set top terminal;

means for storing the gathered programs watched data in at least one database;

means for accessing the stored programs watched data; and means for counting the accessed programs watched data to determine a frequency of programs watched by the set top terminal, wherein the programs watched counts are arranged by program category and time;

means for creating terminal group information indicating group assignments for the terminal by correlating the programs watched counts with categories of data, wherein the data categories comprise demographic data, and wherein the data categories are available for providing programming to the terminal; and means for transmitting the terminal group information to the terminal in a control information stream.

12. The apparatus of claim 11, further comprising:

means for transmitting the set top terminal group information to the set top terminal in a control information stream capable of polling the set top terminal, and wherein the gathering means comprises:

means for generating a polling request message that directs the set top terminal to initiate transmission of a set top terminal status report;

means for receiving the set top terminal status report, wherein the received set top terminal status report contains programs watched information;

means for processing the received set top terminal status reports to produce polling response data; and means for storing the polling response data.

13. The apparatus of claim 12, wherein the processing means comprises:

means for demodulating the received set top terminal status report;

means for reading at least one information field in the demodulated set top data, wherein the at least one information field is appended to a set top terminal identification number field;

means for sorting the at least one information field in received set top terminal status reports by set a top terminal identification number; and memory means for accumulating the sorted information fields for the at least one set top terminal, wherein the accumulated sorted information fields produce the polling response data.

14. The apparatus of claim 12, further comprising means for updating the programs watched data in the storing means with the polling response data, and wherein the counting means comprises:

means for reading the programs watched counts, wherein a separate programs watched count is assigned to different time slots in a day for a program category; and means for sorting the programs watched counts from highest to lowest.

15. A method for gathering programs watched information, comprising:

gathering programs watched data for set top terminals in a broadcast television program delivery system;

storing the gathered programs watched data in a database;

accessing the store programs watched data;

counting the accessed programs watched data to determine a frequency of programs watched by the set top terminals, wherein programs watched counts are arranged in a programs watched matrix;

creating a terminal group information indicating group assignments for the terminals by correlating the programs watched counts with categories of data, wherein the data categories comprise demographic data, and wherein the data categories are available for providing programming to the terminals; and transmitting the terminal group information to the terminals in a control information stream.

16. The method of claim 15, wherein the set top terminals transmit set top terminal status reports in response to a polling request message produced using a program control information signal, further comprising:

creating the polling request message;

transmitting the polling request message to the set top terminals, wherein the polling request message directs the set top terminals to initiate upstream data transmission of the set top terminal status reports over a cable distribution network; and receiving the set top terminal status reports, wherein the set top terminal status reports comprise the programs watched data.

17. A processor in a cable television program delivery system, the delivery system providing programming to subscriber terminals, comprising:

means for gathering programs watched data for the terminals;

a database that stores the gathered programs watched data;

means for accessing the stored programs watched data;

means for counting the accessed programs watched data to determine a frequency of programs watched at the terminals, wherein programs watched counts are arranged in a programs watched matrix;

means for creating terminal group information indicating group assignments for the terminals by correlating the programs watched counts with categories of data, wherein the data categories comprise demographic data, and wherein the data categories are available for providing programming to the terminals; and means for transmitting the terminal group information to the terminals in a control information stream that instructs the terminals in selecting the programming, wherein the processor polls the terminals to direct the terminals to provide the programs watched data.

18. The processor of claim 17, wherein the gathering means comprises:

means for generating a polling request message that directs the terminals to initiate transmission of terminal status reports;

a receiver that receives the terminal status reports, wherein the received terminal status reports contain programs watched information;

means for processing the received terminal status reports to produce polling response data; and a memory that stores the polling response data.

19. The processor of claim 18, wherein the processing means comprises:

a demodulator that demodulates the received terminal status reports;

means for reading information fields in the demodulated terminal data, wherein the information fields are appended to terminal identification number fields;

means for sorting the information fields in the received terminal status reports by a terminal identification number; and a temporary memory that accumulates the sorted information fields for the terminals, wherein the accumulated sorted information fields produce the polling response data.

20. The processor of claim 18, further comprising means for updating the programs watched data in the database with the polling response data.

21. The processor of claim 18, wherein the counting means comprises;

means for reading the programs watched counts, wherein a separate programs watched count is assigned to different time slots in a day for each program category;

means for sorting the programs watched counts from highest to lowest; and means for matching the sorted programs watched counts with the programs categories, wherein counts of the programs categories are thereby produced.

22. The processor of claim 21, further comprising:

means for sorting the stored programs watched information by a plurality of program categories;

means for ranking the plurality of program categories by frequency of programs watched in each category, wherein program categories with more programs watched are ranked higher than program categories with less programs watched;

means for selecting a set of highest ranked targeted program categories;

means for choosing individual programs from the set of highest ranked programs categories;

means for packaging the chosen individual programs for transmission to the terminals for display, wherein packages of programs are produced; and means for transmitting the packages of programs to the terminals over the cable television delivery system.

23. The processor of claim 22, wherein the terminals have the capability of receiving polling request messages and transmitting polling responses upstream over one of a cable distribution network in the cable television program delivery system and a telephone line, the polling responses including the programs watched information.

24. A method for accumulating data in a cable television delivery system from a plurality of set top terminals in a cable television delivery system, comprising:

gathering programs watched data for the plurality of set top terminals;

storing the gathered programs watched data in a database;

accessing the stored programs watched data;

counting the accessed programs watched data to determine a frequency of programs watched at the plurality of set top terminals, wherein programs watched counts are arranged in a programs watched matrix; and creating terminal group information indicating group assignments for the plurality of terminals by correlating the programs watched count with categories of data, wherein the data categories comprise demographic data, and wherein the data categories are available for providing programming to the plurality of terminals; and transmitting the terminal group information to the plurality of terminals in a control information stream.

* * * * *